US011894027B2

(12) United States Patent
Nakao et al.

(10) Patent No.: US 11,894,027 B2
(45) Date of Patent: Feb. 6, 2024

(54) SERVO PATTERN RECORDING DEVICE, MAGNETIC TAPE, MAGNETIC TAPE CARTRIDGE, MAGNETIC TAPE DRIVE, MAGNETIC TAPE SYSTEM, DETECTION DEVICE, SERVO PATTERN RECORDING METHOD, AND MANUFACTURING METHOD OF MAGNETIC TAPE

(71) Applicant: FUJIFILM CORPORATION, Tokyo (JP)

(72) Inventors: Toru Nakao, Kanagawa (JP); Tetsuya Kaneko, Kanagawa (JP); Yoichi Akano, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/950,143

(22) Filed: Sep. 22, 2022

(65) Prior Publication Data
US 2023/0095712 A1 Mar. 30, 2023

(30) Foreign Application Priority Data

Sep. 29, 2021 (JP) ................................ 2021-160003
Apr. 28, 2022 (JP) ................................ 2022-075195

(51) Int. Cl.
*G11B 5/31* (2006.01)
*G11B 5/008* (2006.01)

(52) U.S. Cl.
CPC ........ *G11B 5/3116* (2013.01); *G11B 5/00826* (2013.01)

(58) Field of Classification Search
None
See application file for complete search history.

(56) References Cited

U.S. PATENT DOCUMENTS

| 6,282,051 | B1* | 8/2001 | Albrecht | ................ G11B 5/584 |
| 6,542,325 | B1 | 4/2003 | Molstad et al. | |
| 6,781,784 | B2 | 8/2004 | Peterson | |
| 8,094,402 | B2 | 1/2012 | Bui et al. | |
| 2003/0099059 | A1* | 5/2003 | Nakao | .................... G11B 5/584 |

(Continued)

FOREIGN PATENT DOCUMENTS

| CN | 102016986 A | 4/2011 |
| CN | 111512368 A | 8/2020 |

(Continued)

*Primary Examiner* — William J Klimowicz
(74) *Attorney, Agent, or Firm* — SOLARIS Intellectual Property Group, PLLC

(57) ABSTRACT

A plurality of gap patterns are formed on a front surface of a substrate along a direction corresponding to a width direction of a magnetic tape. The first straight line region has a steeper inclined angle with respect to the first imaginary straight line than the second straight line region. Positions of both ends of the first straight line region and positions of both ends of the second straight line region are aligned in a direction corresponding to a width direction of a magnetic tape. Positions of the plurality of gap patterns are aligned in a longitudinal direction of the magnetic tape. A pulse signal is supplied to each of the plurality of gap patterns with a delay of a predetermined time from one side to the other side in a direction in which the plurality of gap patterns are arranged.

19 Claims, 28 Drawing Sheets

(56) References Cited

U.S. PATENT DOCUMENTS

| | | | |
|---|---|---|---|
| 2003/0123179 A1 | 7/2003 | Molstad et al. | |
| 2005/0254163 A1 | 11/2005 | Nakao | |
| 2009/0128949 A1 | 5/2009 | Matsuno et al. | |
| 2009/0279202 A1* | 11/2009 | Cherubini | G11B 5/584 360/77.12 |
| 2009/0310251 A1* | 12/2009 | Tanaka | G11B 5/584 |
| 2018/0082709 A1* | 3/2018 | Biskeborn | G11B 5/584 |
| 2020/0273489 A1* | 8/2020 | Kaneko | G11B 5/59638 |
| 2020/0273490 A1 | 8/2020 | Naoi | |
| 2021/0056986 A1 | 2/2021 | Yamagata et al. | |
| 2022/0165301 A1 | 5/2022 | Yamaga et al. | |

FOREIGN PATENT DOCUMENTS

| | | |
|---|---|---|
| EP | 1596370 A2 | 11/2005 |
| JP | 2000-260014 A | 9/2000 |
| JP | 2005-327386 A | 11/2005 |
| JP | 2009-123288 A | 6/2009 |
| JP | 2011-523487 A | 8/2011 |
| JP | 2020-140744 A | 9/2020 |
| JP | 2020-140746 A | 9/2020 |
| JP | 2021-034095 A | 3/2021 |
| JP | 2021-034114 A | 3/2021 |
| WO | 2009/136374 A2 | 11/2009 |
| WO | 2020/090785 A1 | 5/2020 |
| WO | 2021/033340 A1 | 2/2021 |
| WO | WO-2023053567 A1 * | 4/2023 |

\* cited by examiner

FIG. 18
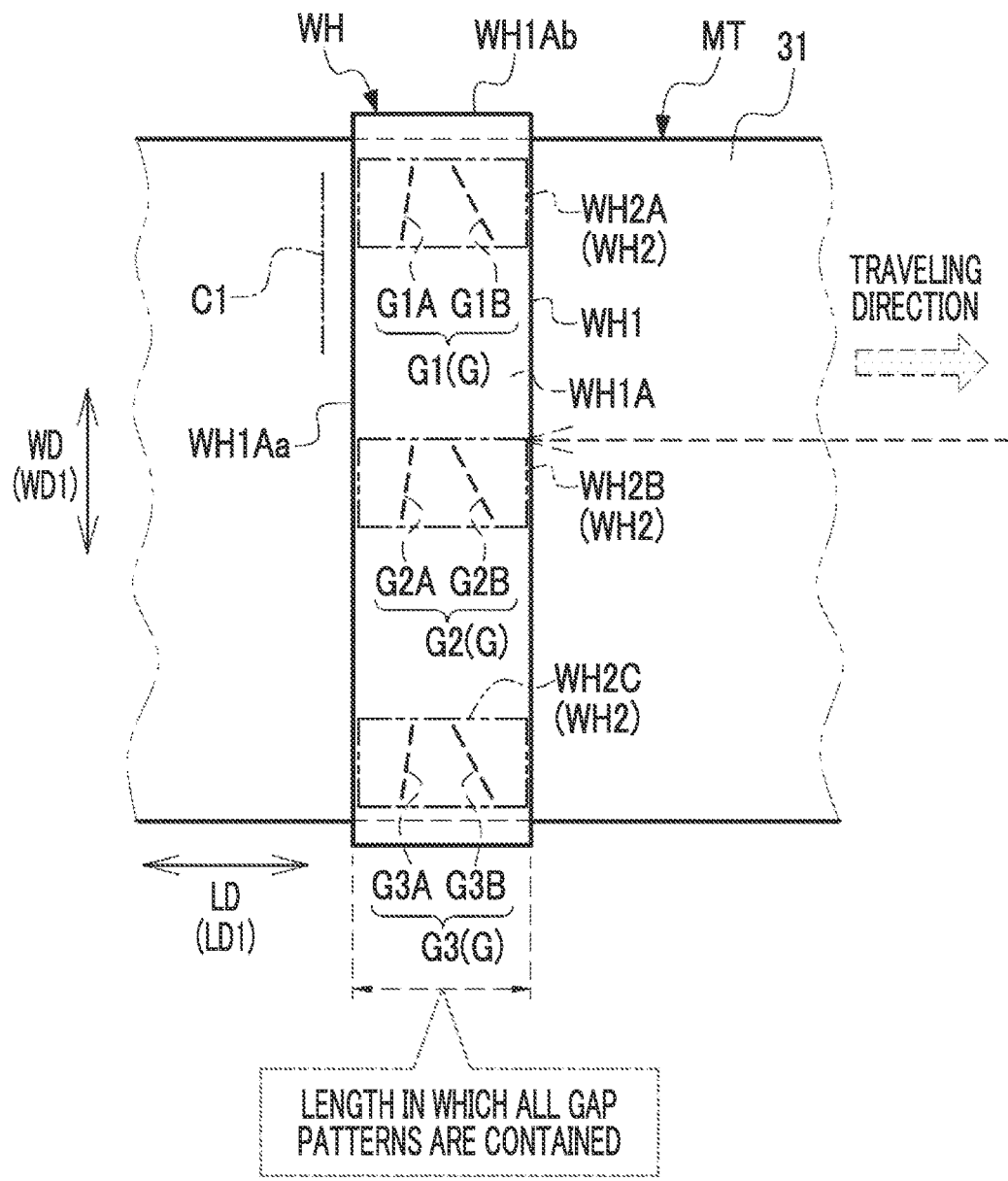
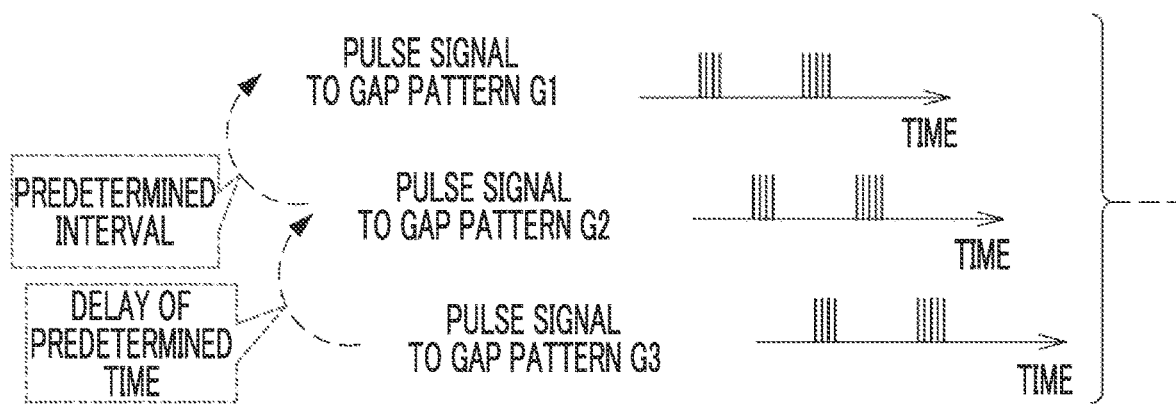

FIG. 27
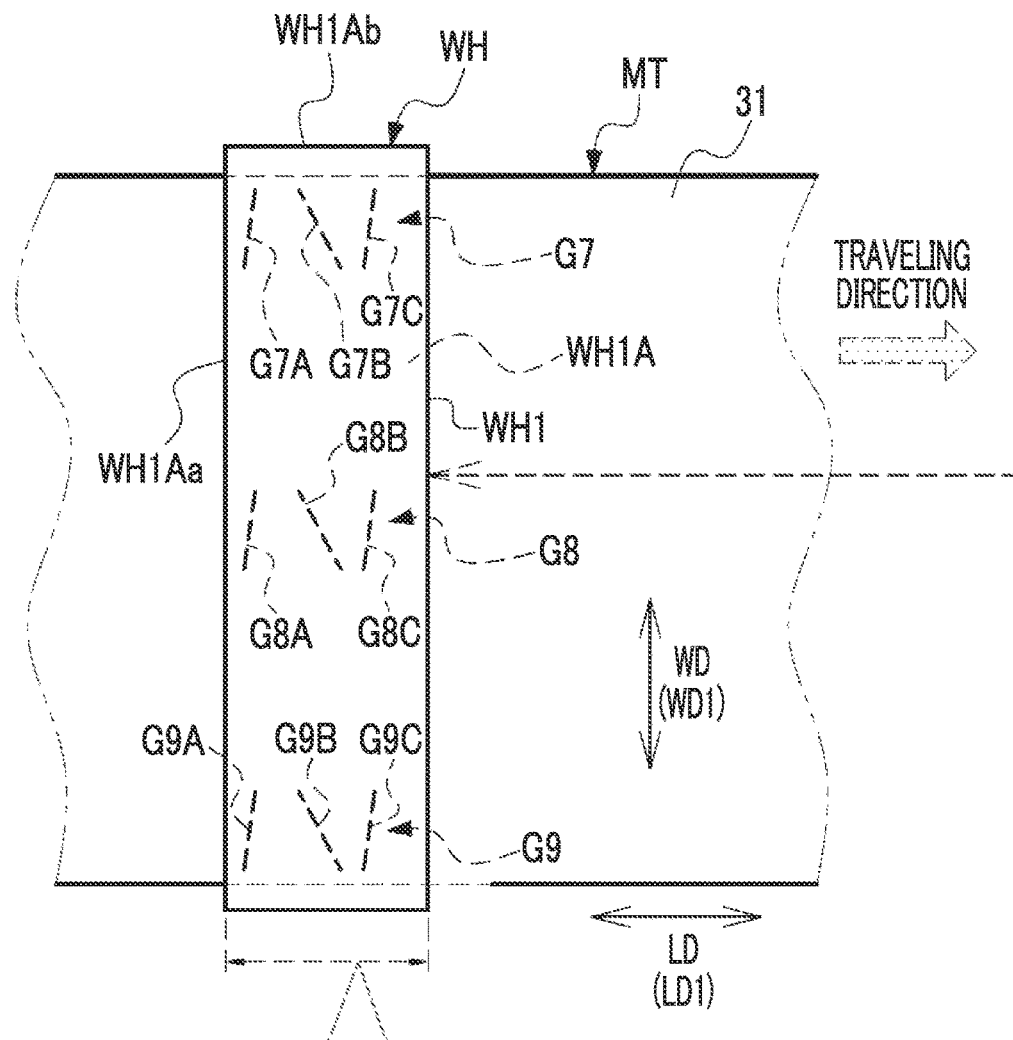
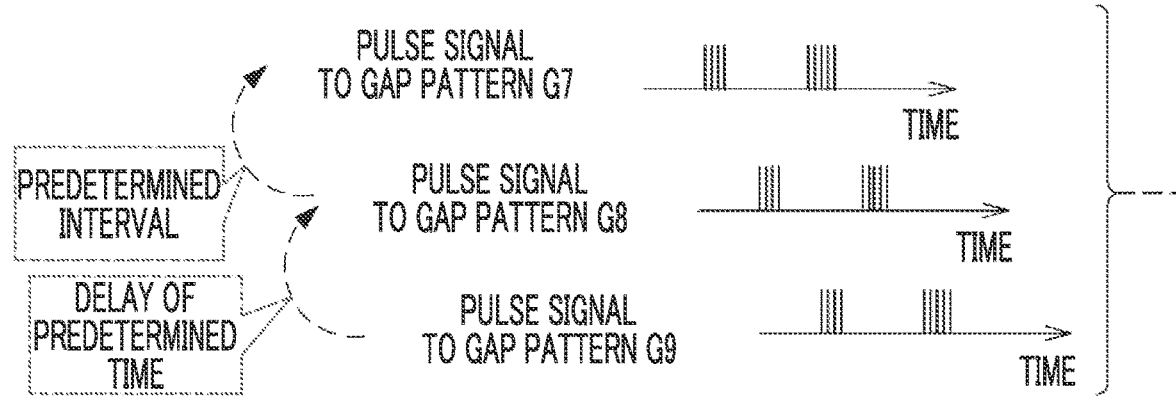

SERVO PATTERN RECORDING DEVICE, MAGNETIC TAPE, MAGNETIC TAPE CARTRIDGE, MAGNETIC TAPE DRIVE, MAGNETIC TAPE SYSTEM, DETECTION DEVICE, SERVO PATTERN RECORDING METHOD, AND MANUFACTURING METHOD OF MAGNETIC TAPE

CROSS-REFERENCE TO RELATED APPLICATIONS

This application claims priority from Japanese Patent Application No. 2021-160003, filed Sep. 29, 2021, and Japanese Patent Application No. 2022-075195, filed Apr. 28, 2022, the disclosures of which are incorporated herein by reference in their entireties.

BACKGROUND

Technical Field

The technology of the present disclosure relates to a servo pattern recording device, a magnetic tape, a magnetic tape cartridge, a magnetic tape drive, a magnetic tape system, a detection device, an inspection device, a servo pattern recording method, and a manufacturing method a detection method and an inspection method of a magnetic tape.

Related Art

U.S. Pat. No. 8,094,402B raises a problem in a magnetic tape device that a read and/or write error occurs in a case in which a tape does not pass through a head at appropriate tension and/or a skew angle. In order to solve this problem, a system disclosed in U.S. Pat. No. 8,094,402B includes a head having an array of at least one of a reader or a writer, a drive mechanism that causes a magnetic recording tape to pass on the head, and a skew induction mechanism bonded to the head, in which a skew angle of a vertical axis of the array with respect to a direction perpendicular to a direction in which the tape is moved on the head, and a controller that communicates with the head is adjusted. In addition, the system disclosed in U.S. Pat. No. 8,094,402B determines a tape dimension stable state of the tape, adjusts the skew angle in a direction away from a normal line with respect to a tape movement direction, and reduces the tension of the tape on the entire head in a case in which the tape dimension stable state is in a contraction state.

U.S. Pat. No. 6,781,784B discloses a method of performing reading by selectively using a reading element offset in a vertical direction with respect to a data track of a magnetic tape in which distortion in a lateral direction occurs. The reading element is a part of a tape head that has an azimuthal angle with respect to the tape and creates an offset in the lateral direction between the reading elements. The offset in the lateral direction is used to minimize the effects of the distortion of the tape in the lateral direction.

JP2009-123288A discloses a head device comprising a head unit on which a plurality of magnetic elements that each perform at least one of reproduction of data recorded in a plurality of data tracks provided in a magnetic tape or recording of data in each data track are arranged to be parallel on a first straight line at equal intervals, a moving mechanism that moves the head unit, and a controller that executes a tracking control of causing the magnetic elements to be on-tracked on the data tracks, respectively, by moving the head unit by the moving mechanism. In the head device disclosed in JP2009-123288A, the moving mechanism is configured to perform rotational movement of rotationally moving the head unit in an orientation of increasing or decreasing an angle formed by a second straight line along a width of the magnetic tape line and the first straight line, and, during the execution of the tracking control, the controller causes each magnetic element to be on-tracked on each data track by rotationally moving and driving the head unit by the moving mechanism by an increasing or decreasing amount of the angle in accordance with a change of an interval between the data tracks.

JP2000-260014A discloses a method of forming a servo track configuration, the method including a step of forming at least one servo track that has a width, and a recording step of repeatedly recording a servo pattern in the servo track, in which the recording step includes a step of repeating simultaneous recording of first and second reference pattern lines and a track pattern line in the servo track. Each of the first and second reference pattern lines has an identical predetermined geometry and extends across the width of the servo track, and further the track pattern line has a predetermined geometry that is different than the predetermined geometry of the first and second reference pattern lines and extends across the width of the servo track.

JP2020-140744A discloses a magnetic tape reading apparatus that includes an acquisition unit that acquires information on linearity of a servo pattern to be recorded on a servo band of a magnetic tape included in a magnetic tape cartridge from the magnetic tape cartridge, a reading element unit in which at least two reading elements each of which reads data by a linear scanning method from a specific track region including a reading target track in a track region included in the magnetic tape are disposed in a state of being adjacent to each other, a servo reading element that reads the servo pattern, a control unit that performs control of positioning the reading element unit by using a read signal of the servo pattern read by the servo reading element and the information on the linearity acquired by the acquisition unit, a derivation unit that derives a deviation amount between positions of the magnetic tape and the reading element unit by using the read signal of the servo pattern in a state where the control unit performs control, and an extraction unit that extracts data recorded on the reading target track from a reading result by performing a waveform equalization process to each reading result for the reading elements in accordance with the deviation amount derived by the derivation unit.

SUMMARY

One embodiment according to the technology of the present disclosure is to provide a servo pattern recording device, a magnetic tape, a magnetic tape cartridge, a magnetic tape drive, a magnetic tape system, a detection device, an inspection device, a servo pattern recording method, and a manufacturing method, a detection method and an inspection method of a magnetic tape capable of obtaining a servo signal having high reliability.

An first aspect according to the technology of the present disclosure relates to a servo pattern recording device comprising a pulse signal generator, and a servo pattern recording head, in which the pulse signal generator generates a pulse signal, the servo pattern recording head has a substrate and a plurality of gap patterns formed on a front surface of the substrate, and records a plurality of servo patterns in a width direction of a magnetic tape by applying a magnetic field to the magnetic tape from the plurality of gap patterns in response to the pulse signal, the plurality of gap patterns are formed on the front surface along a direction corresponding to the width direction, the gap patterns are at least one straight line region pair, a first straight line region, which is one straight line region of the straight line region pair, and a second straight line region, which is the other straight line region of the straight line region pair, are inclined in opposite directions with respect to a first imaginary straight line along the direction corresponding to the width direction on the front surface, the first straight line region has a steeper inclined angle with respect to the first imaginary straight line than the second straight line region, positions of both ends of the first straight line region and positions of both ends of the second straight line region are aligned in the direction corresponding to the width direction of the magnetic tape, positions of the plurality of gap patterns in a longitudinal direction of the magnetic tape are aligned on the front surface, and the pulse signal generator supplies the pulse signal with a delay of a predetermined time to each of the plurality of gap patterns from one side to the other side in a direction in which the plurality of gap patterns are arranged.

A second aspect according to the technology of the present disclosure relates to the servo pattern recording device according to the first aspect, in which the substrate is formed in a rectangular parallelepiped shape, and crosses the magnetic tape in a direction orthogonal to the longitudinal direction of the magnetic tape.

A third aspect according to the technology of the present disclosure relates to the servo pattern recording device according to the second aspect, in which the front surface is formed in a rectangular shape having a long side and a short side, and a length of the short side is a length in which the plurality of servo patterns are contained.

A fourth aspect according to the technology of the present disclosure relates to the servo pattern recording device according to the third aspect, in which the substrate is disposed on the magnetic tape in a posture in which an orientation of the long side and the longitudinal direction of the magnetic tape are orthogonal to each other.

A fifth aspect according to the technology of the present disclosure relates to the servo pattern recording device according to any one of the first to fourth aspects, in which a total length of the first straight line region is shorter than a total length of the second straight line region.

A sixth aspect according to the technology of the present disclosure relates to the servo pattern recording device according to any one of the first to fifth aspects, in which a geometrical characteristic of the straight line region pair on the front surface corresponds to a geometrical characteristic in which positions of both ends of one imaginary straight line region of a pair of imaginary straight line regions and positions of both ends of the other imaginary straight line region are aligned in the direction corresponding to the width direction in a case in which an entirety of the pair of imaginary straight line regions is inclined with respect to the first imaginary straight line by inclining, with respect to the first imaginary straight line, a symmetry axis of the pair of imaginary straight line regions inclined line-symmetrically with respect to the first imaginary straight line.

A seventh aspect according to the technology of the present disclosure relates to the servo pattern recording device according to any one of the first to sixth aspects, in which a plurality of servo bands are formed on the magnetic tape along the width direction, servo patterns corresponding to each other between the servo bands deviate from each other at a predetermined interval in the longitudinal direction of the magnetic tape, between the servo bands adjacent to each other in the width direction, and the predetermined time is determined in accordance with the predetermined interval.

An eighth aspect according to the technology of the present disclosure relates to the servo pattern recording device according to the seventh aspect, in which a plurality of servo bands are formed on the magnetic tape along the width direction, the servo bands are divided by a frame defined based on at least one set of the servo patterns, and the predetermined interval is defined based on an angle formed by the frames that have a correspondence relationship between the servo bands adjacent to each other in the width direction and the first imaginary straight line, and a pitch between the servo bands adjacent to each other in the width direction.

A ninth aspect according to the technology of the present disclosure relates to the servo pattern recording device according to the seventh aspect, in which a plurality of servo bands are formed on the magnetic tape along the width direction, the servo bands are divided by a frame defined based on at least one set of the servo patterns, and the predetermined interval is defined based on an angle formed by the frames that have no correspondence relationship between the servo bands adjacent to each other in the width direction and the first imaginary straight line, a pitch between the servo bands adjacent to each other in the width direction, and a total length of the frame in the longitudinal direction.

A tenth aspect according to the technology of the present disclosure relates to a magnetic tape in which the plurality of servo patterns are recorded by the servo pattern recording device according to any one of the first to ninth aspects.

An eleventh aspect according to the technology of the present disclosure relates to a magnetic tape cartridge comprising the magnetic tape according to the tenth aspect, and a case in which the magnetic tape is accommodated.

A twelfth aspect according to the technology of the present disclosure relates to a magnetic tape drive comprising a travel mechanism that causes the magnetic tape according to the tenth aspect to travel along a predetermined path, and a magnetic head including a plurality of servo reading elements that read the servo patterns on the predetermined path in a state in which the magnetic tape is caused to travel by the travel mechanism, in which the plurality of servo reading elements are arranged along the longitudinal direction of the magnetic head, and the magnetic head is disposed in a posture in which a second imaginary straight line along the longitudinal direction of the magnetic head is inclined with respect to a traveling direction of the magnetic tape.

A thirteenth aspect according to the technology of the present disclosure relates to a magnetic tape system comprising the magnetic tape according to the tenth aspect, and a magnetic tape drive on which a magnetic head including a plurality of servo reading elements that read the servo patterns on a predetermined path in a state in which the magnetic tape is caused to travel along the predetermined path is mounted, in which the plurality of servo reading elements are arranged along the longitudinal direction of the magnetic head, and the magnetic head is disposed in a posture in which a third imaginary straight line along the longitudinal direction of the magnetic head is inclined with respect to a traveling direction of the magnetic tape.

A fourteenth aspect according to the technology of the present disclosure relates to a detection device comprising a processor, in which the processor detects a servo signal, which is a result of reading the servo pattern by a servo reading element from the magnetic tape according to the tenth aspect, by using an autocorrelation coefficient.

A fifteenth aspect according to the technology of the present disclosure relates to a servo pattern recording method comprising generating a pulse signal, and recording, by the servo pattern recording head having a substrate and a plurality of gap patterns formed on a front surface of the substrate, a plurality of servo patterns in a width direction of a magnetic tape by applying a magnetic field to the magnetic tape from the plurality of gap patterns in response to the pulse signal, in which the plurality of gap patterns are formed on the front surface along a direction corresponding to the width direction, the gap patterns are at least one straight line region pair, a first straight line region, which is one straight line region of the straight line region pair, and a second straight line region, which is the other straight line region of the straight line region pair, are inclined in opposite directions with respect to a first imaginary straight line along the direction corresponding to the width direction on the front surface, the first straight line region has a steeper inclined angle with respect to the first imaginary straight line than the second straight line region, positions of both ends of the first straight line region and positions of both ends of the second straight line region are aligned in the direction corresponding to the width direction of the magnetic tape, positions of the plurality of gap patterns in a longitudinal direction of the magnetic tape are aligned on the front surface, and the servo pattern recording method further includes supplying the pulse signal with a delay of a predetermined time to each of the plurality of gap patterns from one side to the other side in a direction in which the plurality of gap patterns are arranged.

A sixteenth aspect according to the technology of the present disclosure relates to a manufacturing method of a magnetic tape, the method comprising recording the plurality of servo patterns in the magnetic tape according to the servo pattern recording method according to the fifteenth aspect, and winding the magnetic tape.

A seventeenth aspect according to the technology of the present disclosure relates to an inspection device including a detection device that is the detection device according to the fourteenth aspect and that is used together with the servo pattern recording device according to the first aspect, and an inspection processor that inspects a servo band on which the servo pattern is recorded in the magnetic tape based on the servo signal detected by the detection device.

A eighteenth aspect according to the technology of the present disclosure relates to a detection method used together with the servo pattern recording method according to the fifteenth aspect, the method including detecting a servo signal, which is a result obtained by reading the servo pattern by a servo reading element from the magnetic tape according to the tenth aspect, using an autocorrelation coefficient.

An nineteenth aspect according to the technology of the present disclosure relates to an inspection method including inspecting a servo band on which the servo pattern is recorded in the magnetic tape based on the servo signal detected by the detection method according to the eighteenth aspect.

BRIEF DESCRIPTION OF THE DRAWINGS

FIG. 18 is a conceptual diagram showing an example of an aspect in which a state in which the servo pattern recording head provided in the servo writer according to the embodiment is disposed on the magnetic tape is observed from the front surface side of the magnetic tape (that is, the rear surface side of the servo pattern recording head).

FIG. 27 is a conceptual diagram showing the second modification example of the servo pattern recording head provided in the servo writer according to the embodiment (conceptual diagram showing an example of an aspect in which a state in which the servo pattern recording head according to the second modification example is disposed on the magnetic tape is observed from the front surface side of the magnetic tape (that is, the rear surface side of the servo pattern recording head)).

DETAILED DESCRIPTION

In the following, examples of embodiments of a servo pattern recording device, a magnetic tape, a magnetic tape cartridge, a magnetic tape drive, a magnetic tape system, a detection device, an inspection device, a servo pattern recording method, and a manufacturing method, a detection method and an inspection method of a magnetic tape according to the technology of the present disclosure will be described with reference to the attached drawings.

First, the terms used in the following description will be described.

NVM refers to an abbreviation of "non-volatile memory". CPU refers to an abbreviation of "central processing unit". RAM refers to an abbreviation of "random access memory". EEPROM refers to an abbreviation of "electrically erasable and programmable read only memory". SSD refers to an abbreviation of "solid state drive". HDD refers to an abbreviation of "hard disk drive". ASIC refers to an abbreviation of "application specific integrated circuit". FPGA refers to an abbreviation of "field-programmable gate array". PLC is an abbreviation for "programmable logic controller". IC refers to an abbreviation of "integrated circuit". RFID refers to an abbreviation of "radio frequency identifier". BOT refers to an abbreviation of "beginning of tape". EOT refers to an abbreviation of "end of tape". UI refers to an abbreviation of "user interface". WAN refers to an abbreviation of "wide area network". LAN refers to an abbreviation of "local area network".

Figure 1:
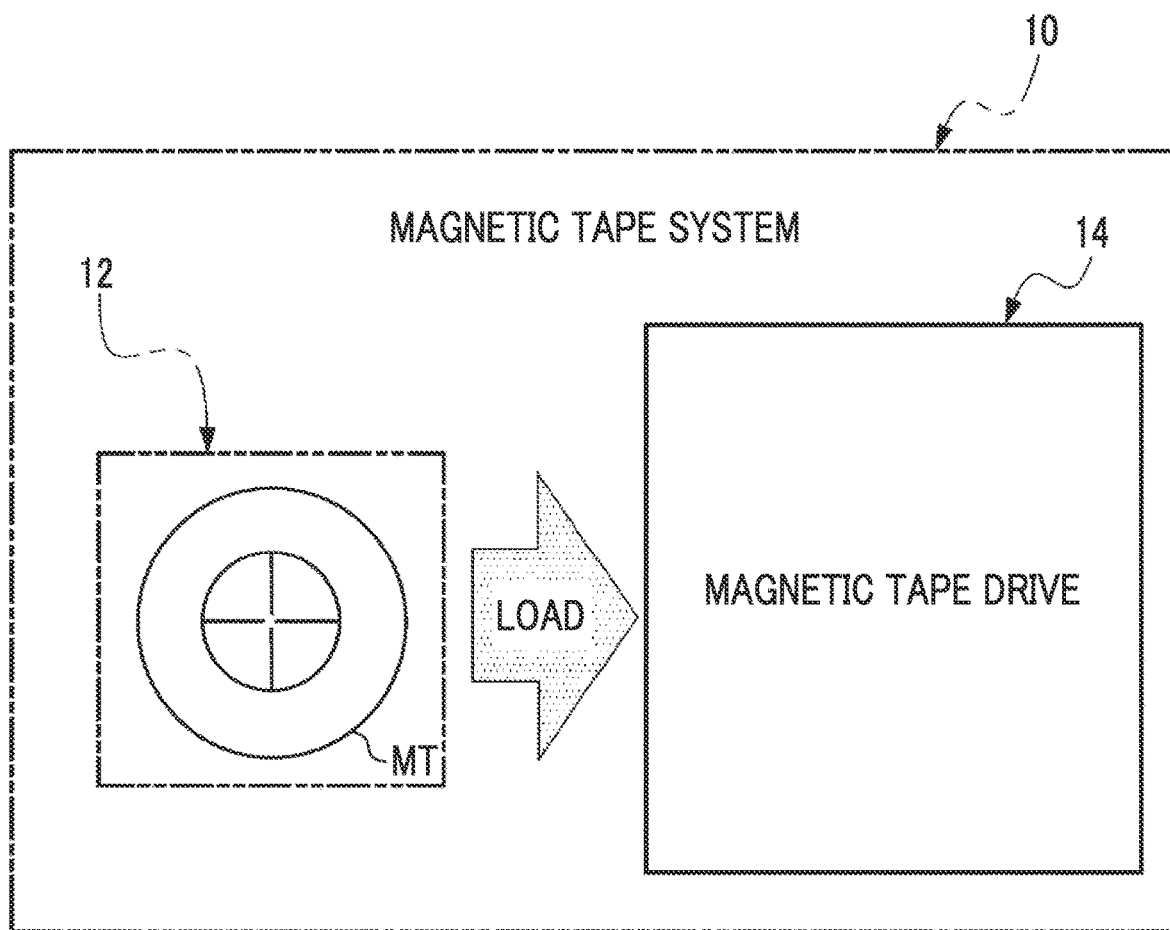
FIG. 1 is a block diagram showing an example of a configuration of a magnetic tape system according to an embodiment.

As an example, as shown in FIG. 1, a magnetic tape system 10 comprises a magnetic tape cartridge 12 and a magnetic tape drive 14. A magnetic tape cartridge 12 is loaded into the magnetic tape drive 14. The magnetic tape cartridge 12 accommodates a magnetic tape MT. The magnetic tape drive 14 pulls out the magnetic tape MT from the loaded magnetic tape cartridge 12, and records data in the magnetic tape MT and reads data from the magnetic tape MT while causing the pulled out magnetic tape MT to travel.

In the present embodiment, the magnetic tape MT is an example of a "magnetic tape" according to the technology of the present disclosure. In addition, in the present embodiment, the magnetic tape system 10 is an example of a "magnetic tape system" according to the technology of the present disclosure. In addition, in the present embodiment, the magnetic tape drive 14 is an example of a "magnetic tape drive" and a "detection device" according to the technology of the present disclosure. In addition, in the present embodiment, the magnetic tape cartridge 12 is an example of a "magnetic tape cartridge" according to the technology of the present disclosure.

Next, an example of a configuration of the magnetic tape cartridge 12 will be described with reference to FIGS. 2 to 4. It should be noted that, in the following description, for convenience of description, in FIGS. 2 to 4, a loading direction of the magnetic tape cartridge 12 into the magnetic tape drive 14 is indicated by an arrow A, a direction of the arrow A is defined as a front direction of the magnetic tape cartridge 12, and a side of the magnetic tape cartridge 12 in the front direction is defined as a front side of the magnetic tape cartridge 12. In the following description of the structure, "front" refers to the front side of the magnetic tape cartridge 12.

In addition, in the following description, for convenience of description, in FIGS. 2 to 4, a direction of an arrow B orthogonal to the direction of the arrow A is defined as a right direction, and a side of the magnetic tape cartridge 12 in the right direction is defined as a right side of the magnetic tape cartridge 12. In the following description of the structure, "right" refers to the right side of the magnetic tape cartridge 12.

In addition, in the following description, for convenience of description, in FIGS. 2 to 4, a direction opposite to the direction of the arrow B is defined as a left direction, and a side of the magnetic tape cartridge 12 in the left direction is defined as a left side of the magnetic tape cartridge 12. In the following description of the structure, "left" refers to the left side of the magnetic tape cartridge 12.

In addition, in the following description, for convenience of description, in FIGS. 2 to 4, a direction orthogonal to the direction of the arrow A and the direction of the arrow B is indicated by an arrow C, a direction of the arrow C is defined as an upper direction of the magnetic tape cartridge 12, and a side of the magnetic tape cartridge 12 in the upper direction is defined as an upper side of the magnetic tape cartridge 12. In the following description of the structure, "upper" refers to the upper side of the magnetic tape cartridge 12.

In addition, in the following description, for convenience of description, in FIGS. 2 to 4, a direction opposite to the front direction of the magnetic tape cartridge 12 is defined as a rear direction of the magnetic tape cartridge 12, and a side of the magnetic tape cartridge 12 in the rear direction is defined as a rear side of the magnetic tape cartridge 12. In the following description of the structure, "rear" refers to the rear side of the magnetic tape cartridge 12.

In addition, in the following description, for convenience of description, in FIGS. 2 to 4, a direction opposite to the upper direction of the magnetic tape cartridge 12 is defined as a lower direction of the magnetic tape cartridge 12, and a side of the magnetic tape cartridge 12 in the lower direction is defined as a lower side of the magnetic tape cartridge 12. In the following description of the structure, "lower" refers to the lower side of the magnetic tape cartridge 12.

Figure 2:
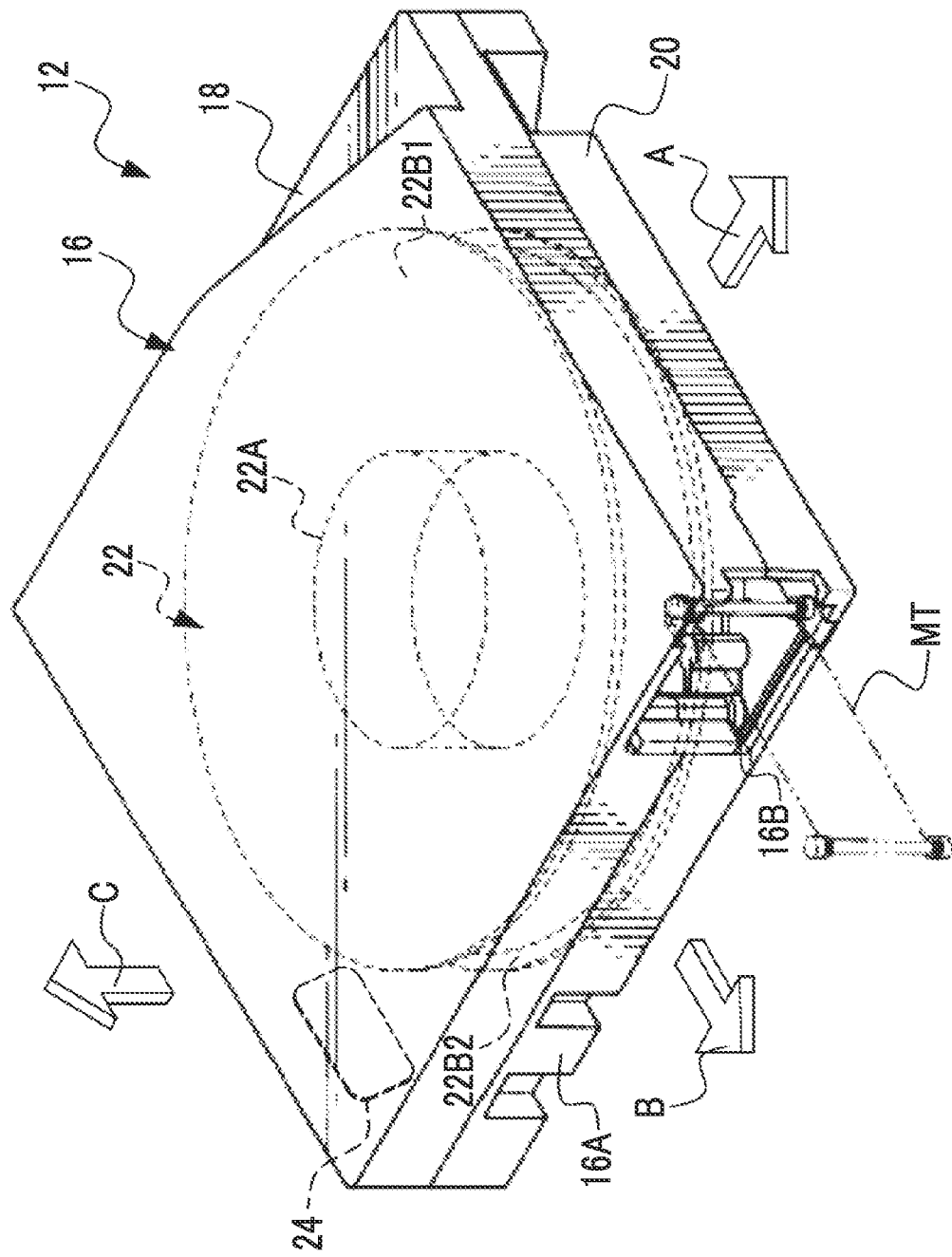
FIG. 2 is a schematic perspective view of an example of an appearance of a magnetic tape cartridge according to the embodiment.

As an example, as shown in FIG. 2, the magnetic tape cartridge 12 has a substantially rectangular shape in a plan view, and comprises a box-shaped case 16. The case 16 is an example of a "case" according to the technology of the present disclosure. The magnetic tape MT is accommodated in the case 16. The case 16 is made of resin, such as polycarbonate, and comprises an upper case 18 and a lower case 20. The upper case 18 and the lower case 20 are bonded by welding (for example, ultrasound welding) and screwing in a state in which a lower peripheral edge surface of the upper case 18 and an upper peripheral edge surface of the lower case 20 are brought into contact with each other. The bonding method is not limited to welding and screwing, and other bonding methods may be used.

A sending reel 22 is rotatably accommodated inside the case 16. The sending reel 22 comprises a reel hub 22A, an upper flange 22B1, and a lower flange 22B2. The reel hub 22A is formed in a cylindrical shape. The reel hub 22A is a shaft center portion of the sending reel 22, has a shaft center direction along an up-down direction of the case 16, and is disposed in a center portion of the case 16. Each of the upper flange 22B1 and the lower flange 22B2 is formed in an annular shape. A center portion of the upper flange 22B1 in a plan view is fixed to an upper end portion of the reel hub 22A, and a center portion of the lower flange 22B2 in a plan view is fixed to a lower end portion of the reel hub 22A. It should be noted that the reel hub 22A and the lower flange 22B2 may be integrally molded.

The magnetic tape MT is wound around an outer peripheral surface of the reel hub 22A, and an end portion of the magnetic tape MT in a width direction is held by the upper flange 22B1 and the lower flange 22B2.

An opening 16B is formed on a front side of a right wall 16A of the case 16. The magnetic tape MT is pulled out from the opening 16B.

A cartridge memory 24 is provided in the lower case 20. Specifically, the cartridge memory 24 is accommodated in a right rear end portion of the lower case 20. An IC chip including an NVM is mounted on the cartridge memory 24. In the present embodiment, a so-called passive RFID tag is adopted as the cartridge memory 24, and the read/write of various pieces information is performed with respect to the cartridge memory 24 in a noncontact manner.

The cartridge memory 24 stores management information for managing the magnetic tape cartridge 12. Examples of the management information include information on the cartridge memory 24 (for example, information for specifying the magnetic tape cartridge 12), information on the magnetic tape MT (for example, information indicating a recording capacity of the magnetic tape MT, information indicating an outline of the data recorded in the magnetic tape MT, information indicating items of the data recorded in the magnetic tape MT, and information indicating a recording format of the data recorded in the magnetic tape MT), and information on the magnetic tape drive 14 (for example, information indicating a specification of the magnetic tape drive 14 and a signal used in the magnetic tape drive 14).

Figure 3:
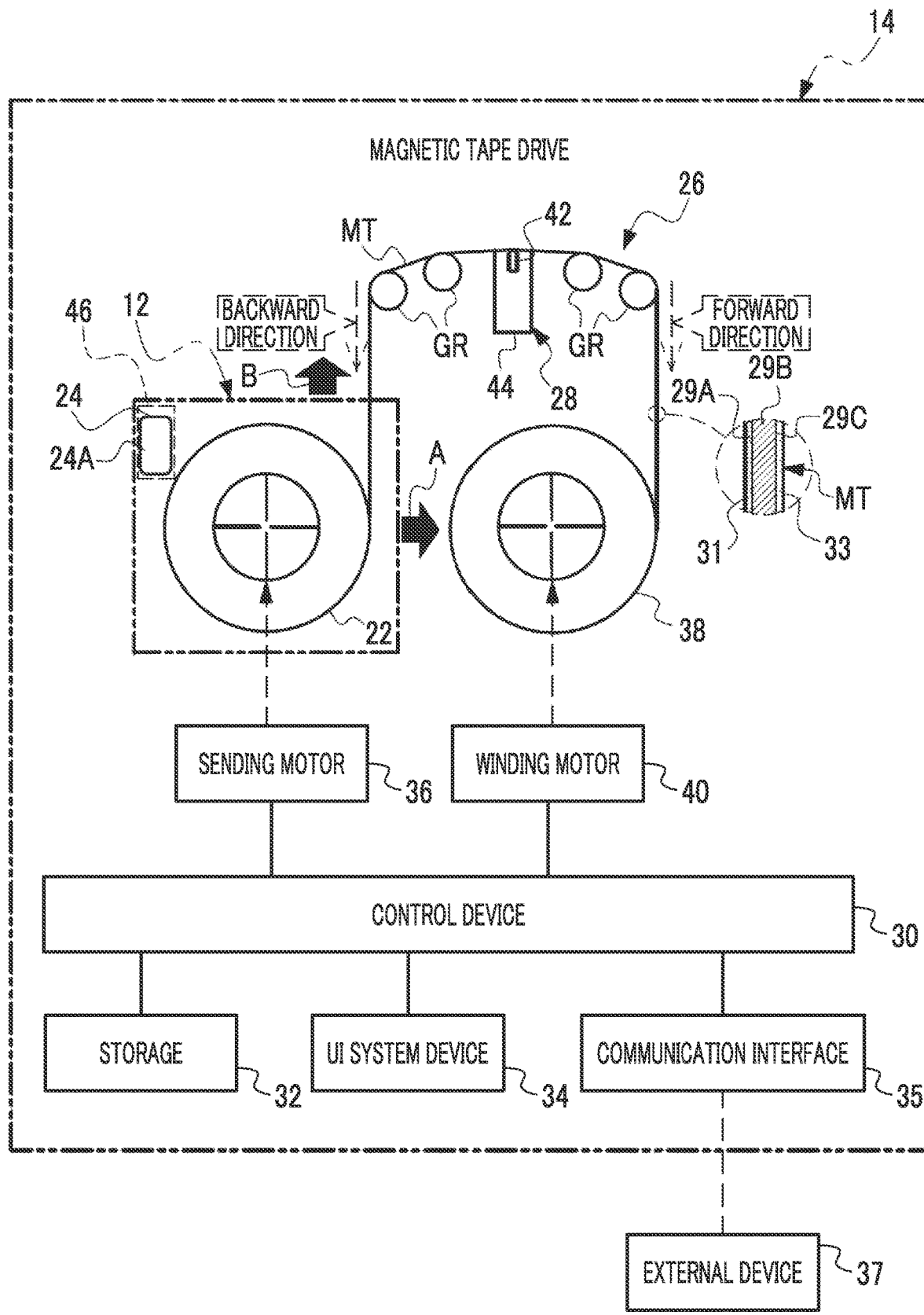
FIG. 3 is a schematic configuration diagram showing an example of a hardware configuration of a magnetic tape drive according to the embodiment.

As an example, as shown in FIG. 3, the magnetic tape drive 14 comprises a transport device 26, a magnetic head 28, a control device 30, a storage 32, a UI system device 34, and a communication interface 35. The magnetic tape drive 14 is loaded into the magnetic tape cartridge 12 along the direction of the arrow A. In the magnetic tape drive 14, the magnetic tape MT is pulled out from the magnetic tape cartridge 12 and used.

The magnetic tape MT has a magnetic layer 29A, a base film 29B, and a back coating layer 29C. The magnetic layer 29A is formed on one surface side of the base film 29B, and the back coating layer 29C is formed on the other surface side of the base film 29B. The data is recorded in the magnetic layer 29A. The magnetic layer 29A contains ferromagnetic powder. As the ferromagnetic powder, for example, ferromagnetic powder generally used in the magnetic layer of various magnetic recording media is used. Preferable specific examples of the ferromagnetic powder include hexagonal ferrite powder. Examples of the hexagonal ferrite powder include hexagonal strontium ferrite powder and hexagonal barium ferrite powder. The back coating layer 29C is a layer containing non-magnetic powder, such as carbon black. The base film 29B is also referred to as a support, and is made of, for example, polyethylene terephthalate, polyethylene naphthalate, or polyamide. It should be noted that a non-magnetic layer may be formed between the base film 29B and the magnetic layer 29A. In the magnetic tape MT, a surface on which the magnetic layer 29A is formed is a front surface 31 of the magnetic tape MT, and a surface on which the back coating layer 29C is formed is a back surface 33 of the magnetic tape MT.

The magnetic tape drive 14 performs magnetic processing on the front surface 31 of the magnetic tape MT by using the magnetic head 28. Here, the magnetic processing refers to recording the data in the front surface 31 of the magnetic tape MT and reading the data (that is, reproducing the data) from the front surface 31 of the magnetic tape MT. In the present embodiment, the magnetic tape drive 14 selectively records the data in the front surface 31 of the magnetic tape MT and reads the data from the front surface 31 of the magnetic tape MT by using the magnetic head 28. That is, the magnetic tape drive 14 is a device that pulls out the magnetic tape MT from the magnetic tape cartridge 12, records the data in the front surface 31 of the pulled out magnetic tape MT by using the magnetic head 28, or reads the data from the front surface 31 of the pulled out magnetic tape MT by using the magnetic head 28.

The control device 30 controls the entire magnetic tape drive 14. In the present embodiment, although the control device 30 is realized by an ASIC, the technology of the present disclosure is not limited to this. For example, the control device 30 may be realized by an FPGA and/or a PLC. In addition, the control device 30 may be realized by the computer including a CPU, a flash memory (for example, an EEPROM and/or an SSD), and a RAM. In addition, the control device 30 may be realized by combining two or more of an ASIC, an FPGA, a PLC, and a computer. That is, the control device 30 may be realized by a combination of a hardware configuration and a software configuration. It should be noted that the control device 30 is an example of a "processor" according to the technology of the present disclosure.

The storage 32 is connected to the control device 30, and the control device 30 writes various pieces of information to the storage 32 and reads out various pieces of information from the storage 32. Examples of the storage 32 include a flash memory and/or an HDD. The flash memory and the HDD are merely examples, and any memory may be used as long as the memory is a non-volatile memory that can be mounted on the magnetic tape drive 14.

The UI system device 34 is a device having the reception function of receiving a command signal indicating a command from a user and the presentation function of presenting the information to the user. The reception function is realized by a touch panel, a hard key (for example, a keyboard), and/or a mouse, for example. The presentation function is realized by a display, a printer, and/or a speaker, for example. The UI system device 34 is connected to the control device 30. The control device 30 acquires the command signal received by the UI system device 34. The UI system device 34 presents various pieces of information to the user under the control of the control device 30.

The communication interface 35 is connected to the control device 30. In addition, the communication interface 35 is connected to an external device 37 via a communication network (not shown), such as a WAN and/or a LAN. The communication interface 35 controls the exchange of various pieces of information (for example, the data to be recorded in the magnetic tape MT, the data read from the magnetic tape MT, and/or a command signal given to the control device 30) between the control device 30 and the external device 37. It should be noted that examples of the external device 37 include a personal computer and a mainframe.

The transport device 26 is a device that selectively transports the magnetic tape MT along a predetermined path in a forward direction and a backward direction, and comprises a sending motor 36, a winding reel 38, a winding motor 40, and a plurality of guide rollers GR. It should be noted that, here, the forward direction refers to a sending direction of the magnetic tape MT, and the backward direction refers to a rewinding direction of the magnetic tape MT. In the present embodiment, the transport device 26 is an example of a "travel mechanism" according to the technology of the present disclosure.

The sending motor 36 rotates the sending reel 22 in the magnetic tape cartridge 12 under the control of the control device 30. The control device 30 controls the sending motor 36 to control a rotation direction, a rotation speed, a rotation torque, and the like of the sending reel 22.

The winding motor 40 rotates the winding reel 38 under the control of the control device 30. The control device 30 controls the winding motor 40 to control a rotation direction, a rotation speed, a rotation torque, and the like of the winding reel 38.

In a case in which the magnetic tape MT is wound by the winding reel 38, the control device 30 rotates the sending motor 36 and the winding motor 40 such that the magnetic tape MT travels along the predetermined path in the forward direction. The rotation speed, the rotation torque, and the like of the sending motor 36 and the winding motor 40 are adjusted in accordance with a speed at which the magnetic tape MT is wound around the winding reel 38. In addition, by adjusting the rotation speed, the rotation torque, and the like of each of the sending motor 36 and the winding motor 40 by the control device 30, the tension is applied to the magnetic tape MT. In addition, the tension applied to the magnetic tape MT is controlled by adjusting the rotation speed, the rotation torque, and the like of each of the sending motor 36 and the winding motor 40 by the control device 30.

It should be noted that, in a case in which the magnetic tape MT is rewound to the sending reel 22, the control device 30 rotates the sending motor 36 and the winding motor 40 such that the magnetic tape MT travels along the predetermined path in the backward direction.

In the present embodiment, the tension applied to the magnetic tape MT is controlled by controlling the rotation speed, the rotation torque, and the like of the sending motor 36 and the winding motor 40, but the technology of the present disclosure is not limited to this. For example, the tension applied to the magnetic tape MT may be controlled by using a dancer roller, or may be controlled by drawing the magnetic tape MT into a vacuum chamber.

Each of the plurality of guide rollers GR is a roller which guides the magnetic tape MT. The predetermined path, that is, a traveling path of the magnetic tape MT is determined by separately disposing the plurality of guide rollers GR at positions straddling the magnetic head 28 between the magnetic tape cartridge 12 and the winding reel 38.

The magnetic head 28 comprises a magnetic element unit 42 and a holder 44. The magnetic element unit 42 is held by the holder 44 to come into contact with the traveling magnetic tape MT. The magnetic element unit 42 includes a plurality of magnetic elements.

The magnetic element unit 42 records the data in the magnetic tape MT transported by the transport device 26, and reads the data from the magnetic tape MT transported by the transport device 26. Here, the data refers to, for example, a servo pattern 58 (see FIG. 9) and the data other than the servo pattern 58, that is, the data recorded in the data band DB (see FIG. 9).

The magnetic tape drive 14 comprises a noncontact read/write device 46. The noncontact read/write device 46 is disposed to face a back surface 24A of the cartridge memory 24 on the lower side of the magnetic tape cartridge 12 in a state in which the magnetic tape cartridge 12 is loaded, and performs the read/write of the information with respect to the cartridge memory 24 in a noncontact manner.

Figure 4:
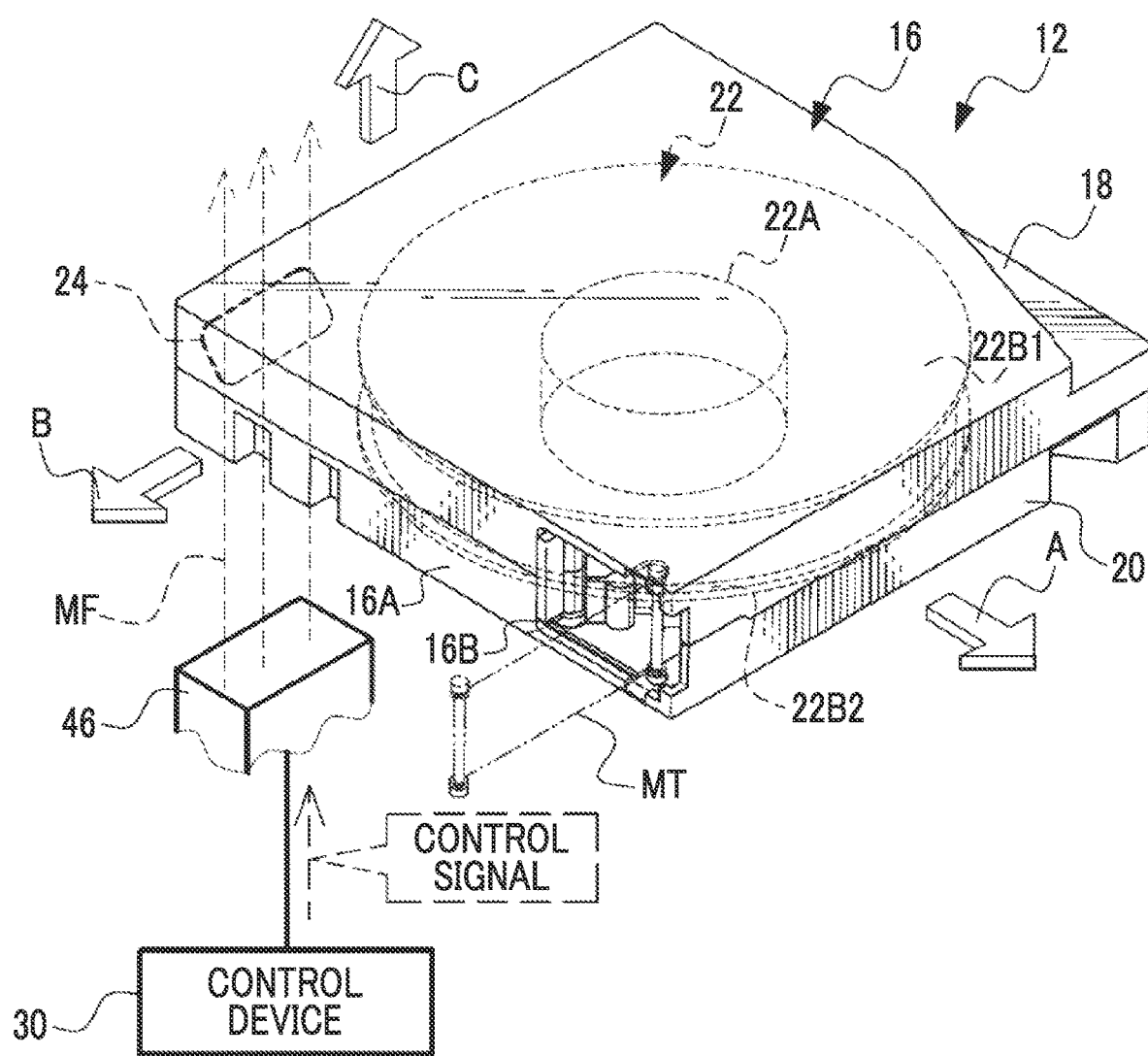
FIG. 4 is a schematic perspective view showing an example of an aspect in which a magnetic field is released by a noncontact read/write device from a lower side of the magnetic tape cartridge according to the embodiment.

As an example, as shown in FIG. 4, the noncontact read/write device 46 releases a magnetic field MF from the lower side of the magnetic tape cartridge 12 toward the cartridge memory 24. The magnetic field MF passes through the cartridge memory 24.

The noncontact read/write device 46 is connected to the control device 30. The control device 30 outputs a control signal to the noncontact read/write device 46. The control signal is a signal for controlling the cartridge memory 24. The noncontact read/write device 46 generates the magnetic field MF in response to the control signal input from the control device 30, and releases the generated magnetic field MF toward the cartridge memory 24.

The noncontact read/write device 46 performs noncontact communication with the cartridge memory 24 via the magnetic field MF to perform processing on the cartridge memory 24 in response to the control signal. For example, the noncontact read/write device 46 selectively performs, under the control of the control device 30, processing of reading the information from the cartridge memory 24 and processing of storing the information in the cartridge memory 24 (that is, processing of writing the information to the cartridge memory 24).

Figure 5:
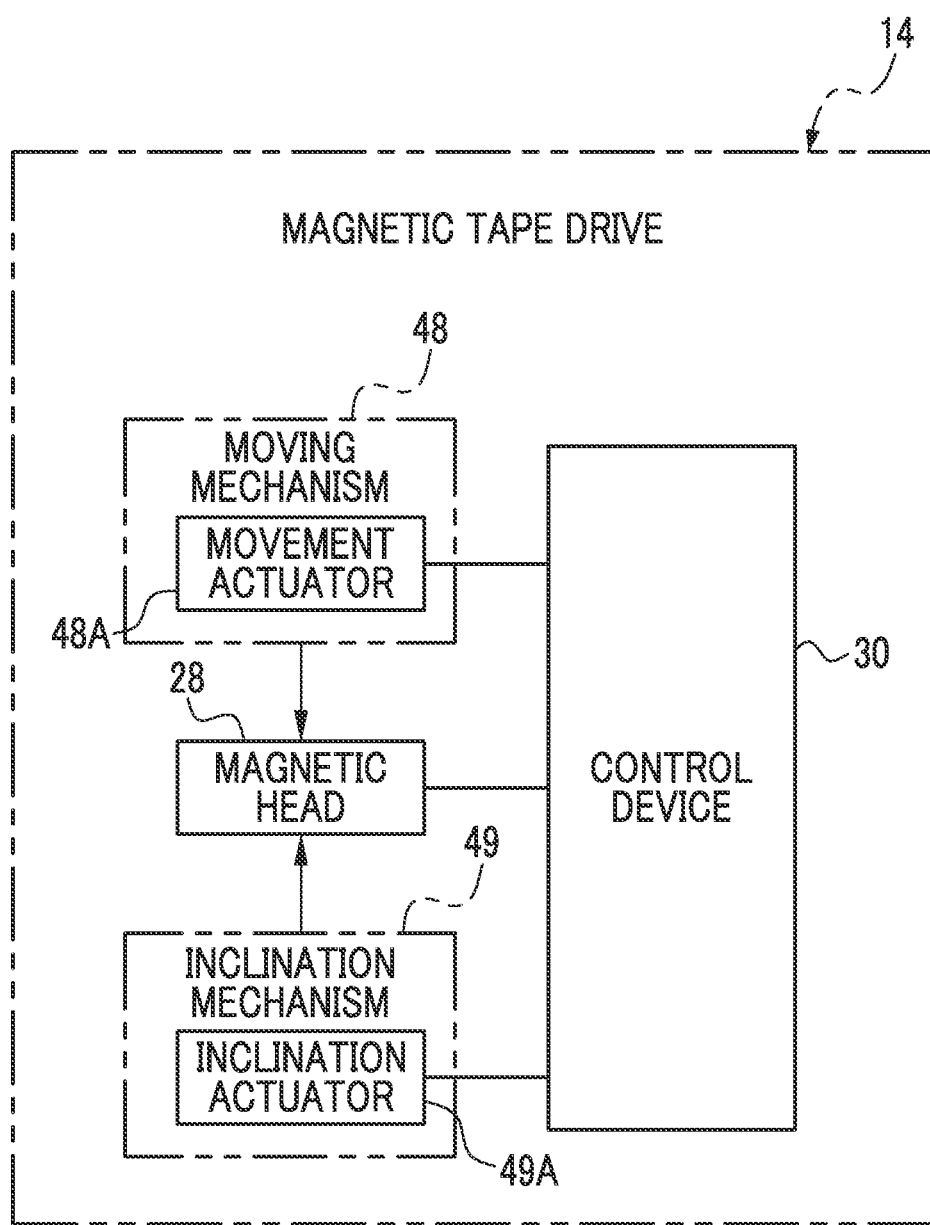
FIG. 5 is a schematic configuration diagram showing an example of the hardware configuration of the magnetic tape drive according to the embodiment.

As an example, as shown in FIG. 5, the magnetic tape drive 14 comprises a moving mechanism 48. The moving mechanism 48 includes a movement actuator 48A. Examples of the movement actuator 48A include a voice coil motor and/or a piezo actuator. The movement actuator 48A is connected to the control device 30, and the control device 30 controls the movement actuator 48A. The movement actuator 48A generates power under the control of the control device 30. The moving mechanism 48 moves the magnetic head 28 in the width direction of the magnetic tape MT by receiving the power generated by the movement actuator 48A.

The magnetic tape drive 14 comprises an inclination mechanism 49. The inclination mechanism 49 includes an inclination actuator 49A. Examples of the inclination actuator 49A include a voice coil motor and/or a piezo actuator. The inclination actuator 49A is connected to the control device 30, and the control device 30 controls the inclination actuator 49A. The inclination actuator 49A generates power under the control of the control device 30. The inclination mechanism 49 inclines the magnetic head 28 to a longitudinal direction LD side of the magnetic tape MT with respect to a width direction WD by receiving the power generated by the inclination actuator 49A (see FIG. 8). That is, the magnetic head 28 is skewed on the magnetic tape MT under the control of the control device 30.

Here, as a comparative example with respect to the magnetic tape MT, a case in which a known magnetic tape MT0 in the related art is used instead of the magnetic tape MT will be described with reference to FIGS. 6 to 8. It should be noted that, in a case in which the magnetic tape MT0 and the magnetic tape MT are compared, there is a difference in that the servo pattern 52 (see FIG. 6) is applied to the magnetic tape MT0, whereas the servo pattern 58 (FIG. 9) is applied to the magnetic tape MT.

Figure 6:
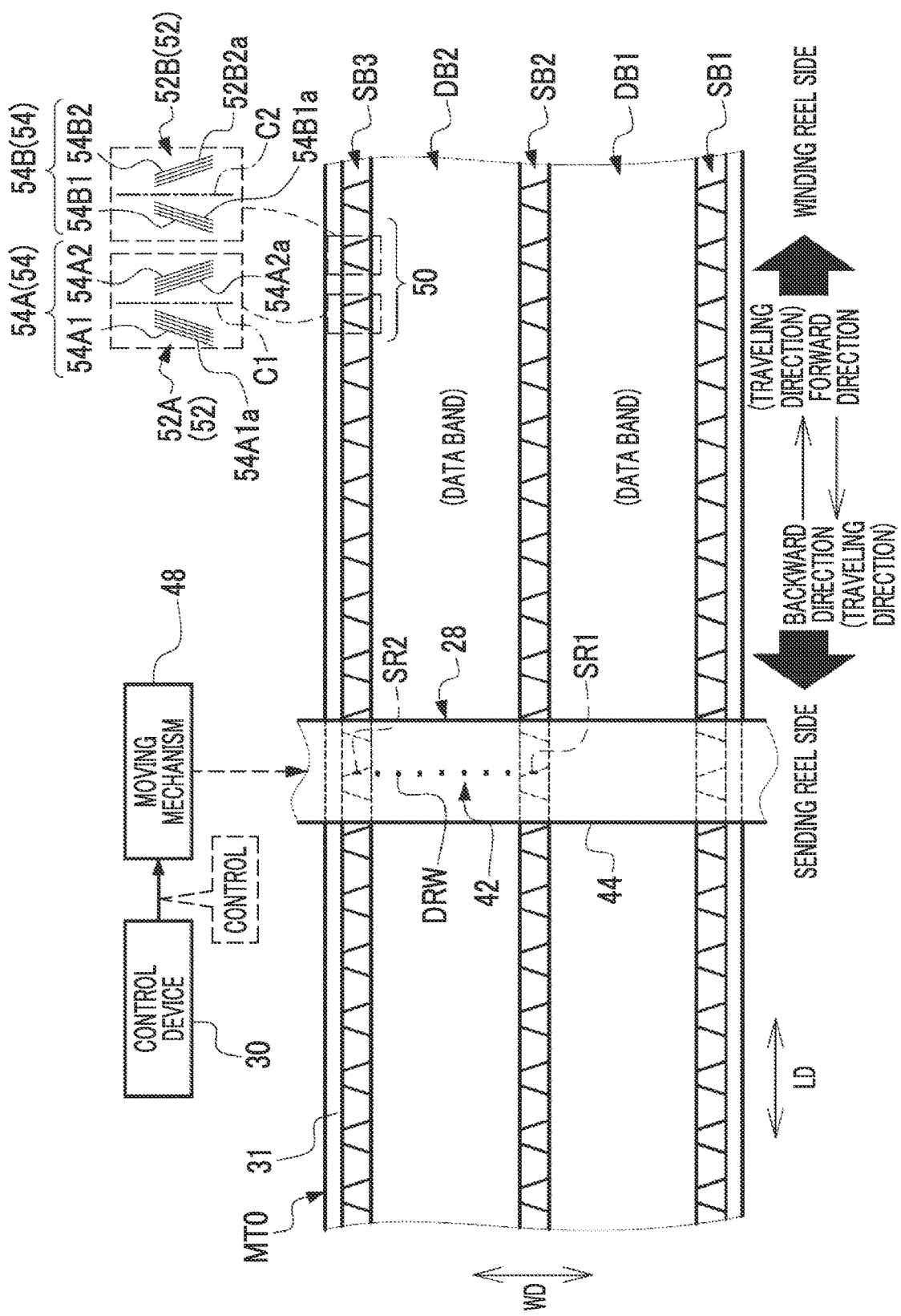
FIG. 6 is a conceptual diagram showing an example of an aspect in which a state in which a magnetic head is disposed on a known magnetic tape in the related art is observed from a front surface side of the magnetic tape.

As an example, as shown in FIG. 6, on the front surface 31 of the magnetic tape MT0, servo bands SB1, SB2, and SB3 are data bands DB1 and DB2 are formed. It should be noted that, in the following, for convenience of description, in a case in which the distinction is not specifically needed, the servo bands SB1 to SB3 are referred to as a servo band SB, and the data bands DB1 and DB2 are referred to as a data band DB.

The servo bands SB1 to SB3 and the data bands DB1 and DB2 are formed along the longitudinal direction LD (that is, a total length direction) of the magnetic tape MT0. Here, the total length direction of the magnetic tape MT0 refers to the traveling direction of the magnetic tape MT0, in other words. The traveling direction of the magnetic tape MT0 is defined in two directions of the forward direction which is a direction in which the magnetic tape MT0 travels from the sending reel 22 side to the winding reel 38 side (hereinafter, also simply referred to as "forward direction"), and the backward direction which is a direction in which the magnetic tape MT0 travels from the winding reel 38 side to the sending reel 22 side (hereinafter, also simply referred to as "backward direction").

The servo bands SB1 to SB3 are arranged at positions spaced in the width direction WD of the magnetic tape MT0 (hereinafter, also simply referred to as "width direction WD"). For example, the servo bands SB1 to SB3 are arranged at equal intervals along the width direction WD. It should be noted that, in the present embodiment, "equal interval" refers to the equal interval in the sense of including an error generally allowed in the technical field to which the technology of the present disclosure belongs, which is the error to the extent that it does not contradict the purpose of the technology of the present disclosure, in addition to the exact equal interval.

The data band DB1 is disposed between the servo band SB1 and the servo band SB2, and the data band DB2 is disposed between a servo band SB2 and a servo band SB3. That is, the servo bands SB and the data bands DB are arranged alternately along the width direction WD.

It should be noted that, in the example shown in FIG. 6, for convenience of description, three servo bands SB and two data bands DB are shown, but these are merely examples, and two servo bands SB and one data band DB may be used, and the technology of the present disclosure is established even in a case in which four or more servo bands SB and three or more data bands DB are used.

A plurality of servo patterns 52 are recorded in the servo band SB along the longitudinal direction of the magnetic tape MT0. The servo patterns 52 are classified into a servo pattern 52A and a servo pattern 52B. The plurality of servo patterns 52 are disposed at regular intervals along the longitudinal direction of the magnetic tape MT0. It should be noted that, in the present embodiment, "regular" refers to the regularity in the sense of including an error generally allowed in the technical field to which the technology of the present disclosure belongs, which is the error to the extent that it does not contradict the purpose of the technology of the present disclosure, in addition to the exact regularity.

The servo band SB is divided by a plurality of frames 50 along the longitudinal direction of the magnetic tape MT0. The frame 50 is defined by one set of servo patterns 52. In the example shown in FIG. 6, the servo patterns 52A and 52B are shown as an example of the set of servo patterns 52. The servo patterns 52A and 52B are adjacent to each other along the longitudinal direction of the magnetic tape MT0, and the servo pattern 52A is positioned on the upstream side in the forward direction in the frame 50, and the servo pattern 52B is positioned on the downstream side in the forward direction.

The servo pattern 52 consists of a linear magnetization region pair 54. The linear magnetization region pair 54 is classified into a linear magnetization region pair 54A and a linear magnetization region pair 54B.

The servo pattern 52A consists of the linear magnetization region pair 54A. In the example shown in FIG. 6, linear magnetization regions 54A1 and 54A2 are shown as an example of the linear magnetization region pair 54A. Each of the linear magnetization regions 54A1 and 54A2 is a linearly magnetized region.

The linear magnetization regions 54A1 and 54A2 are inclined in opposite directions with respect to an imaginary straight line C1 which is an imaginary straight line along the width direction WD. In the example shown in FIG. 6, the linear magnetization regions 54A1 and 54A2 are inclined line-symmetrically with respect to the imaginary straight line C1. More specifically, the linear magnetization regions 54A1 and 54A2 are formed in a state of being not parallel to each other and being inclined at a predetermined angle (for example, 5 degrees) in opposite directions on the longitudinal direction side of the magnetic tape MT0 with the imaginary straight line C1 as the symmetry axis. In the present embodiment, the imaginary straight line C1 is an example of a "first imaginary straight line" according to the technology of the present disclosure.

The linear magnetization region 54A1 is a set of magnetization straight lines 54A1*a*, which are five magnetized straight lines. The linear magnetization region 54A2 is a set of magnetization straight lines 54A2*a*, which are five magnetized straight lines.

The servo pattern 52B consists of the linear magnetization region pair 54B. In the example shown in FIG. 6, linear magnetization regions 54B1 and 54B2 are shown as an example of the linear magnetization region pair 54B. Each of the linear magnetization regions 54B1 and 54B2 is a linearly magnetized region.

The linear magnetization regions 54B1 and 54B2 are inclined in opposite directions with respect to an imaginary straight line C2 which is an imaginary straight line along the width direction WD. In the example shown in FIG. 6, the linear magnetization regions 54B1 and 54B2 are inclined line-symmetrically with respect to the imaginary straight line C2. More specifically, the linear magnetization regions 54B1 and 54B2 are formed in a state of being not parallel to each other and being inclined at a predetermined angle (for example, 5 degrees) in opposite directions on the longitudinal direction side of the magnetic tape MT0 with the imaginary straight line C2 as the symmetry axis. In the present embodiment, the imaginary straight line C2 is an example of a "first imaginary straight line" according to the technology of the present disclosure.

The linear magnetization region 54B1 is a set of magnetization straight lines 54B1*a*, which are four magnetized straight lines. The linear magnetization region 54B2 is a set of magnetization straight lines 54B2*a*, which are four magnetized straight lines.

The magnetic head 28 is disposed on the front surface 31 side of the magnetic tape MT0 configured as described above. The holder 44 is formed in a rectangular parallelepiped shape, and is disposed to cross the front surface 31 of the magnetic tape MT0 along the width direction WD. The plurality of magnetic elements of the magnetic element unit 42 are arranged in a straight line along the longitudinal direction of the holder 44. The magnetic element unit 42 has a pair of servo reading elements SR and a plurality of data read/write elements DRW as the plurality of magnetic elements. A length of the holder 44 in the longitudinal direction is sufficiently long with respect to the width of the magnetic tape MT0. For example, the length of the holder 44 in the longitudinal direction is set to a length exceeding the width of the magnetic tape MT0 even in a case in which the magnetic element unit 42 is disposed at any position on the magnetic tape MT.

The pair of servo reading elements SR consists of servo reading elements SR1 and SR2. The servo reading element SR1 is disposed at one end of the magnetic element unit 42, and the servo reading element SR2 is disposed at the other end of the magnetic element unit 42. In the example shown in FIG. 6, the servo reading element SR1 is provided at a position corresponding to the servo band SB2, and the servo reading element SR2 is provided at a position corresponding to the servo band SB3.

The plurality of data read/write elements DRW are disposed in a straight line between the servo reading element SR1 and the servo reading element SR2. The plurality of data read/write elements DRW are disposed at intervals along the longitudinal direction of the magnetic head 28 (for example, are disposed at equal intervals along the longitudinal direction of the magnetic head 28). In the example shown in FIG. 6, the plurality of data read/write elements DRW are provided at positions corresponding to the data band DB2.

The control device 30 acquires a servo signal which is a result of reading the servo pattern 52 by the servo reading element SR, and performs a servo control in response to the acquired servo signal. Here, the servo control refers to a control of moving the magnetic head 28 in the width direction WD of the magnetic tape MT0 by operating the moving mechanism 48 in accordance with the servo pattern 52 read by the servo reading element SR.

By performing the servo control, the plurality of data read/write elements DRW are positioned on a designated region in the data band DB, and perform the magnetic processing on the designated region in the data band DB. In the example shown in FIG. 6, the plurality of data read/write elements DRW perform the magnetic processing on the designated region in the data band DB2.

In addition, in a case in which the data band DB of which the data is to be read by the magnetic element unit 42 is changed (in the example shown in FIG. 6, the data band DB of which the data is to be read by the magnetic element unit 42 is changed from the data band DB2 to the data band DB1), the moving mechanism 48 moves, under the control of the control device 30, the magnetic head 28 in the width direction WD to change the position of the pair of servo reading elements SR. That is, by moving the magnetic head 28 in the width direction WD, the moving mechanism 48 moves the servo reading element SR1 to a position corresponding to the servo band SB1 and moves the servo reading element SR2 to the position corresponding to the servo band SB2. As a result, the positions of the plurality of data read/write elements DRW are changed from the data band DB2 to the data band DB1, and the plurality of data read/write elements DRW perform the magnetic processing on the data band DB1.

By the way, in recent years, research on a technology of reducing the influence of transverse dimensional stability (TDS) has been advanced. It has been known that the TDS is affected by a temperature, humidity, a pressure at which the magnetic tape is wound around the reel, temporal deterioration, or the like, the TDS is increased in a case in which no measures are taken, and off-track (that is, misregistration of the data read/write element DRW with respect to the track in the data band DB) occurs in a scene in which the magnetic processing is performed on the data band DB.

Figure 7:
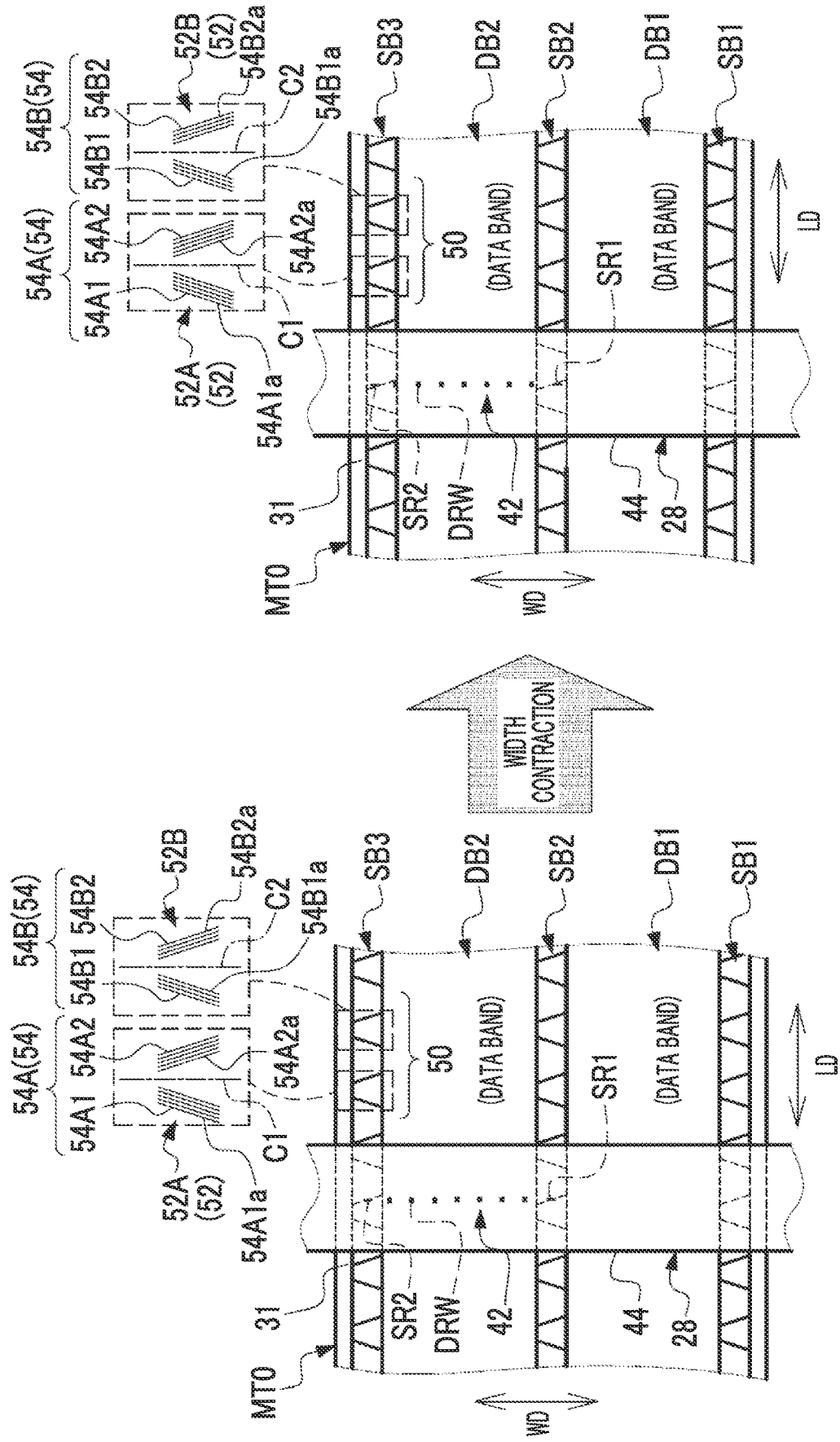
FIG. 7 is a conceptual diagram showing an example of an aspect in which the known magnetic tape in the related art before and after a width of the magnetic tape contracts is observed from the front surface side of the magnetic tape.

In the example shown in FIG. 7, an aspect is shown in which the width of the magnetic tape MT0 contracts with the elapse of time. In this case, the off-track occurs. In some cases, the width of the magnetic tape MT0 expands, and the off-track occurs in this case as well. That is, in a case in which the width of the magnetic tape MT0 contracts or expands with the elapse of time, the position of the servo reading element SR with respect to the servo pattern 52 diverges from a predetermined position (for example, the center position of each of the linear magnetization regions 54A1, 54A2, 54B1, and 54B2) determined by design in the width direction WD. In a case in which the position of the servo reading element SR with respect to the servo pattern 52 diverges from the predetermined position determined by the design in the width direction WD, the accuracy of the servo control is deteriorated, and the position of the track in the data band DB and the position of the data read/write element DRW deviate from each other. Then, an originally planned track will not be subjected to the magnetic processing.

Figure 8:
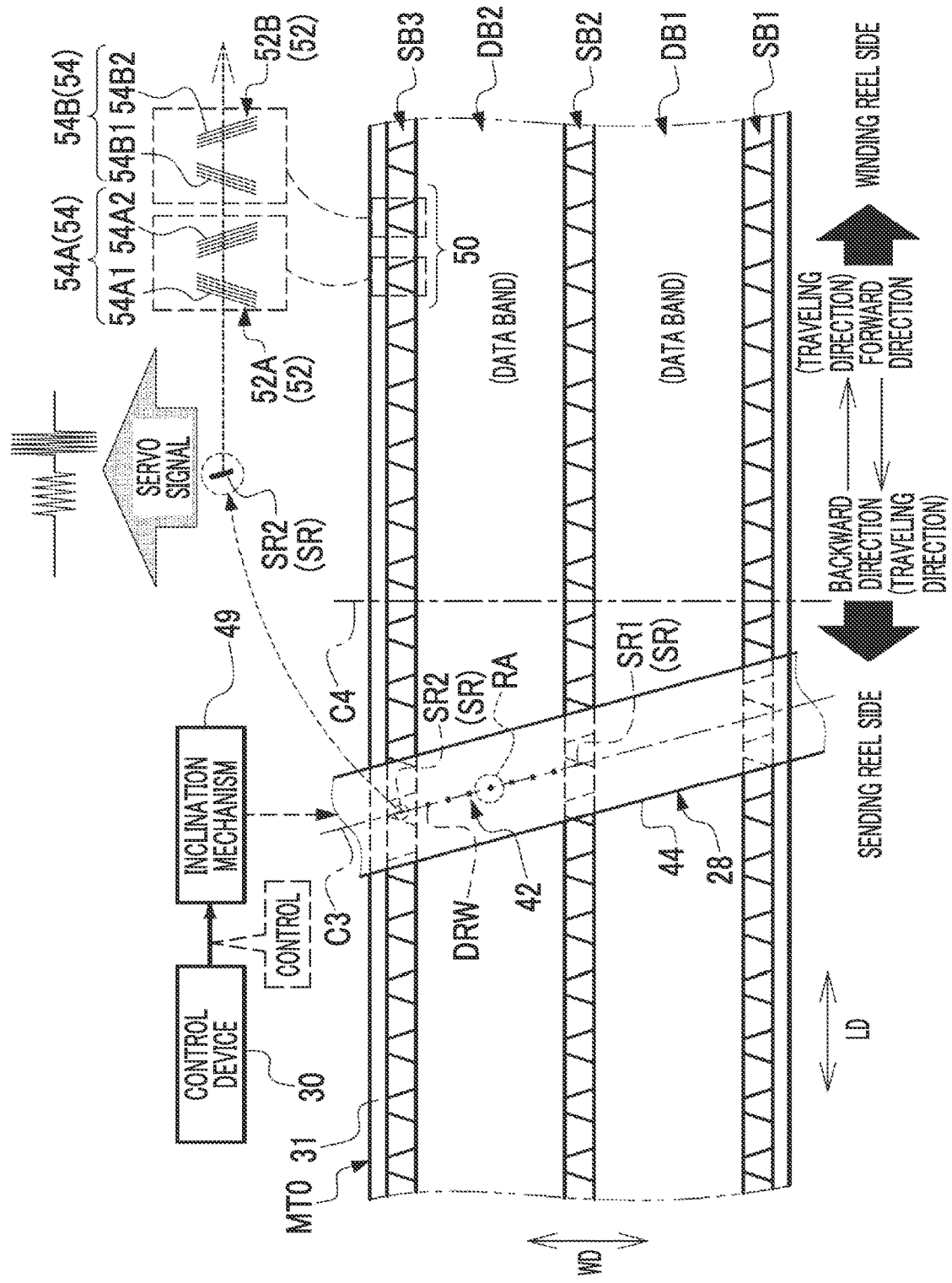
FIG. 8 is a conceptual diagram showing an example of an aspect in which a state in which the magnetic head is skewed on the known magnetic tape in the related art is observed from the front surface side of the magnetic tape.

As a method of reducing the influence of the TDS, as shown in FIG. 8 as shown in an example, a method of holding the position of the servo reading element SR with respect to the servo pattern 52 at the predetermined position determined by design by skewing the magnetic head 28 on the magnetic tape MT0 is known.

The magnetic head 28 comprises a rotation axis RA. The rotation axis RA is provided at a position corresponding to a center portion of the magnetic element unit 42 provided in the magnetic head 28 in a plan view. The magnetic head 28 is rotatably held by the inclination mechanism 49 via the rotation axis RA. An imaginary straight line C3 which is an imaginary center line is provided in the magnetic head 28. The imaginary straight line C3 is a straight line that passes through the rotation axis RA and extends in the longitudinal direction of the magnetic head 28 in a plan view (that is, the direction in which the plurality of data read/write elements DRW are arranged). The magnetic head 28 is held by the inclination mechanism 49 to have a posture in which the imaginary straight line C3 is inclined to the longitudinal direction side of the magnetic tape MT0 with respect to an imaginary straight line C4 which is an imaginary straight line along the width direction WD. In the example shown in FIG. 8, the magnetic head 28 is held by the inclination mechanism 49 in a posture in which the imaginary straight line C3 is inclined toward the sending reel 22 side with respect to the imaginary straight line C4 (that is, a posture inclined counterclockwise as viewed from a paper surface side of FIG. 8). In the present embodiment, the imaginary straight line C3 is an example of a "second imaginary straight line" and a "third imaginary straight line" according to the technology of the present disclosure.

The inclination mechanism 49 receives the power from the inclination actuator 49A (see FIG. 5) to rotate the magnetic head 28 around the rotation axis RA on the front surface 31 of the magnetic tape MT0. The inclination mechanism 49 rotates, under the control of the control device 30, the magnetic head 28 around the rotation axis RA on the front surface 31 of the magnetic tape MT0 to change the direction of the inclination of the imaginary straight line C3 with respect to the imaginary straight line C4 (that is, azimuth) and the inclined angle.

By changing the direction of the inclination of the imaginary straight line C3 with respect to the imaginary straight line C4 and the inclined angle in accordance with the temperature, the humidity, the pressure at which the magnetic tape MT0 is wound around the reel, the temporal deterioration, and the like, or expansion and contraction of the magnetic tape MT in the width direction WD due to these, the position of the servo reading element SR with respect to the servo pattern 52 is held at the predetermined position determined in design.

By the way, the servo reading element SR is formed in a straight line along the imaginary straight line C3. Therefore, in a case in which the servo pattern 52A is read by the servo reading element SR, in the linear magnetization region pair 54A, an angle formed by the linear magnetization region 54A1 and the servo reading element SR and an angle formed by the linear magnetization region 54A2 and the servo reading element SR are different. In a case in which the angles are different in this way, a variation due to an azimuth loss (for example, variation in signal level and waveform distortion) occurs between the servo signal derived from the linear magnetization region 54A1 (that is, the servo signal obtained by reading the linear magnetization region 54A1 by the servo reading element SR) and the servo signal derived from the linear magnetization region 54A2 (that is, the servo signal obtained by reading the linear magnetization region 54A2 by the servo reading element SR). In the example shown in FIG. 8, since the angle formed by the servo reading element SR and the linear magnetization region 54A1 is larger than the angle formed by the servo reading element SR and the linear magnetization region 54A2, the output of the servo signal is small, and the waveform also spreads, so that the variation occurs in the servo signal read by the servo reading element SR across the servo band SB in a state in which the magnetic tape MT travels. In addition, also in a case in which the servo pattern 52B is read by the servo reading element SR, the variation due to the azimuth loss occurs between the servo signal derived from the linear magnetization region 54B1 and the servo signal derived from the linear magnetization region 54B2. Such a variation in the servo signal can contribute to a decrease in the accuracy of the servo control.

For example, as another example of the conventionally known servo pattern 52A, an aspect can be considered in which the linear magnetization region 54A1 is parallel to the imaginary straight line C1 and the linear magnetization region 54A2 is inclined with respect to the imaginary straight line C1 (i.e., only the linear magnetization region 54A2 is inclined). In such a conventionally known aspect, in a case in which the servo pattern 52A is read by the servo reading element SR, in the linear magnetization region pair 54A, an angle formed by the linear magnetization region 54A1 and the servo reading element SR and an angle formed by the linear magnetization region 54A2 and the servo reading element SR are different. In a case in which the angles are different in this way, a variation due to an azimuth loss occurs between the servo signal derived from the linear magnetization region 54A1 and the servo signal derived from the linear magnetization region 54A2. Such a variation in the servo signal can contribute to a decrease in the accuracy of the servo control.

Figure 9:
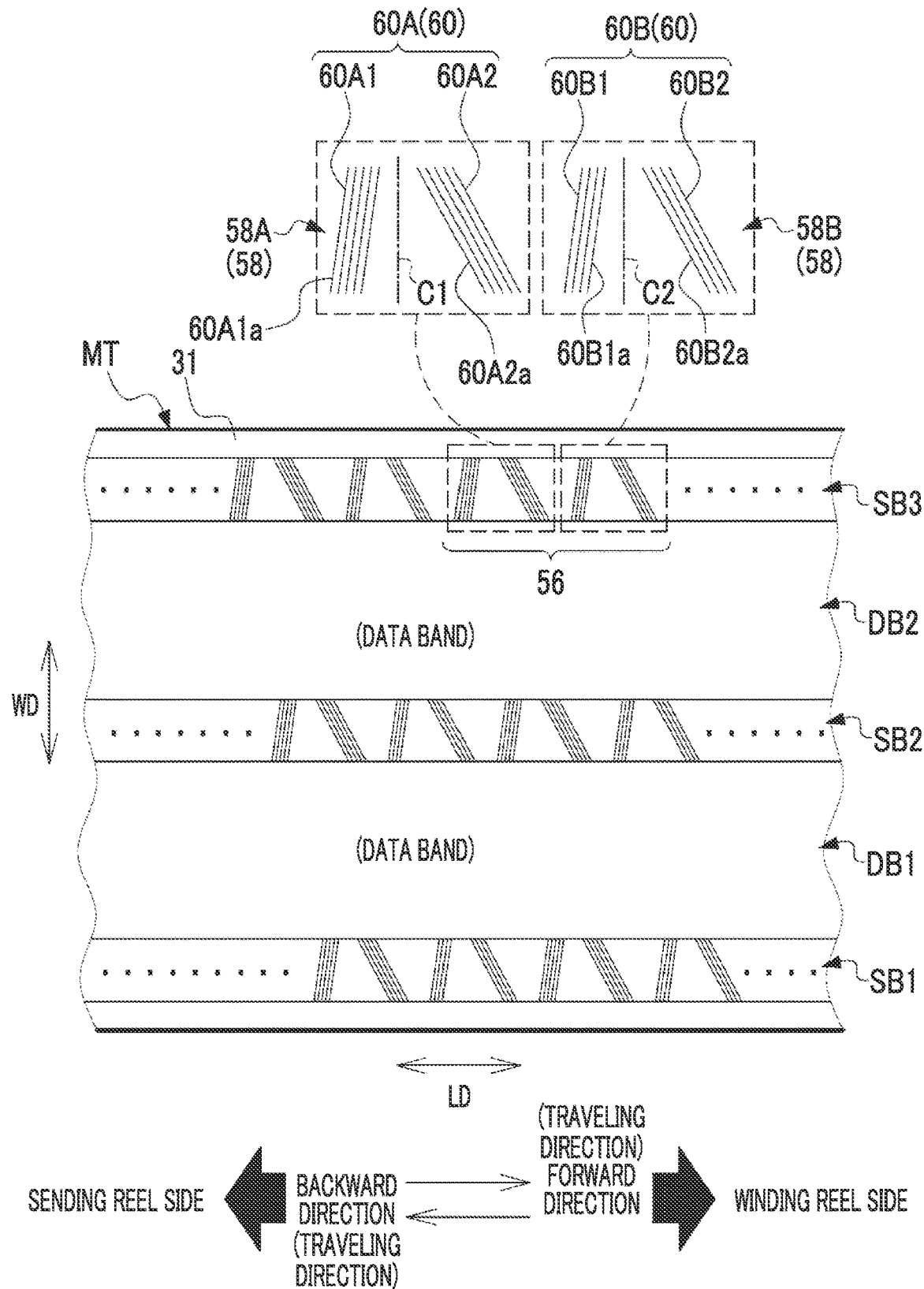
FIG. 9 is a conceptual diagram showing an example of an aspect in which the magnetic tape according to the embodiment is observed from the front surface side of the magnetic tape.

Therefore, in view of such circumstances, in the present embodiment, as shown in FIG. 9, the magnetic tape MT is adopted as an example. The magnetic tape MT is different from the magnetic tape MT0 in that a frame 56 is provided instead of the frame 50. The frame 56 is defined by a set of servo patterns 58. A plurality of servo patterns 58 are recorded in the servo band SB along the longitudinal direction LD. The plurality of servo patterns 58 are disposed at regular intervals along the longitudinal direction LD, similarly to the plurality of servo patterns 52 recorded in the magnetic tape MT0.

In the example shown in FIG. 9, servo patterns 58A and 58B are shown as an example of the set of servo patterns 58 included in the frame 56. The servo patterns 58A and 58B are adjacent to each other along the longitudinal direction LD, and the servo pattern 58A is positioned on the upstream side in the forward direction and the servo pattern 58B is positioned on the downstream side in the forward direction in the frame 56.

The servo pattern 58 consists of a linear magnetization region pair 60. The linear magnetization region pair 60 is classified into a linear magnetization region pair 60A and a linear magnetization region pair 60B.

The servo pattern 58A consists of the linear magnetization region pair 60A. In the example shown in FIG. 9, linear magnetization regions 60A1 and 60A2 are shown as an example of the linear magnetization region pair 60A. Each of the linear magnetization regions 60A1 and 60A2 is a linearly magnetized region.

The linear magnetization regions 60A1 and 60A2 are inclined in opposite directions with respect to the imaginary straight line C1. In other words, the linear magnetization region 60A1 is inclined in one direction (for example, in the clockwise direction as viewed from the paper surface side of FIG. 9) with respect to the imaginary straight line C1. On the other hand, the linear magnetization region 60A2 is inclined in another direction (for example, in the counter clockwise direction as viewed from the paper surface side of FIG. 9) with respect to the imaginary straight line C1. The linear magnetization regions 60A1 and 60A2 are not parallel to each other and are inclined at different angles with respect to the imaginary straight line C1. The linear magnetization region 60A1 has a steeper inclined angle with respect to the imaginary straight line C1 than the linear magnetization region 60A2. Here, "steep" means that, for example, an angle of the linear magnetization region 60A1 with respect to the imaginary straight line C1 is smaller than an angle of the linear magnetization region 60A2 with respect to the imaginary straight line C1. In addition, a total length of the linear magnetization region 60A1 is shorter than a total length of the linear magnetization region 60A2.

In the servo pattern 58A, a plurality of magnetization straight lines 60A1*a* are included in the linear magnetization region 60A1, and a plurality of magnetization straight lines 60A2*a* are included in the linear magnetization region 60A2. The number of the magnetization straight lines 60A1*a* included in the linear magnetization region 60A1 is the same as the number of the magnetization straight lines 60A2*a* included in the linear magnetization region 60A2.

The linear magnetization region 60A1 is a set of magnetization straight lines 60A1*a*, which are five magnetized straight lines, and the linear magnetization region 60A2 is a set of magnetization straight lines 60A2*a*, which are five magnetized straight lines. In the servo band SB, the positions of both ends of the linear magnetization region 60A1 (that is, the positions of both ends of each of the five magnetization straight lines 60A1*a*) and the positions of both ends of the linear magnetization region 60A2 (that is, the positions of both ends of each of the five magnetization straight lines 60A2*a*) are aligned in the width direction WD. It should be noted that, here, the example has been described in which the positions of both ends of each of the five magnetization straight lines 60A1*a* and the positions of both ends of each of the five magnetization straight lines 60A2*a* are aligned, but this is merely an example, and the positions of both ends of one or more magnetization straight lines 60A1*a* among the five magnetization straight lines 60A1*a* and the positions of both ends of one or more magnetization straight lines 60A2*a* among of the five magnetization straight lines 60A2*a* need only be aligned. In addition, in the present embodiment, the concept of "aligned" also includes meaning of "aligned" including an error generally allowed in the technical field to which the technology of the present disclosure belongs, which is the error to the extent that it does not contradict the purpose of the technology of the present disclosure, in addition to the meaning of being exactly aligned.

The servo pattern 58B consists of the linear magnetization region pair 60B. In the example shown in FIG. 9, linear magnetization regions 60B1 and 60B2 are shown as an example of the linear magnetization region pair 60B. Each of the linear magnetization regions 60B1 and 60B2 is a linearly magnetized region.

The linear magnetization regions 60B1 and 60B2 are inclined in opposite directions with respect to the imaginary straight line C2. In other words, the linear magnetization region 60B1 is inclined in one direction (for example, in the clockwise direction as viewed from the paper surface side of FIG. 9) with respect to the imaginary straight line C1. On the other hand, the linear magnetization region 60B2 is inclined in another direction (for example, in the counter clockwise direction as viewed from the paper surface side of FIG. 9) with respect to the imaginary straight line C1. The linear magnetization regions 60B1 and 60B2 are not parallel to each other and are inclined at different angles with respect to the imaginary straight line C2. The linear magnetization region 60B1 has a steeper inclined angle with respect to the imaginary straight line C2 than the linear magnetization region 60B2. Here, "steep" means that, for example, an angle of the linear magnetization region 60B1 with respect to the imaginary straight line C2 is smaller than an angle of the linear magnetization region 60B2 with respect to the imaginary straight line C2. In addition, a total length of the linear magnetization region 60B1 is shorter than a total length of the linear magnetization region 60B2.

In the servo pattern 58B, a plurality of magnetization straight lines 60B1*a* are included in the linear magnetization region 60B1, and a plurality of magnetization straight lines 60B2*a* are included in the linear magnetization region 60B2. The number of the magnetization straight lines 60B1*a* included in the linear magnetization region 60B1 is the same as the number of the magnetization straight lines 60B2*a* included in the linear magnetization region 60B2.

The total number of the magnetization straight lines 60B1*a* and 60B2*a* included in the servo pattern 58B is different from the total number of the magnetization straight lines 60A1*a* and 60A2*a* included in the servo pattern 58A. In the example shown in FIG. 9, the total number of the magnetization straight lines 60A1*a* and 60A2*a* included in the servo pattern 58A is ten, whereas the total number of the magnetization straight lines 60B1*a* and 60B2*a* included in the servo pattern 58B is eight.

The linear magnetization region 60B1 is a set of magnetization straight lines 60B1*a*, which are four magnetized straight lines, and the linear magnetization region 60B2 is a set of magnetization straight lines 60B2*a*, which are four magnetized straight lines. In the servo band SB, the positions of both ends of the linear magnetization region 60B1 (that is, the positions of both ends of each of the four magnetization straight lines 60B1*a*) and the positions of both ends of the linear magnetization region 60B2 (that is, the positions of both ends of each of the four magnetization straight lines 60B2*a*) are aligned in the width direction WD.

It should be noted that, here, the example has been described in which the positions of both ends of each of the four magnetization straight lines 60B1*a* and the positions of both ends of each of the four magnetization straight lines 60B2*a* are aligned, but this is merely an example, and the positions of both ends of one or more magnetization straight lines 60B1*a* among the four magnetization straight lines 60B 1*a* and the positions of both ends of one or more magnetization straight lines 60B2*a* among of the four magnetization straight lines 60B2*a* need only be aligned.

In addition, here, the set of magnetization straight lines 60A1*a*, which are five magnetized straight lines, is described as an example of the linear magnetization region 60A1, the set of magnetization straight lines 60A2*a*, which are five magnetized straight lines, is described as an example of the linear magnetization region 60A2, the set of magnetization straight lines 60B 1*a*, which are four magnetized straight lines, is described as an example of the linear magnetization region 60B1, and the set of magnetization straight lines 60B2*a*, which are four magnetized straight lines, is described as an example of the linear magnetization region 60B2, but the technology of the present disclosure is not limited thereto. For example, the linear magnetization region 60A1 need only have the number of the magnetization straight lines 60A1*a* that contribute to specifying the position of the magnetic head 28 on the magnetic tape MT, the linear magnetization region 60A2 need only have the number of the magnetization straight lines 60A2*a* that contribute to specifying the position of the magnetic head 28 on the magnetic tape MT, the linear magnetization region 60B1 need only have the number of the magnetization straight lines 60B1*a* that contribute to specifying the position of the magnetic head 28 on the magnetic tape MT, and the linear magnetization region 60B2 need only have the number of the magnetization straight lines 60B2*a* that contribute to specifying the position of the magnetic head 28 on the magnetic tape MT.

Here, the geometrical characteristic of the linear magnetization region pair 60A on the magnetic tape MT will be described with reference to FIG. 10. Note that, in present embodiment, the geometric characteristic refers to generally recognized geometric characteristic such as length, shape, orientation, position and/or like.

Figure 10:
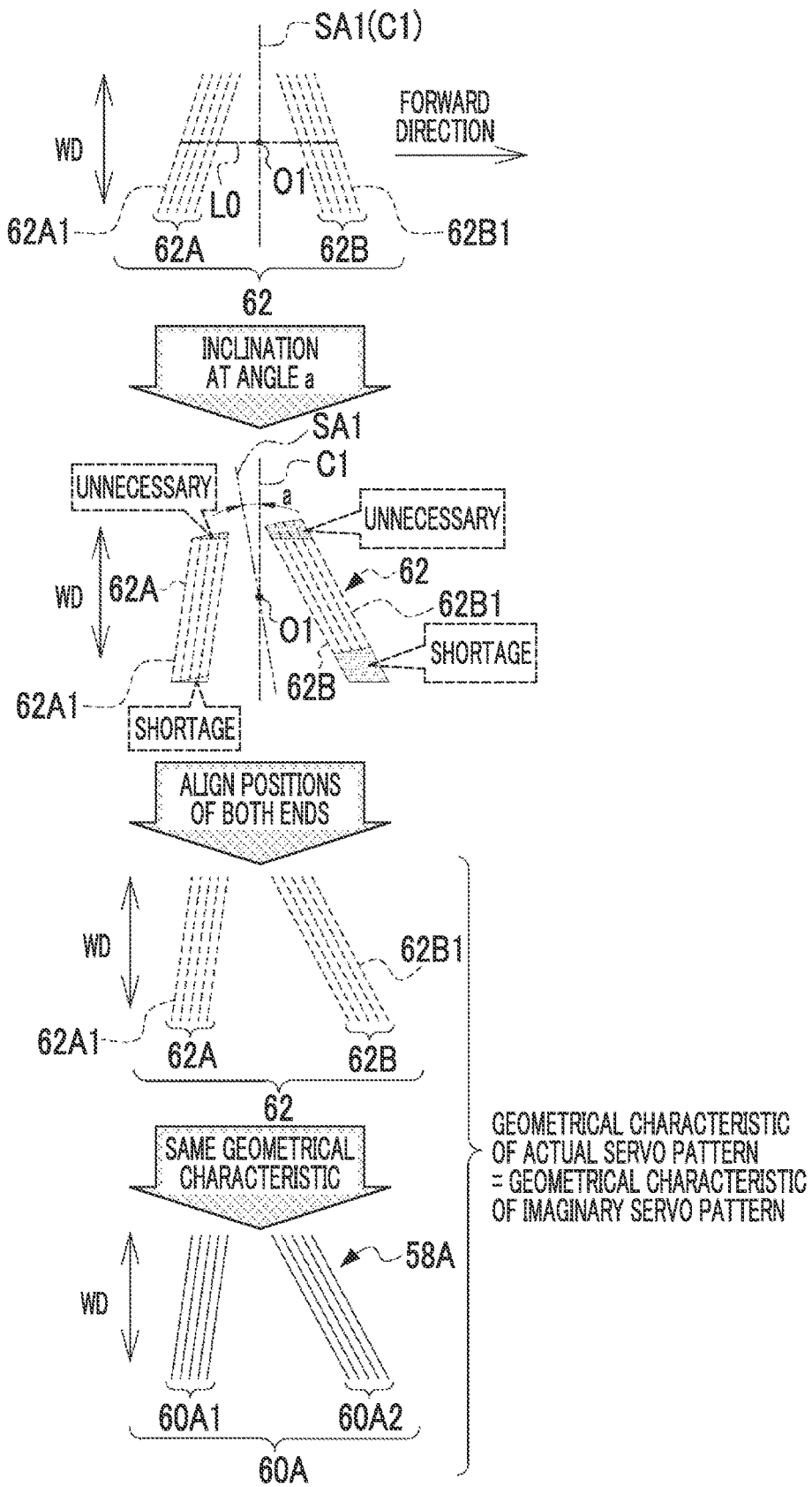
FIG. 10 is a conceptual diagram showing an example of a relationship between a geometrical characteristic of an actual servo pattern and a geometrical characteristic of an imaginary servo pattern.

As an example, as shown in FIG. 10 the geometrical characteristic of the linear magnetization region pair 60A on the magnetic tape MT can be expressed by using an imaginary linear region pair 62. The imaginary linear region pair 62 consists of the imaginary linear region 62A and an imaginary linear region 62B.

The imaginary linear region pair 62 is an imaginary linear magnetization region pair having the same geometrical characteristic as the linear magnetization region pair 54A shown in FIG. 6. The imaginary linear region pair 62 is an imaginary magnetization region used for convenience for describing the geometrical characteristic of the linear magnetization region pair 60A on the magnetic tape MT, and is not an actually present magnetization region.

The imaginary linear region 62A has the same geometrical characteristic as the linear magnetization region 54A1 shown in FIG. 6, and consists of five imaginary straight lines 62A1 corresponding to the five magnetization straight lines 54A1*a* shown in FIG. 6. The imaginary linear region 62B has the same geometrical characteristic as the linear magnetization region 54B1 shown in FIG. 6, and consists of five imaginary straight lines 62B1 corresponding to the five magnetization straight lines 54A2*a* shown in FIG. 6.

A center O1 is provided in the imaginary linear region pair 62. For example, the center O1 is a center of a line segment L0 connecting a center of the straight line 62A1 positioned on the most upstream side of the five straight lines 62A1 in the forward direction and a center of the straight line 62B1 positioned on the most downstream side of the five straight lines 62B1 in the forward direction.

Since the imaginary linear region pair 62 has the same geometrical characteristic as the linear magnetization region pair 54A shown in FIG. 6, the imaginary linear region 62A and the imaginary linear region 62B are inclined line-symmetrically with respect to the imaginary straight line C1. Here, a case will be considered in which reading by the servo reading element SR is performed tentatively with respect to the imaginary linear region pair 62 in a case in which an entirety of the imaginary linear region pair 62 is inclined with respect to the imaginary straight line C1 by inclining the symmetry axis SA1 of the imaginary linear regions 62A and 62B at an angle a (for example, 10 degrees) with respect to the imaginary straight line C1 with the center O1 as the rotation axis. In this case, in the imaginary linear region pair 62, in the width direction WD, a portion is generated in which the imaginary linear region 62A is read but the imaginary linear region 62B is not read or the imaginary linear region 62A is not read is read but the imaginary linear region 62B. That is, in each of the imaginary linear regions 62A and 62B, in a case in which reading by the servo reading element SR is performed, a shortage part and an unnecessary part is generated.

Therefore, by compensating for the shortage part and removing the unnecessary part, the positions of both ends of the imaginary linear region 62A (that is, the positions of both ends of each of the five straight lines 62A1) and the positions of both ends of the imaginary linear region 62B (that is, the positions of both ends of each of the five straight lines 62B1) are aligned in the width direction WD.

The geometrical characteristic of the imaginary linear region pair 62 (that is, the geometrical characteristic of the imaginary servo pattern) obtained as described above corresponds to the geometrical characteristic of the actual servo pattern 58A. That is, the linear magnetization region pair 60A having the geometrical characteristic corresponding to the geometrical characteristic of the imaginary linear region pair 62 obtained by aligning the positions of both ends of the imaginary linear region 62A and the positions of both ends of the imaginary linear region 62B in the width direction WD is recorded in the servo band SB.

It should be noted that the linear magnetization region pair 60B is different from the linear magnetization region pair 60A only in that the four magnetization straight lines 60B 1*a* are provided instead of the five magnetization straight lines 60A1*a* and the four magnetization straight lines 60B2*a* are provided instead of the five magnetization straight lines 60A2*a*. Therefore, the linear magnetization region pair 60B having the geometrical characteristic corresponding to the geometrical characteristic of the imaginary linear region pair (not shown) obtained by aligning the positions of both ends of each of the four straight lines 62A1 and the positions of both ends of each of the four straight lines 62B1 in the width direction WD is recorded in the servo band SB.

Figure 11:
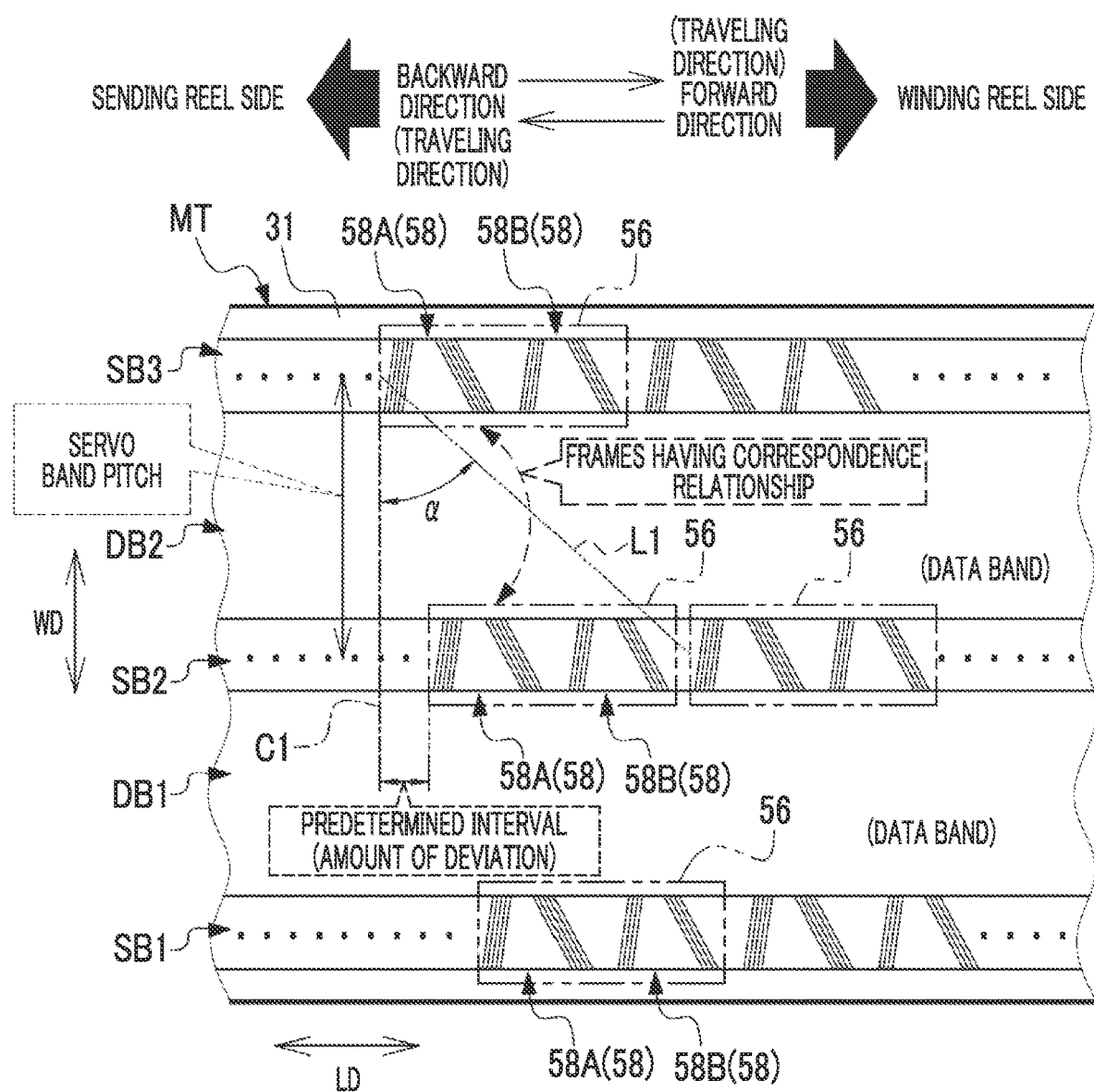
FIG. 11 is a conceptual diagram showing an example of an aspect in which a state in which frames corresponding to each other between the servo bands adjacent to each other in the width direction of the magnetic tape according to the embodiment deviate from each other at a predetermined interval is observed from the front surface side of the magnetic tape.

As an example, as shown in FIG. 11, the plurality of servo bands SB are formed on the magnetic tape MT in the width direction WD, and the frames 56 having a correspondence relationship between the servo bands SB deviate from each other at predetermined intervals in the longitudinal direction LD, between the servo bands SB adjacent to each other in the width direction WD. This means that the servo patterns 58 having a correspondence relationship between the servo bands SB deviate from each other at the predetermined interval in the longitudinal direction LD between the servo bands SB adjacent to each other in the width direction WD.

The predetermined interval is defined based on an angle α, a pitch between the servo bands SB adjacent to each other in the width direction WD (hereinafter, also referred to as "servo band pitch"), and a frame length. In the example shown in FIG. 11, the angle α is exaggerated in order to make it easier to visually grasp the angle α, but in reality, the angle α is, for example, about 15 degrees. The angle α is an angle formed by the frames 56 having no correspondence relationship between the servo bands SB adjacent to each other in the width direction WD and the imaginary straight line C1. In the example shown in FIG. 11, as an example of the angle α, an angle formed by an interval (in the example shown in FIG. 11, a line segment L1) between one frame 56 of a pair of frames 56 having the correspondence relationship between the servo bands SB adjacent to each other in the width direction WD (in the example shown in FIG. 11, one frame 56 of the servo band SB3) and the frame 56 adjacent to the other frame 56 of the pair of frames 56 (in the example shown in FIG. 11, the frame 56 having the correspondence relationship with one frame 56 of the servo band SB3 among the plurality of frames 56 in the servo band SB2), and the imaginary straight line C1 is shown. In this case, the frame length refers to the total length of the frame 56 with respect to the longitudinal direction LD. The predetermined interval is defined by Expression (1). It should be noted that Mod (AB) means a remainder generated in a case in which "A" is divided by "B".

$$\text{(Predetermined interval)} = \text{Mod}\{(\text{Servo band pitch} \times \tan \alpha)/(\text{Frame length})\} \quad (1)$$

It should be noted that, in the example shown in FIG. 11, the angle formed by the interval between one frame 56 of the pair of frames 56 having the correspondence relationship between the servo bands SB adjacent to each other in the width direction WD (hereinafter, also referred to as "first frame") and the frame 56 adjacent to the other frame 56 of the pair of frames 56 (hereinafter, also referred to as "second frame"), and the imaginary straight line C1 has been described as the angle α, but the technology of the present disclosure is not limited to this. For example, as the angle α, an angle formed by an interval between the first frame and the frame 56 away from the second frame by two or more frames (hereinafter, also referred to as "third frame") in the same servo band SB as the second frame, and the imaginary straight line C1 may be used. In this case, the "frame length" used in Expression (1) is the pitch between the second frame and the third frame in the longitudinal direction LD (for example, a distance from the distal end of the second frame to the distal end of the third frame).

Figure 12:
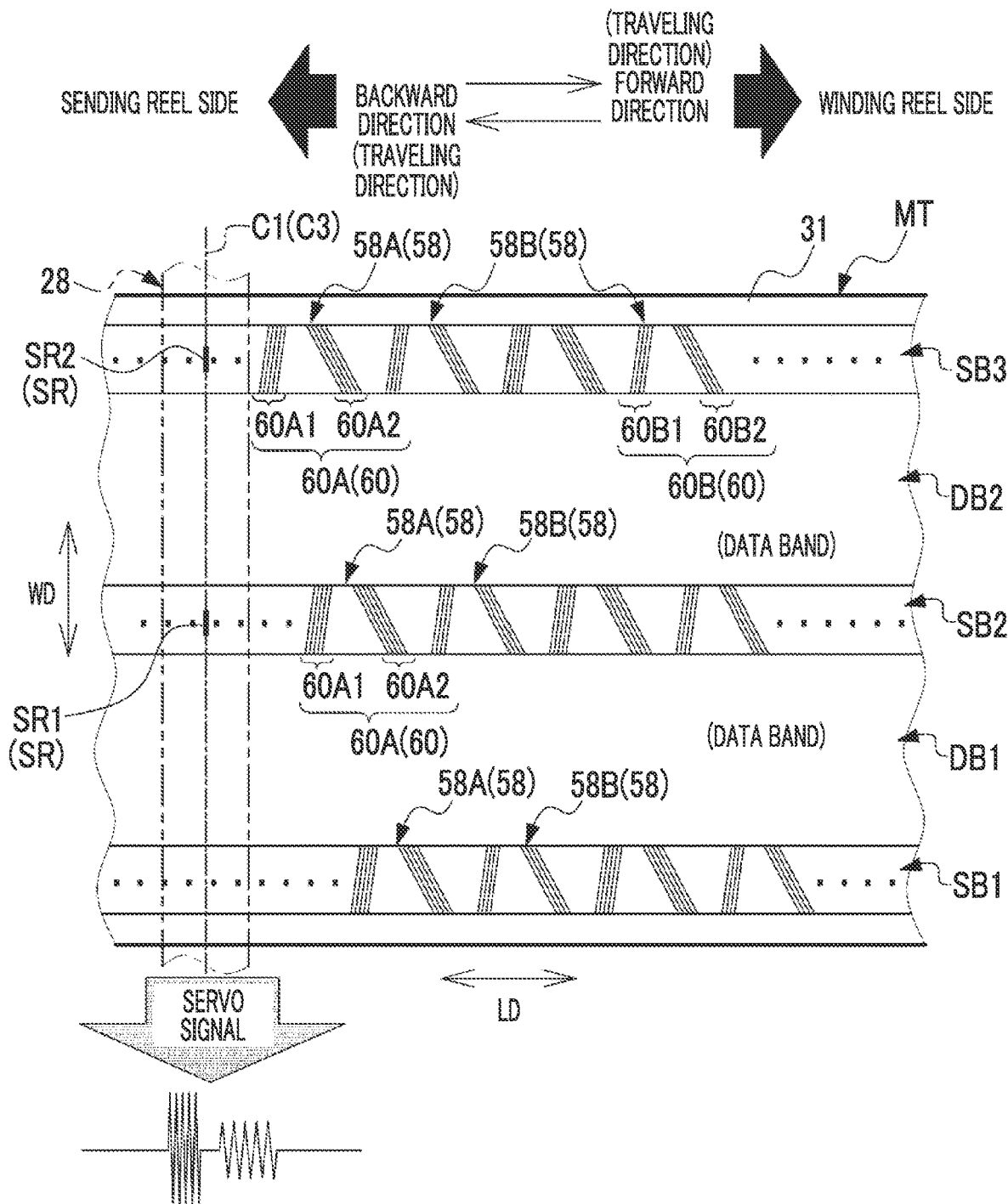
FIG. 12 is a conceptual diagram showing an example of an aspect in which a state in which the servo pattern is read by a servo reading element provided in the magnetic head that is not skewed on the magnetic tape according to the embodiment is observed from the front surface side of the magnetic tape.

As an example, as shown in FIG. 12, in a case in which the servo pattern 58A (that is, the linear magnetization region pair 60A) is read by the servo reading element SR in a state in which the direction of the imaginary straight line C1 and the direction of the imaginary straight line C3 match (that is, a state in which the longitudinal direction of the magnetic head 28 and the width direction WD match), the variation due to the azimuth loss occurs between the servo signal derived from the linear magnetization region 60A1 and the servo signal derived from the linear magnetization region 60A2. In addition, also in a case in which the servo pattern 58B (that is, the linear magnetization region pair 60B) is read by the servo reading element SR in a state in which the direction of the imaginary straight line C1 and the direction of the imaginary straight line C3 match (that is, a state in which the longitudinal direction of the magnetic head 28 and the width direction WD match), a similar phenomenon occurs.

Figure 13:
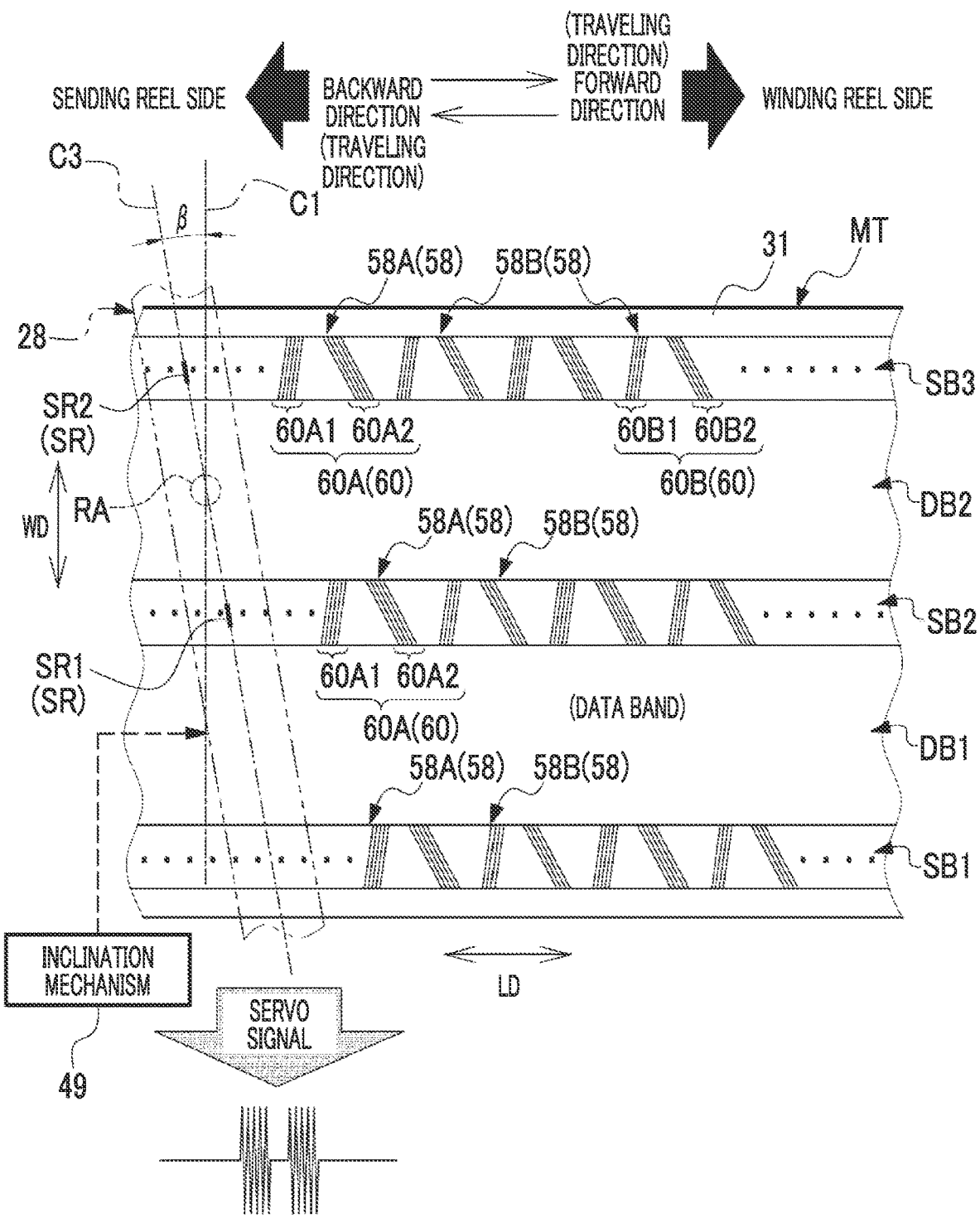
FIG. 13 is a conceptual diagram showing an example of an aspect in which a state in which the servo pattern is read by the servo reading element provided in the magnetic head that is skewed on the magnetic tape according to the embodiment is observed from the front surface side of the magnetic tape.

Therefore, as an example, as shown in FIG. 13, the inclination mechanism 49 (see FIG. 8) skews the magnetic head 28 on the magnetic tape MT around the rotation axis RA such that the imaginary straight line C3 is inclined with respect to the imaginary straight line C1 to the upstream side in the forward direction at an angle β (that is, the angle β counterclockwise as viewed from the paper surface side of FIG. 13). As described above, since the magnetic head 28 is inclined to the upstream side in the forward direction at the angle β on the magnetic tape MT, the variation due to the azimuth loss between the servo signal derived from the linear magnetization region 60A1 and the servo signal derived from the linear magnetization region 60A2 is smaller than that in the example shown in FIG. 12. In addition, also in a case in which the servo pattern 58B (that is, the linear magnetization region pair 60B) is read by the servo reading element SR, similarly, the variation due to the azimuth loss between the servo signal derived from the linear magnetization region 60B1 and the servo signal derived from the linear magnetization region 60B2 is small.

Here, the angle β is set to match, for example, the angle a (see FIG. 10), which is an angle at which the symmetrical axis SA1 (see FIG. 10) of the imaginary linear regions 62A and 62B (see FIG. 10) is rotated relative to the imaginary straight line C1 with the center O1 (see FIG. 10) as the rotation axis. Note that, in the present embodiment, the term "match" means, in addition to perfect match, match in a sense including errors that are generally acceptable in the art to which the technology of the present disclosure belongs and that are not contrary to the object of the technology of the present disclosure. The geometric characteristics of the imaginary linear regions 62A and 62B are the same as the geometric characteristics of the linear magnetization regions 60A1 and 60B1. Therefore, the linear magnetization regions 60A1 and 60B1 are also inclined at the angle a with respect to the imaginary straight line C1. In such a case, when the magnetic head 28 is inclined at the angle β (i.e., the angle a) to the upstream side in the forward direction on the magnetic tape MT, the inclined angle of the magnetic head 28 and the inclined angle of the linear magnetization regions 60A1 and 60A2 match. As a result, the variation due to azimuth loss between the servo signal derived from the linear magnetization region 60A1 and the servo signal derived from the linear magnetization region 60A2 is reduced. Similarly, when the servo pattern 58B (i.e., the linear magnetization region pair 60B) is read by the servo reading element SR, the variation due to azimuth loss between the servo signal derived from the linear magnetization region 60B1 and the servo signal derived from the linear magnetization region 60B2 is reduced.

Figure 14:
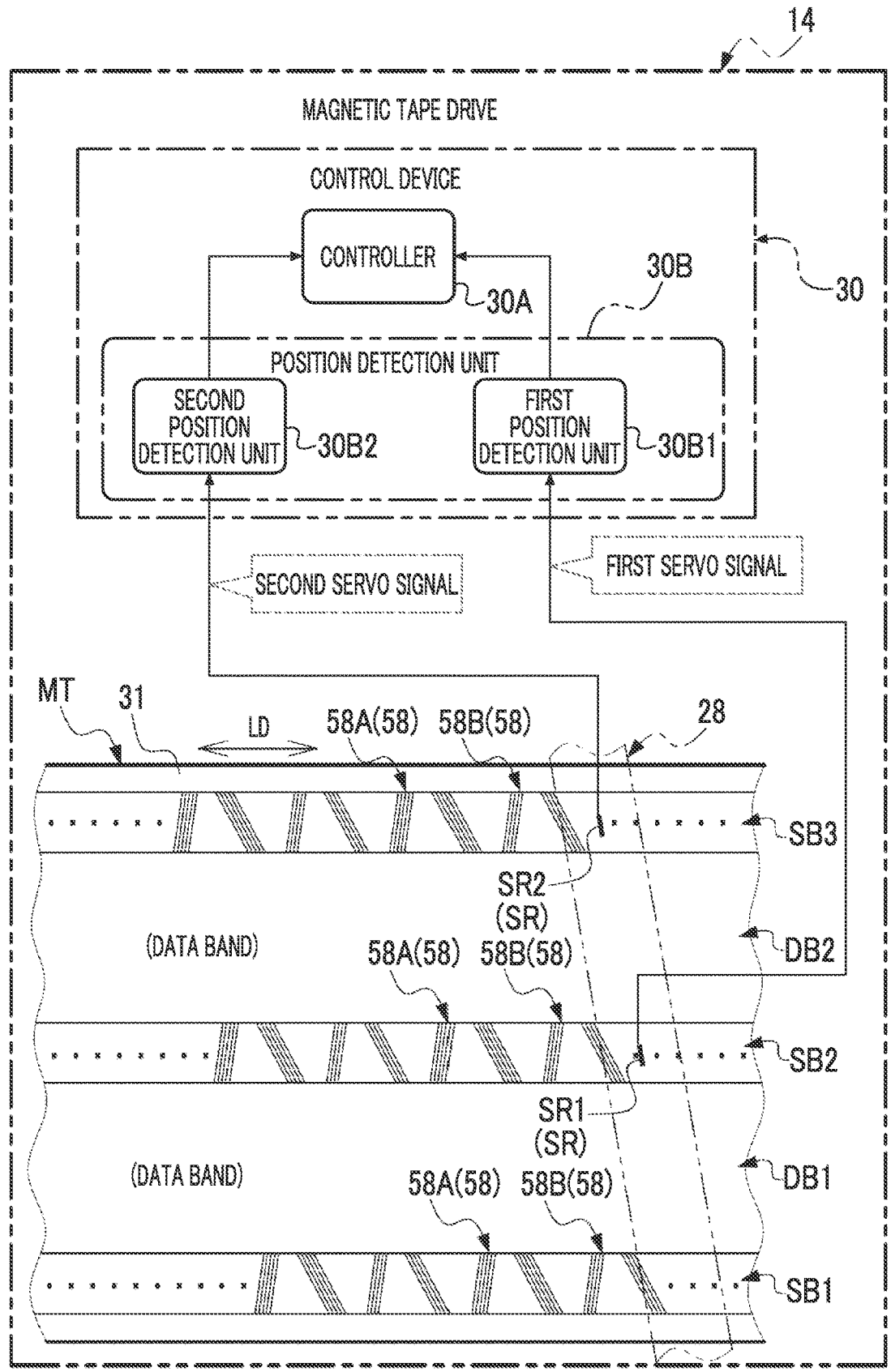
FIG. 14 is a conceptual diagram showing an example of a function of a control device provided in the magnetic tape drive according to the embodiment.

As an example, as shown in FIG. 14, the control device 30 includes a controller 30A and a position detection unit 30B. The position detection unit 30B includes a first position detection unit 30B1 and a second position detection unit 30B2. The position detection unit 30B acquires the servo signal that is a result of reading the servo pattern 58 by the servo reading element SR, and detects the position of the magnetic head 28 on the magnetic tape MT based on the acquired servo signal.

The servo signal is classified into a first servo signal and a second servo signal. The first servo signal is a servo signal that is the result of reading the servo pattern 58 by the servo reading element SR1, and the second servo signal is the servo signal that is a result of reading the servo pattern 58 by the servo reading element SR2.

The first position detection unit 30B1 acquires the first servo signal, and the second position detection unit 30B2 acquires the second servo signal. In the example shown in FIG. 14, the first position detection unit 30B1 acquires the first servo signal obtained by reading the servo pattern 58 in the servo band SB2 by the servo reading element SR1, and the second position detection unit 30B2 acquires the second servo signal obtained by reading the servo pattern 58 in the servo band SB3 by the servo reading element SR2. The first position detection unit 30B1 detects the position of the servo reading element SR1 with respect to the servo band SB2 based on the first servo signal, and the second position detection unit 30B2 detects the position of the servo reading element SR2 with respect to the servo band SB3 based on the second servo signal.

The controller 30A performs various controls based on a position detection result by the first position detection unit 30B1 (that is, a result of detecting the position by the first position detection unit 30B1) and a position detection result by the second position detection unit 30B2 (that is, a result of detecting the position by the second position detection unit 30B2). Here, the various controls refer to, for example, the servo control, a skew angle control, and/or a tension control. The tension control refers to a control of the tension applied to the magnetic tape MT (for example, the tension for reducing the influence of the TDS).

Figure 15:
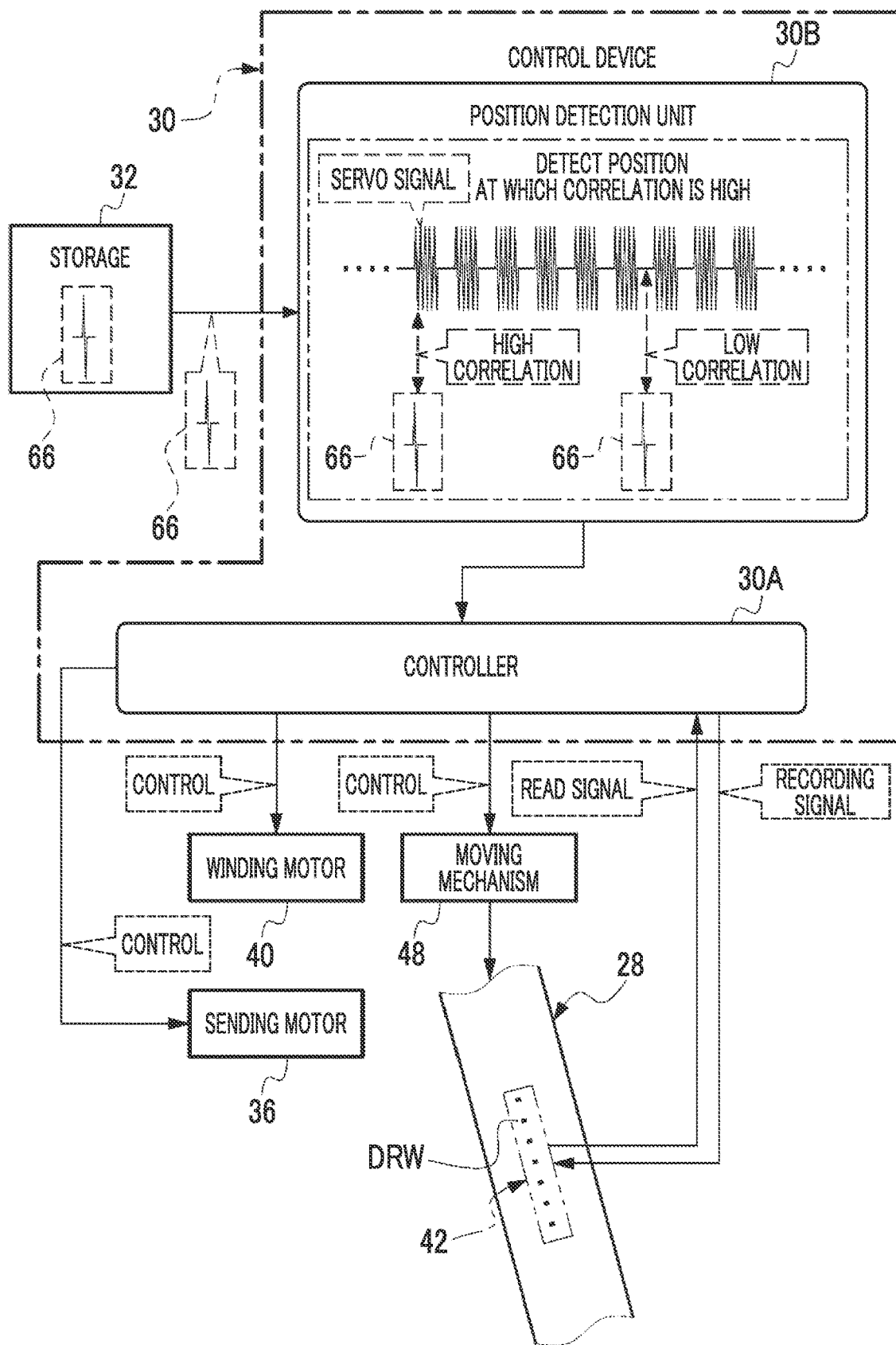
FIG. 15 is a conceptual diagram showing an example of processing contents of a position detection unit and a controller provided in the control device provided in the magnetic tape drive according to the embodiment.

As an example, as shown in FIG. 15, the position detection unit 30B detects the servo signal, which is the result of reading the servo pattern 58 from the magnetic tape MT by the servo reading element SR, by using an autocorrelation coefficient.

An ideal waveform signal 66 is stored in the storage 32. The ideal waveform signal 66 is a signal indicating a single ideal waveform included in the servo signal (for example, an ideal signal which is a result of reading one of an ideal magnetization straight lines included in the servo pattern 58 by the servo reading element SR). The ideal waveform signal 66 can be said to be a sample signal compared with the servo signal. It should be noted that, here, the form example has been described in which the ideal waveform signal 66 is stored in the storage 32, but this is merely an example. For example, the ideal waveform signal 66 may be stored in the cartridge memory 24 instead of the storage 32 or together with the storage 32. In addition, the ideal waveform signal 66 may be recorded in a BOT region (not shown) provided at the beginning of the magnetic tape MT and/or in an EOT region (not shown) provided at the end of the magnetic tape MT.

The autocorrelation coefficient used by the position detection unit 30B is a coefficient indicating a degree of correlation between the servo signal and the ideal waveform signal 66. The position detection unit 30B acquires the ideal waveform signal 66 from the storage 32 to compare the acquired ideal waveform signal 66 with the servo signal. Moreover, the position detection unit 30B calculates the autocorrelation coefficient based on the comparison result. The position detection unit 30B detects a position on the servo band SB at which the correlation between the servo signal and the ideal waveform signal 66 is high (for example, a position at which the servo signal and the ideal waveform signal 66 match) in accordance with the autocorrelation coefficient.

Detecting the position of the servo reading element SR with respect to the servo band SB is performed, for example, as follows. The autocorrelation coefficient makes it possible to detect an interval between the servo patterns 58A and 58B in the longitudinal direction LD. For example, in a case in which the servo reading element SR is positioned on the upper side of the servo pattern 58 (that is, the upper side of the front view of the paper surface in FIG. 14), the interval between the linear magnetization region 60A1 and the linear magnetization region 60A2 is narrow, and the interval between the linear magnetization region 60B1 and the linear magnetization region 60B2 is also narrow. In contrast, in a case in which the servo reading element SR is positioned on the lower side of the servo pattern 58 (that is, the lower side of the front view of the paper surface in FIG. 14), the interval between the linear magnetization region 60A1 and the linear magnetization region 60A2 is wide, and the interval between the linear magnetization region 60B1 and the linear magnetization region 60B2 is also wide. As described above, the position detection unit 30B detects the position of the servo reading element SR with respect to the servo band SB by using the interval between the servo pattern 58A and the servo pattern 58B detected in accordance with the autocorrelation coefficient. The controller 30A adjusts the position of the magnetic head 28 by operating the moving mechanism 48 based on the position detection result of the position detection unit 30B (that is, the result of detecting the position by the position detection unit 30B). In addition, the controller 30A causes the magnetic element unit 42 to perform the magnetic processing on the data band DB of the magnetic tape MT. That is, the controller 30A acquires a read signal (data read from the data band DB of the magnetic tape MT by the magnetic element unit 42) from the magnetic element unit 42, or supplies a recording signal to the magnetic element unit 42 to record the data in response to the recording signal in the data band DB of the magnetic tape MT.

In addition, in order to reduce the influence of the TDS, the controller 30A calculates the servo band pitch from the position detection result of the position detection unit 30B, and performs the tension control in accordance with the calculated servo band pitch, or skews the magnetic head 28 on the magnetic tape MT. The tension control is realized by adjusting the rotation speed, rotation torque, and the like of each of the sending motor 36 and the winding motor 40. The skew of the magnetic head 28 is realized by operating the inclination mechanism 49.

Next, an example of a servo pattern recording step of recording the servo pattern 58 on the servo band SB of the magnetic tape MT and an example of a winding step of winding the magnetic tape MT will be described.

Figure 16:
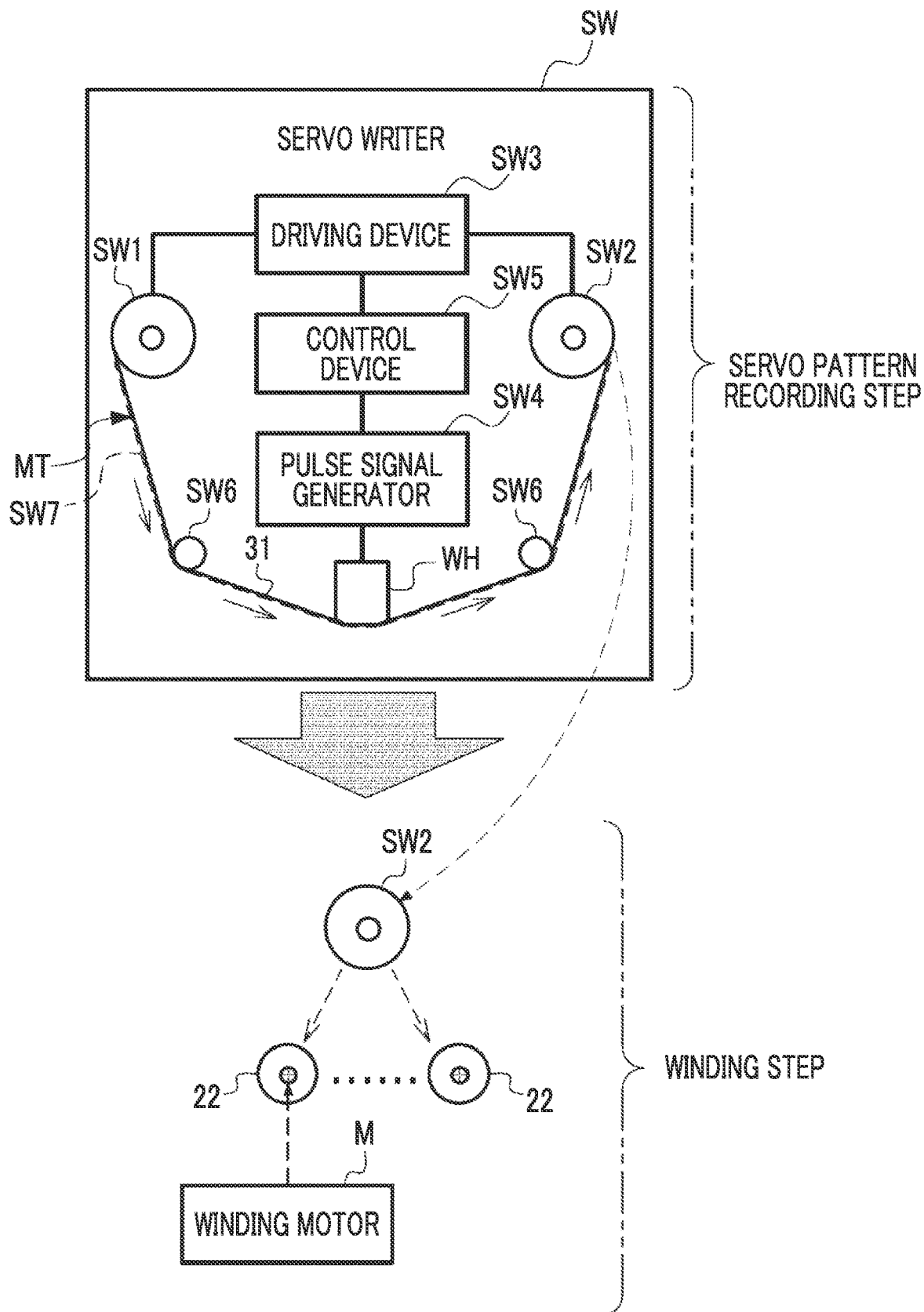
FIG. 16 is a conceptual diagram showing an example of a configuration of a servo writer according to the embodiment.

As an example, as shown in FIG. 16, a servo writer SW is used in the servo pattern recording step. The servo writer SW comprises a sending reel SW1, a winding reel SW2, a driving device SW3, a pulse signal generator SW4, a control device SW5, a plurality of guides SW6, a transport passage SW7, a servo pattern recording head WH, and a verification head VH.

In the present embodiment, the servo writer SW is an example of a "servo pattern recording device" and an "inspection device" according to the technology of the present disclosure. In addition, in the present embodiment, the pulse signal generator SW4 is an example of a "pulse signal generator" according to the technology of the present disclosure. In addition, in the present embodiment, the servo pattern recording head WH is an example of a "servo pattern recording head" according to the technology of the present disclosure. In addition, in the present embodiment, the control device SW5 is an example of an "inspection processor" according to the technology of the present disclosure.

The control device SW5 controls the entire servo writer SW. In the present embodiment, although the control device SW5 is realized by an ASIC, the technology of the present disclosure is not limited to this. For example, the control device SW5 may be realized by an FPGA and/or a PLC. In addition, the control device SW5 may be realized by the computer including a CPU, a flash memory (for example, an EEPROM and/or an SSD), and a RAM. In addition, the control device 30 may be realized by combining two or more of an ASIC, an FPGA, a PLC, and a computer. That is, the control device SW5 may be realized by a combination of a hardware configuration and a software configuration.

A pancake is set in the sending reel SW1. The pancake refers to a large-diameter roll in which the magnetic tape MT cut into a product width from a wide web raw material before writing the servo pattern 58 is wound around a hub.

The driving device SW3 has a motor (not shown) and a gear (not shown), and is mechanically connected to the sending reel SW1 and the winding reel SW2. In a case in which the magnetic tape MT is wound by the winding reel SW2, the driving device SW3 generates power in accordance with the command from the control device SW5, and transmits the generated power to the sending reel SW1 and the winding reel SW2 to rotate the sending reel SW1 and the winding reel SW2. That is, the sending reel SW1 receives the power from the driving device SW3 and is rotated to send the magnetic tape MT to the predetermined transport passage SW7. The winding reel SW2 receives the power from the driving device SW3 and is rotated to wind the magnetic tape MT sent from the sending reel SW1. The rotation speed, the rotation torque, and the like of the sending reel SW1 and the winding reel SW2 are adjusted in accordance with a speed at which the magnetic tape MT is wound around the winding reel SW2.

The plurality of guides SW6 and the servo pattern recording head WH are disposed on the transport passage SW7. The servo pattern recording head WH is disposed on the front surface 31 side of the magnetic tape MT between the plurality of guides SW6. The magnetic tape MT sent from the sending reel SW1 to the transport passage SW7 is guided by the plurality of guides SW6 and is wound by the winding reel SW2 via the servo pattern recording head WH.

The manufacturing process of the magnetic tape MT includes a plurality of steps in addition to the servo pattern recording step. The plurality of steps include an inspection step and a winding step.

For example, the inspection step is a step of inspecting the servo band SB formed on the surface 31 of the magnetic tape MT by the servo pattern recording head WH. The inspection of the servo band SB refers to, for example, a process of determining whether the servo pattern 58 recorded on the servo band SB is correct or not. The determination of whether the servo pattern 58 is correct or not refers to, for example, a determination of whether the servo patterns 58A and 58B are recorded for predetermined locations within the surface 31, without excessive or insufficient magnetization lines 60A1$a$, 60A2$a$, 60B1$a$ and 60B2$a$ and within the tolerance (i.e., refers to a verification of the servo pattern 58).

The inspection step is performed by using the control device SW5 and the verification head VH. The verification head VH is disposed on the downstream side of the servo pattern recording head WH in the transport direction of the magnetic tape MT. In addition, the verification head VH is provided with a plurality of servo reading elements (not shown) in the same way as the magnetic head 28, and the plurality of servo bands SB are read by the plurality of servo reading elements. Further, the verification head VH is skewed on the surface 31 of the magnetic tape MT in the same way as the magnetic head 28.

The verification head VH is connected to the control device SW5. The verification head VH is disposed at a position directly facing the servo band SB as viewed from the surface 31 side of the magnetic tape MT (i.e., the back side of the verification head VH), reads the servo pattern 58 recorded in the servo band SB, and outputs the read result (hereinafter referred to as "servo pattern reading result") to the control device SW5. The control device SW5 inspects the servo band SB (for example, determines whether the servo pattern 58 is correct or not) based on the servo pattern reading result (for example, the servo signal) input from the verification head VH. For example, the control device SW5 operates as the position detection unit 30B shown in FIG. 14 to obtain a position detection result from the servo pattern reading result, and uses the position detection result to determine whether the servo pattern 58 is correct or not to thereby inspect the servo band SB.

The control device SW5 outputs information indicating the result of inspecting the servo band SB (for example, the result of determining whether the servo pattern 58 is correct or not) to a predetermined output destination (for example, the storage 32 (see FIG. 3), the UI system device 34 (see FIG. 3), the external device 37 (see FIG. 3) and/or the like).

For example, after the inspection step is finished, a winding step is performed next. The winding step is a step of winding the magnetic tape MT around the sending reel 22 (that is, the sending reel 22 (see FIGS. 2 to 4) accommodated in the magnetic tape cartridge 12 (FIGS. 1 to 4)) used for each of the plurality of magnetic tape cartridges 12 (see FIGS. 1 to 4). In the winding step, a winding motor M is used. The winding motor M is mechanically connected to the sending reel 22 via a gear and the like. The winding motor M rotates the sending reel 22 by applying a rotation force to the sending reel 22 under the control of the control device (not shown). The magnetic tape MT wound around the winding reel SW2 is wound around the sending reel 22 by the rotation of the sending reel 22. In the winding step, a cutting device (not shown) is used. In a case in which a required amount of the magnetic tape MT is wound around the sending reel 22 for each of the plurality of sending reels 22, the magnetic tape MT sent from the winding reel SW2 to the sending reel 22 is cut by the cutting device.

The pulse signal generator SW4 generates the pulse signal under the control of the control device SW5, and supplies the generated pulse signal to the servo pattern recording head WH. In a state in which the magnetic tape MT travels on the transport passage SW7 at a regular speed, the servo pattern recording head WH records the servo pattern 58 in the servo band SB in response to the pulse signal supplied from the pulse signal generator SW4.

Figure 17:
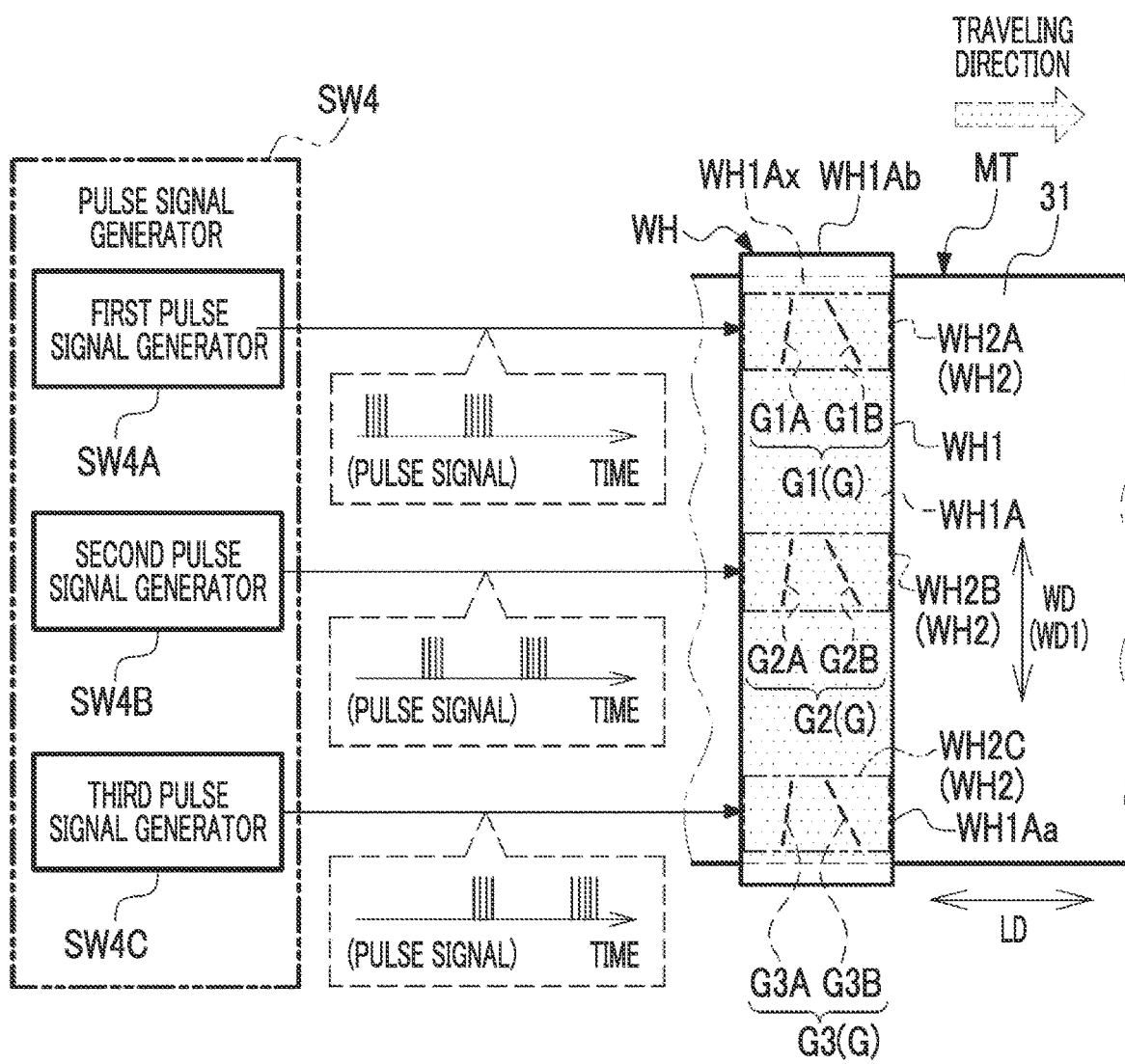
FIG. 17 is a conceptual diagram showing an example of a relationship between a pulse signal generator and a servo pattern recording head provided in the servo writer according to the embodiment, and an example of an aspect in which a state in which the servo pattern recording head provided in the servo writer according to the embodiment is disposed on the magnetic tape is observed from the front surface side of the magnetic tape (that is, a rear surface side of the servo pattern recording head).

FIG. 17 shows an example of a configuration of the servo pattern recording head WH and an example of a configuration of the pulse signal generator SW4 in a case in which the servo pattern recording head WH is observed from the front surface 31 side (that is, the rear surface side of the servo pattern recording head WH) of the magnetic tape MT that travels on the transport passage SW7 (see FIG. 16).

As an example, as shown in FIG. 17, the servo pattern recording head WH has a substrate WH1 and a plurality of head cores WH2. The substrate WH1 is formed in a rectangular parallelepiped shape, and is disposed to cross the front surface 31 of the magnetic tape MT that travels on the transport passage SW7 along the width direction WD. A front surface WH1A of the substrate WH1 is a rectangle having a long side WH1Aa and a short side WH1Ab. The longitudinal direction of the substrate WH1, that is, the orientation of the long side WH1Aa is aligned with a direction WD1 corresponding to the width direction WD (for example, the same direction as the width direction WD). In addition, on the front surface 31, the substrate WH1 crosses the magnetic tape MT in a direction orthogonal to the longitudinal direction LD. That is, the long side WH1Aa crosses the front surface 31 of the magnetic tape MT from one end side to the other end side of the width of the magnetic tape MT along the width direction WD.

The front surface WH1A has a sliding surface WH1Ax. The sliding surface WH1Ax is a surface overlapping the front surface 31 of the magnetic tape MT in the front surface WH1A under a situation in which the substrate WH1 diagonally crosses the front surface 31 of the magnetic tape MT along the width direction WD (for example, a dot-shaped hatching region shown in FIG. 17), and slides against the magnetic tape MT in a traveling state. The width of the sliding surface WH1Ax shown in FIG. 17 (that is, the length of the short side WH1Ab) is merely an example, and the width of the sliding surface WH1Ax may be several times wider than that of the example shown in FIG. 17.

The plurality of head cores WH2 are incorporated in the substrate WH1 along the direction WD1. The direction in which the plurality of head cores WH2 are arranged matches the orientation of the long side WH1Aa. That is, positions of the plurality of head cores WH2 in the longitudinal direction LD are aligned.

A gap pattern G is formed in the head core WH2. The gap pattern G is formed on the front surface WH1A (that is, the surface of the substrate WH1 that faces the front surface 31 of the magnetic tape MT). In addition, the gap pattern G consists of a pair of non-parallel straight line regions. The pair of non-parallel straight line regions refers to, for example, the straight line region having the same geometrical characteristic as the geometrical characteristic of the magnetization straight line 60A1a positioned on the most upstream side in the forward direction among the five magnetization straight lines 60A1a included in the linear magnetization region 60A1 shown in FIG. 9, and the straight line region having the same geometrical characteristic as the geometrical characteristic of the magnetization straight line 60A2a positioned on the most upstream side in the forward direction among the five magnetization straight lines 60A2a included in the linear magnetization region 60A2 shown in FIG. 9.

A plurality of gap patterns G are formed on the front surface WH1A along the direction WD1. The direction in which the plurality of gap patterns G are arranged in the front surface WH1A matches the orientation of the long side WH1Aa. In other words, on the front surface WH1A, the plurality of gap patterns G are arranged in a straight line along the long side WH1Aa. In addition, on the front surface WH1A, the positions of the plurality of gap patterns G in the longitudinal direction LD are aligned. On the front surface WH1A, an interval between the gap patterns G adjacent to each other in the direction WD1 with respect to the direction WD1 corresponds to the interval between the servo bands SB of the magnetic tape MT with respect to the width direction WD (that is, the servo band pitch).

A coil (not shown) is wound around the head core WH2, and the pulse signal is supplied to the coil. The pulse signal supplied to the coil is the pulse signal for the servo pattern 58A and the pulse signal for the servo pattern 58B.

In a case in which the pulse signal for the servo pattern 58A is supplied to the coil of the head core WH2 in a state in which the gap pattern G faces the servo band SB of the magnetic tape MT that travels on the transport passage SW7, the magnetic field is applied to the servo band SB of the magnetic tape MT from the gap pattern Gin response to the pulse signal. As a result, the servo pattern 58A is recorded in the servo band SB. In addition, by supplying the pulse signal for the servo pattern 58B to the coil of the head core WH2 in a state in which the gap pattern G faces the servo band SB of the magnetic tape MT that travels on the transport passage SW7, the magnetic field is applied to the servo band SB of the magnetic tape MT from the gap pattern Gin response to the pulse signal. As a result, the servo pattern 58B is recorded in the servo band SB.

The pulse signal corresponding to each servo pattern 58 (that is, the servo pattern 58 for each frame 56 (see FIG. 9)) is modulated. By modulating the pulse signal, various pieces of information are embedded in the pulse signal. In this case, for example, by modulating the pulse signal for the servo pattern 58A, it is possible to change, for each servo pattern 58A, the interval between the third magnetization straight line 60A1a and the second magnetization straight line 60A1a among the five magnetization straight lines 60A1a (see FIG. 9) (hereinafter, also referred to as "first interval"), and the interval between the third magnetization straight line 60A1a and the fourth magnetization straight line 60A1a (hereinafter, also referred to as "second interval"). By making the first interval and the second interval different for each servo pattern 58A, it is possible to embed the information of at least 1 bit in each servo pattern 58A. As a result, it is possible to embed various pieces of information by combining the plurality of servo patterns 58.

It should be noted that, in the pulse signal, information on the position in the longitudinal direction LD, information for identifying the servo band SB, and/or information for specifying a manufacturer of the magnetic tape MT may also be embedded, and the pulse signal need only be modulated in accordance with the information to be embedded.

In the example shown in FIG. 17, head cores WH2A, WH2B, and WH2C are shown as an example of the plurality of head cores WH2, and gap patterns G1, G2, and G3 are shown as an example of the plurality of gap patterns G. The gap pattern G1 is formed in the head core WH2A. The gap pattern G2 is formed in the head core WH2B. The gap pattern G3 is formed in the head core WH2C.

The gap patterns G1 to G3 has the same geometrical characteristics as each other. In the present embodiment, for example, the gap pattern G1 is used for recording the servo pattern 58 (see FIG. 9) for the servo band SB3 (see FIG. 9), the gap pattern G2 is used for recording the servo pattern 58 (see FIG. 9) for the servo band SB2 (see FIG. 9), and the gap pattern G3 is used for recording the servo pattern 58 (see FIG. 9) for the servo band SB1 (see FIG. 9).

The gap pattern G1 is a straight line region pair consisting of straight line regions G1A and G1B. In addition, the gap pattern G2 is a straight line region pair consisting of straight line regions G2A and G2B. In addition, the gap pattern G3 is a straight line region pair consisting of straight line regions G3A and G3B.

In the present embodiment, the straight line region pair consisting of the straight line regions G1A and G1B, the straight line region pair consisting of the straight line regions G2A and G2B, and the straight line region pair consisting of the straight line regions G3A and G3B are examples of a "straight line region pair" according to the technology of the present disclosure. In addition, in the present embodiment, the straight line regions G1A, G2A, and G3A are examples of a "first straight line region" according to the technology of the present disclosure. In addition, in the present embodiment, the straight line regions G1B, G2B, and G3B are examples of a "second straight line region" according to the technology of the present disclosure.

The pulse signal generator SW4 includes a first pulse signal generator SW4A, a second pulse signal generator SW4B, and a third pulse signal generator SW4C. The first pulse signal generator SW4A is connected to the head core WH2A. The second pulse signal generator SW4B is connected to the head core WH2B. The third pulse signal generator SW4C is connected to the head core WH2C.

In a case in which the gap pattern G1 is used for the servo band SB3 (see FIG. 9), in a case in which the first pulse signal generator SW4A supplies the pulse signal to the head core WH2A, the magnetic field is applied from the gap pattern G1 to the servo band SB3 in response to the pulse signal, and the servo pattern 58 (see FIG. 9) is recorded in the servo band SB3.

For example, in a case in which the pulse signal for the servo pattern 58A is supplied to the head core WH2A in a state in which the gap pattern G1 faces the servo band SB3 of the magnetic tape MT that travels on the transport passage SW7, the servo pattern 58A (see FIG. 9) is recorded in the servo band SB3. That is, the linear magnetization region 60A1 (see FIG. 9) is recorded in the servo band SB3 by the straight line region G1A, and the linear magnetization region 60A2 (see FIG. 9) is recorded in the servo band SB3 by the straight line region G1B.

In addition, for example, in a case in which the pulse signal for the servo pattern 58B is supplied to the head core WH2A in a state in which the gap pattern G1 faces the servo band SB3 of the magnetic tape MT that travels on the transport passage SW7, the servo pattern 58B (see FIG. 9) is recorded in the servo band SB3. That is, the linear magnetization region 60B1 (see FIG. 9) is recorded in the servo band SB3 by the straight line region G1A, and the linear magnetization region 60B2 (see FIG. 9) is recorded in the servo band SB3 by the straight line region G1B.

In a case in which the gap pattern G2 is used for the servo band SB2 (see FIG. 9), in a case in which the second pulse signal generator SW4B supplies the pulse signal to the head core WH2B, the magnetic field is applied from the gap pattern G2 to the servo band SB2 in response to the pulse signal, and the servo pattern 58 is recorded in the servo band SB2.

For example, in a case in which the pulse signal for the servo pattern 58A is supplied to the head core WH2B in a state in which the gap pattern G2 faces the servo band SB2 of the magnetic tape MT that travels on the transport passage SW7, the servo pattern 58A (see FIG. 9) is recorded in the servo band SB2. That is, the linear magnetization region 60A1 is recorded in the servo band SB2 by the straight line region G2A, and the linear magnetization region 60A2 is recorded in the servo band SB2 by the straight line region G2B.

In addition, for example, in a case in which the pulse signal for the servo pattern 58B is supplied to the head core WH2B in a state in which the gap pattern G2 faces the servo band SB2 of the magnetic tape MT that travels on the transport passage SW7, the servo pattern 58B is recorded in the servo band SB2. That is, the linear magnetization region 60B1 is recorded in the servo band SB2 by the straight line region G2A, and the linear magnetization region 60B2 is recorded in the servo band SB2 by the straight line region G2B.

In a case in which the gap pattern G3 is used for the servo band SB1 (see FIG. 9), in a case in which the third pulse signal generator SW4C supplies the pulse signal to the head core WH2C, the magnetic field is applied from the gap pattern G3 to the servo band SB1 in response to the pulse signal, and the servo pattern 58 is recorded in the servo band SB1.

For example, in a case in which the pulse signal for the servo pattern 58A is supplied to the head core WH2C in a state in which the gap pattern G3 faces the servo band SB1 of the magnetic tape MT that travels on the transport passage SW7, the servo pattern 58A is recorded in the servo band SB1. That is, the linear magnetization region 60A1 is recorded in the servo band SB1 by the straight line region G3A, and the linear magnetization region 60A2 is recorded in the servo band SB1 by the straight line region G3B.

In addition, for example, in a case in which the pulse signal for the servo pattern 58B is supplied to the head core WH2C in a state in which the gap pattern G3 faces the servo band SB1 of the magnetic tape MT that travels on the transport passage SW7, the servo pattern 58B is recorded in the servo band SB1. That is, the linear magnetization region 60B1 is recorded in the servo band SB1 by the straight line region G3A, and the linear magnetization region 60B2 is recorded in the servo band SB1 by the straight line region G3B.

As an example, as shown in FIG. 18, in the gap pattern G1, the straight line regions G1A and G1B are inclined in opposite directions with respect to the straight line along the direction WD1, that is, the imaginary straight line C1. In other words, the straight line region G1A is inclined in one direction (for example, the clockwise direction as viewed from the paper surface side of FIG. 18) with respect to the imaginary straight line C1. On the other hand, the straight line region G1B is inclined in the other direction (for example, the counterclockwise direction as viewed from the paper surface side of FIG. 18) with respect to the imaginary straight line C1. In addition, the straight line region G1A has a steeper inclined angle with respect to the imaginary straight line C1 than the straight line region G1B. Here, "steep" means that, for example, the angle of the straight line region G1A with respect to the imaginary straight line C1 is smaller than the angle of the straight line region G1B with respect to the imaginary straight line C1. In addition, the positions of both ends of the straight line region G1A and the positions of both ends of the straight line region G1B are aligned in the direction WD1. In addition, a total length of the straight line region G1A is shorter than a total length of the straight line region G1B.

In the gap pattern G2, the straight line regions G2A and G2B are inclined in opposite directions with respect to the imaginary straight line C1. In other words, the straight line region G2A is inclined in one direction (for example, the clockwise direction as viewed from the paper surface side of FIG. 18) with respect to the imaginary straight line C1. On the other hand, the straight line region G2B is inclined in the other direction (for example, the counterclockwise direction as viewed from the paper surface side of FIG. 18) with respect to the imaginary straight line C1. In addition, the straight line region G2A has a steeper inclined angle with respect to the imaginary straight line C1 than the straight line region G2B. Here, "steep" means that, for example, the angle of the straight line region G2A with respect to the imaginary straight line C1 is smaller than the angle of the straight line region G2B with respect to the imaginary straight line C1. In addition, the positions of both ends of the straight line region G2A and the positions of both ends of the straight line region G2B are aligned in the direction WD1. In addition, a total length of the straight line region G2A is shorter than a total length of the straight line region G2B.

In the gap pattern G3, the straight line regions G3A and G3B are inclined in opposite directions with respect to the imaginary straight line C1. In other words, the straight line region G3A is inclined in one direction (for example, the clockwise direction as viewed from the paper surface side of FIG. 18) with respect to the imaginary straight line C1. On the other hand, the straight line region G3B is inclined in the other direction (for example, the counterclockwise direction as viewed from the paper surface side of FIG. 18) with respect to the imaginary straight line C1. In addition, the straight line region G3A has a steeper inclined angle with respect to the imaginary straight line C1 than the straight line region G3B. Here, "steep" means that, for example, the angle of the straight line region G3A with respect to the imaginary straight line C1 is smaller than the angle of the straight line region G3B with respect to the imaginary straight line C1. In addition, the positions of both ends of the straight line region G3A and the positions of both ends of the straight line region G3B are aligned in the direction WD1. In addition, a total length of the straight line region G3A is shorter than a total length of the straight line region G3B.

On the front surface WH1A, the long side WH1Aa is longer than the width of the magnetic tape MT. The short side WH1Ab is a length in which the gap patterns G1, G2, and G3 are contained. The substrate WH1 is disposed on the magnetic tape MT in a posture in which the orientation of the long side WH1Aa and the longitudinal direction LD are orthogonal to each other. That is, the substrate WH1 is disposed on the front surface 31 side of the magnetic tape MT in a state in which the plurality of gap patterns G and the front surface 31 face each other, and in a posture in which the orientation of the long side WH1Aa and the longitudinal direction LD are orthogonal to each other.

The phases of the pulse signals used between the gap patterns G1, G2, and G3 (that is, as shown in FIG. 17, the pulse signal supplied from the first pulse signal generator SW4A (see FIG. 17) to the head core WH2A, the pulse signal supplied from the second pulse signal generator SW4B (see FIG. 17) to the head core WH2B, and the pulse signal supplied from the third pulse signal generator SW4C (see FIG. 17) to the head core WH2C) deviate from each other.

Specifically, the pulse signal generator SW4 (see FIG. 17) supplies the pulse signal with a delay of a predetermined time to each of the gap patterns G1, G2, and G3 from one side to the other side in a direction in which the gap patterns G1, G2, and G3 are arranged. Here, one side refers to a side of the gap pattern G3, and the other side refers to a side of the gap pattern G1. In the example shown in FIG. 18, the pulse signal is first supplied to the gap pattern G3, the pulse signal is secondly supplied to the gap pattern G2 with the delay of the predetermined time, and then the pulse signal is supplied to the gap pattern G1 with the delay of the predetermined time.

The predetermined time is a time determined in advance in accordance with the predetermined interval described above (that is, the predetermined interval calculated from Expression (1)) and a traveling speed of the magnetic tape MT that travels on the transport passage SW7, and is a fixed value derived in advance by a test with an actual machine and/or a computer simulation in order to realize the predetermined interval, for example.

It should be noted that the predetermined time may be a variable value that is changed in accordance with various conditions. In this case, for example, the predetermined time is calculated from an arithmetic expression having the predetermined interval as a first independent variable, the traveling speed of the magnetic tape MT that travels on the transport passage SW7 as a second independent variable, and the predetermined time as a dependent variable. Examples of the predetermined interval used as the first independent variable include an interval designated by the user or the like of the servo writer SW as the interval in the longitudinal direction LD of the pair of frames 56 having the correspondence relationship between the servo bands SB adjacent to each other in the width direction WD. Examples of the traveling speed used as the second independent variable include a traveling speed designated by the user of the servo writer SW or the like, and a traveling speed measured by a sensor (not shown).

In the servo pattern recording step, in a state in which the position of the gap pattern G1 corresponds to the position of the servo band SB3, the position of the gap pattern G2 corresponds to the position of the servo band SB2, and the position of the gap pattern G3 corresponds to the position of the servo band SB1, the magnetic tape MT travels on the transport passage SW7 at a regular speed. Moreover, in this state, the pulse signal for the servo pattern 58A and the pulse signal for the servo pattern 58B are alternately supplied to the head core WH2A, the head core WH2B, and the head core WH2C.

In a case in which the pulse signal for the servo pattern 58A is supplied to the head core WH2A, the head core WH2B, and the head core WH2C in the deviated phase, the servo patterns 58A are recorded in the servo band SB3, the servo band SB2, and the servo band SB1 in a state of deviating from each other at the predetermined interval in the longitudinal direction LD. In addition, in a case in which the pulse signal for the servo pattern 58B is supplied to the head core WH2A, the head core WH2B, and the head core WH2C in the deviated phase, the servo patterns 58B are recorded in the servo band SB3, the servo band SB2, and the servo band SB1 in a state of deviating from each other at the predetermined intervals in the longitudinal direction LD.

Here, the geometrical characteristic of the gap pattern G on the front surface WH1A will be described with reference to FIG. 19.

Figure 19:
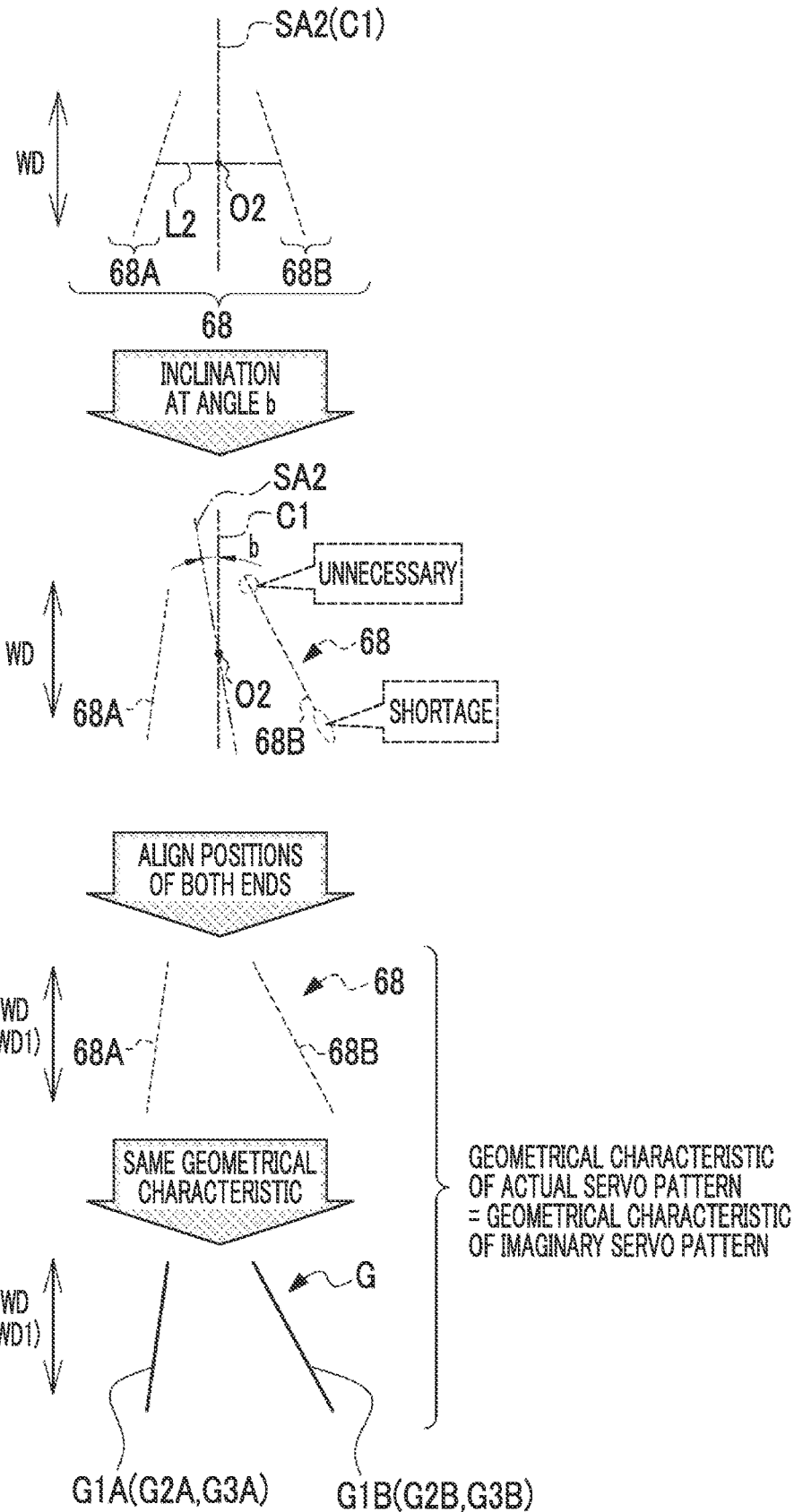
FIG. 19 is a conceptual diagram showing an example of a relationship between a geometrical characteristic of an actual gap pattern and a geometrical characteristic of an imaginary gap pattern.

As an example, as shown in FIG. 19, the geometrical characteristic of the gap pattern G on the front surface WH1A can be expressed by using an imaginary straight line region pair 68. The imaginary straight line region pair 68 consists of an imaginary straight line region 68A and an imaginary straight line region 68B. In the present embodiment, the imaginary straight line region pair 68 is an example of a "pair of imaginary straight line regions" according to the technology of the present disclosure, the imaginary straight line region 68A is an example of "one imaginary straight line region" according to the technology of the present disclosure, and the imaginary straight line region 68B is an example of "the other imaginary straight line region" according to the technology of the present disclosure.

The imaginary straight line region pair 68 is the imaginary straight line region pair having the same geometrical characteristic as the gap pattern G shown in FIG. 18. The imaginary straight line region pair 68 is the imaginary straight line region pair used for convenience for describing the geometrical characteristic of the gap pattern G on the front surface WH1A, and is not an actually present straight line region pair.

In the present embodiment, for example, the imaginary straight line region 68A has the same geometrical characteristic as the straight line region G1A shown in FIG. 18, and the imaginary straight line region 68B has the same geometrical characteristic as the straight line region G1B shown in FIG. 18.

A center O2 is provided in the imaginary straight line region pair 68. For example, the center O2 is the center of a line segment L2 connecting the center of the imaginary straight line region 68A and the center of the imaginary straight line region 68B.

The imaginary straight line region 68A and the imaginary straight line region 68B are inclined line-symmetrically with respect to the imaginary straight line C1. Here, in a case in which the imaginary straight line region pair 68 and the imaginary linear region pair 62 shown in FIG. 10 in a case in which the entirety of the imaginary straight line region pair 68 is inclined with respect to the imaginary straight line C1 by inclining a symmetry axis SA2 of the imaginary straight line region 68A and the imaginary straight line region 68B at an angle b (for example, 10 degrees) with respect to the imaginary straight line C1 with the center O2 as the rotation axis are compared, the shortage part and the unnecessary part are generated in the imaginary straight line region pair 68. Here, the shortage part refers to the shortage part in a case in which the servo pattern recording head WH records the servo pattern 58 in the magnetic tape MT, and the unnecessary part refers to the unnecessary part in a case in which the servo pattern recording head WH records the servo pattern 58 in the magnetic tape MT. In the example shown in FIG. 19, an aspect is shown in which the shortage part and the unnecessary part are generated in the imaginary straight line region 68B.

Therefore, by compensating for the shortage part and removing unnecessary part, the positions of both ends of the imaginary straight line region 68A and the positions of both ends of the imaginary straight line region 68B are aligned in the direction WD1.

The geometrical characteristic of the imaginary straight line region pair 68 obtained as described above (that is, the geometrical characteristic of the imaginary gap pattern) corresponds to the geometrical characteristic of the actual gap pattern G. That is, on the front surface WH1A (see FIG. 18), the gap pattern G having the geometrical characteristic corresponding to the geometrical characteristic of the imaginary straight line region pair 68 obtained by aligning the positions of both ends of the imaginary straight line region 68A and the positions of both ends of the imaginary straight line region 68B in the direction WD1 is formed.

Next, an action of the magnetic tape system 10 will be described.

The magnetic tape cartridge 12 accommodates the magnetic tape MT shown in FIG. 9 (see FIGS. 9 and 11). The magnetic tape cartridge 12 is loaded into the magnetic tape drive 14. In the magnetic tape drive 14, in a case in which the magnetic tape MT is subjected to the magnetic processing by the magnetic element unit 42 (see FIGS. 3 and 15), the magnetic tape MT is pulled out from the magnetic tape cartridge 12, and the servo pattern 58 in the servo band SB is read by the servo reading element SR of the magnetic head 28.

As shown in FIGS. 9 and 10, the linear magnetization regions 60A1 and 60A2 included in the servo pattern 58A recorded in the servo band SB of the magnetic tape MT are inclined in opposite directions with respect to the imaginary straight line C1. On the other hand, as shown in FIG. 13, the magnetic head 28 is also inclined to the upstream side in the forward direction by the angle β (that is, the angle β counterclockwise as viewed from the paper surface side of FIG. 13) on the magnetic tape MT. In a case in which the servo pattern 58A is read by the servo reading element SR in this state, since the angle formed by the linear magnetization region 60A1 and the servo reading element SR and the angle formed by the linear magnetization region 60A2 and the servo reading element SR are close to each other, the variation in the servo signal due to the azimuth loss is smaller than the variation generated between the servo signal derived from the linear magnetization region 54A1 included in the known servo pattern 52A in the related art and the servo signal derived from the linear magnetization region 54A2 included in the known servo pattern 52A in the related art.

As a result, the variation between the servo signal derived from the linear magnetization region 60A1 and the servo signal derived from the linear magnetization region 60A2 is smaller than the variation generated between the servo signal derived from the linear magnetization region 54A1 included in the known servo pattern 52A in the related art and the servo signal derived from the linear magnetization region 54A2 included in the known servo pattern 52A in the related art, and the servo signal having higher reliability than the servo signal obtained from the known servo pattern 52A in the related art can be obtained (hereinafter, this effect is also referred to as "first effect"). It should be noted that, as shown in FIG. 13, also in a case in which the servo pattern 58B is read by the servo reading element SR in a state in which the magnetic head 28 on the magnetic tape MT is inclined to the upstream side in the forward direction at the angle β (that is, the angle β counterclockwise as viewed from the paper surface side of FIG. 13), the same effect as the first effect (hereinafter, this effect is also referred to as "second effect") can be obtained.

By the way, in a case in which the positions of both ends of the linear magnetization region 60A1 and the positions of both ends of the linear magnetization region 60A2 are not aligned in the width direction WD, one end portion of the linear magnetization region 60A1 is read by the servo reading element SR, but one end portion of the linear magnetization region 60A2 are not read, or the other end portion of the linear magnetization region 60A1 is read by the servo reading element SR, but the other end portion of the linear magnetization region 60A2 are not read.

Therefore, in the magnetic tape MT according to the present embodiment, in the servo band SB, the positions of both ends of the linear magnetization region 60A1 (that is, the positions of both ends of each of the five magnetization straight lines 60A1a) and the positions of both ends of the linear magnetization region 60A2 (that is, the positions of both ends of each of the five magnetization straight lines 60A2a) are aligned in the width direction WD. Therefore, in a case in which the servo pattern 58A is read by the servo reading element SR, as compared with a case in which the positions of both ends of the linear magnetization region 60A1 and the positions of both ends of the linear magnetization region 60A2 are not aligned in the width direction WD, the linear magnetization regions 60A1 and 60A2 can be read by the servo reading element SR without excess or deficiency. As a result, as compared with a case in which the positions of both ends of the linear magnetization region 60A1 and the positions of both ends of the linear magnetization region 60A2 are not aligned in the width direction WD, the servo signal having high reliability can be obtained (hereinafter, this effect is referred to as "third effect"). It should be noted that, in a case in which the servo pattern 58B is read by the servo reading element SR, the same effect as the third effect (hereinafter, this effect is also referred to as a "fourth effect") can be obtained.

As shown in FIGS. 9 and 10, although the gradient of the linear magnetization region 60A1 with respect to the imaginary straight line C1 is steeper than the gradient of the linear magnetization region 60A2 with respect to the imaginary straight line C1, in a case in which the total length of the linear magnetization region 60A1 is longer than the total length of the linear magnetization region 60A2, a part read by the servo reading element SR and a part that is not read are generated between the linear magnetization region 60A1 and the linear magnetization region 60A2. In addition, even in a case in which the total length of the linear magnetization region 60B1 is longer than the total length of the linear magnetization region 60B2, the part read by the servo reading element SR and the part that is not read are generated between the linear magnetization region 60B1 and the linear magnetization region 60B2. Therefore, in the magnetic tape MT according to the present embodiment, the total length of the linear magnetization region 60A1 is shorter than the total length of the linear magnetization region 60A2, and the total length of the linear magnetization region 60B1 is shorter than the total length of the linear magnetization region 60B2. As a result, the linear magnetization regions 60A1 and 60A2 can be read by the servo reading element SR and the linear magnetization regions 60B1 and 60B2 can be read by the servo reading element SR without excess or deficiency (hereinafter, this effect is referred to as "fifth effect").

In addition, in the magnetic tape MT according to the present embodiment, the linear magnetization region 60A1 is a set of five magnetization straight lines 60A1a, and the linear magnetization region 60A2 is a set of five magnetization straight lines 60A2a. In addition, the linear magnetization region 60B1 is a set of four magnetization straight lines 60B1a, and the linear magnetization region 60B2 is a set of four magnetization straight lines 60B2a. Therefore, an amount of information obtained from the servo pattern 58 can be increased as compared with a case in which each linear magnetization region consists of one magnetization straight line, and as a result, highly accurate servo control can be realized (hereinafter, this effect is referred to as "sixth effect").

In addition, in the magnetic tape MT according to the present embodiment, the geometrical characteristic of the linear magnetization region pair 60A on the magnetic tape MT corresponds to the geometrical characteristic in which the positions of both ends of the imaginary linear region 62A and the positions of both ends of the imaginary linear region 62B are aligned in the width direction WD in a case in which the entirety of the imaginary linear region pair 62 is inclined with respect to the imaginary straight line C1 by inclining, with respect to the imaginary straight line C1, the symmetry axis SA1 of the imaginary linear region pair 62. Therefore, the variation between the servo signal derived from the linear magnetization region 60A1 and the servo signal derived from the linear magnetization region 60A2 can be made smaller than a case in which the servo pattern 52A having the known geometrical characteristic in the related art is read by the servo reading element SR. As a result, it is possible to obtain the servo signal having higher reliability than the servo signal obtained from the servo pattern 52A having the known geometrical characteristic in the related art (hereinafter, this effect is referred to as "seventh effect").

It should be noted that the linear magnetization region pair 60B is different from the linear magnetization region pair 60A only in that the linear magnetization region 60B1 is provided instead of the linear magnetization region 60A1, and the linear magnetization region 60B2 is provided instead of the linear magnetization region 60A2. The linear magnetization region pair 60B configured as described above is also read by the servo reading element SR in the same manner as the linear magnetization region pair 60A. Therefore, the variation between the servo signal derived from the linear magnetization region 60B1 and the servo signal derived from the linear magnetization region 60B2 can be made smaller than a case in which the servo pattern 52B having the known geometrical characteristic in the related art is read by the servo reading element SR. As a result, it is possible to obtain the servo signal having higher reliability than the servo signal obtained from the servo pattern 52B having the known geometrical characteristic in the related art (hereinafter, this effect is referred to as "eighth effect").

In the present embodiment, a pair of servo patterns 58 corresponding to each other between the servo bands SB is read by the servo reading elements SR1 and SR2 included in the magnetic head 28. In addition, in the present embodiment, the magnetic head 28 is used in a state of being skewed on the magnetic tape MT (see FIGS. 13 to 15). Here, in a case in which the pair of servo patterns 58 corresponding to each other between the servo bands SB is tentatively disposed in the longitudinal direction LD without deviating at the predetermined intervals, a time difference is generated between a timing at which one servo pattern 58 of the pair of servo patterns 58 corresponding to each other between the servo bands SB is read and a timing at which the other servo pattern 58 is read. Therefore, in the magnetic tape MT according to the present embodiment, the servo patterns 58 corresponding to each other between the servo bands SB deviate from each other at the predetermined intervals in the longitudinal direction LD between the servo bands SB adjacent to each other in the width direction WD. As a result, as compared with a case in which the pair of servo patterns 58 corresponding to each other between the servo bands SB is tentatively disposed without deviating at the predetermined intervals, the time difference generated between the timing at which one servo pattern 58 of the pair of servo patterns 58 corresponding to each other between the servo bands SB adjacent to each other in the width direction WD is read and the timing at which the other servo pattern 58 is read can be reduced (hereinafter, this effect is referred to as "ninth effect").

In the present embodiment, the servo band SB is divided by the plurality of frames 56 (see FIGS. 9 and 11). The frame 56 is defined based on the pair of servo patterns 58 (that is, the servo patterns 58A and 58B). In addition, in the present embodiment, the pair of servo patterns 58 included in the pair of frames 56 having the correspondence relationship between the servo bands SB adjacent to each other in the width direction WD is read by the servo reading elements SR1 and SR2 included in the magnetic head 28. In addition, in the present embodiment, the magnetic head 28 is used in a state of being skewed on the magnetic tape MT (see FIGS. 13 to 15). Here, in a case in which the pair of servo patterns 58 included in the pair of frames 56 having the correspondence relationship between the servo bands SB adjacent to each other in the width direction WD is tentatively disposed in the longitudinal direction LD without deviating at the predetermined intervals, a time difference is generated between a timing at which one servo pattern 58 of the pair of servo patterns 58 is read and a timing at which the other servo pattern 58 is read. Therefore, in the magnetic tape MT according to the present embodiment, the pair of servo patterns 58 included in the pair of frames 56 having the correspondence relationship between the servo bands SB adjacent to each other in the width direction WD deviate from each other at the predetermined intervals in the longitudinal direction LD between the servo bands SB adjacent to each other in the width direction WD. As a result, as compared with a case in which the pair of frames 56 corresponding to each other between the servo bands SB adjacent to each other in the width direction WD is disposed without deviating at the predetermined intervals, the time difference generated between the timing at which one servo pattern 58 of the pair of servo patterns 58 included in the pair of frames 56 having the correspondence relationship between the servo bands SB adjacent to each other in the width direction WD is read and the timing at which the other servo pattern 58 is read can be reduced (hereinafter, this effect is referred to as "tenth effect").

In the present embodiment, as shown in FIG. 11, the predetermined interval is defined based on the angle α formed by the interval between the frame 56 having no correspondence relationship between the servo bands SB adjacent to each other in the width direction WD, and the imaginary straight line C1, the servo band pitch, and the total length of the frame 56 in the longitudinal direction. That is, the predetermined interval is defined by Expression (1) and is calculated from Expression (1). Therefore, the predetermined interval can be easily obtained as compared with a case in which the predetermined interval is defined without using any of the angle α, the servo band pitch, and the total length of the frame 56 in the longitudinal direction (hereinafter, this effect is referred to as "eleventh effect").

In the present embodiment, the servo signal, which is the result of reading the servo pattern 58 by the servo reading element SR, is detected by using the autocorrelation coefficient (see FIG. 15). As a result, the servo signal can be detected more accurately than a case in which the servo signal is detected by using only a method of determining whether or not the signal level exceeds a threshold value (hereinafter, this effect is referred to as "twelfth effect").

Next, an action of the servo writer SW will be described.

In the servo writer SW, in a case in which the servo pattern 58 is recorded in the magnetic tape MT by the servo pattern recording head WH, the magnetic tape MT is sent to the transport passage SW7, and the magnetic tape MT is caused to travel at a regular speed. In this case, in a state in which the position of the gap pattern G1 corresponds to the position of the servo band SB3, the position of the gap pattern G2 corresponds to the position of the servo band SB2, and the position of the gap pattern G3 corresponds to the position of the servo band SB1, the magnetic tape MT is caused to travel. In this state, the pulse signal for the servo pattern 58A and the pulse signal for the servo pattern 58B are alternately supplied to the head core WH2A, the head core WH2B, and the head core WH2C of the servo pattern recording head WH.

The gap pattern G consists of the pair of non-parallel straight line regions. The pair of non-parallel straight line regions refers to the straight line region having the same geometrical characteristic as the geometrical characteristic of the magnetization straight line 60A1a positioned on the most upstream side in the forward direction among the five magnetization straight lines 60A1a included in the linear magnetization region 60A1 shown in FIG. 9, and the straight line region having the same geometrical characteristic as the geometrical characteristic of the magnetization straight line 60A2a positioned on the most upstream side in the forward direction among the five magnetization straight lines 60A2a included in the linear magnetization region 60A2 shown in FIG. 9. In addition, the gap patterns G1, G2, and G3 deviate from each other at the predetermined intervals along the direction LD1 corresponding to the longitudinal direction LD.

Therefore, in a case in which the pulse signal for the servo pattern 58A is supplied to the head core WH2A, the head core WH2B, and the head core WH2C in the same phase, the servo patterns 58A are recorded in the servo band SB3, the servo band SB2, and the servo band SB1 in a state of deviating from each other at the predetermined intervals in the longitudinal direction LD. In addition, in a case in which the pulse signal for the servo pattern 58B is supplied to the head core WH2A, the head core WH2B, and the head core WH2C in the same phase, the servo patterns 58B are recorded in the servo band SB3, the servo band SB2, and the servo band SB1 in a state of deviating from each other at the predetermined intervals in the longitudinal direction LD.

In a case in which the servo pattern 58A recorded in the servo band SB of the magnetic tape MT obtained as described above is read by the servo reading element SR included in the magnetic head 28 in a skewed state on the magnetic tape MT, the first to twelfth effects can be obtained.

Figure 20:
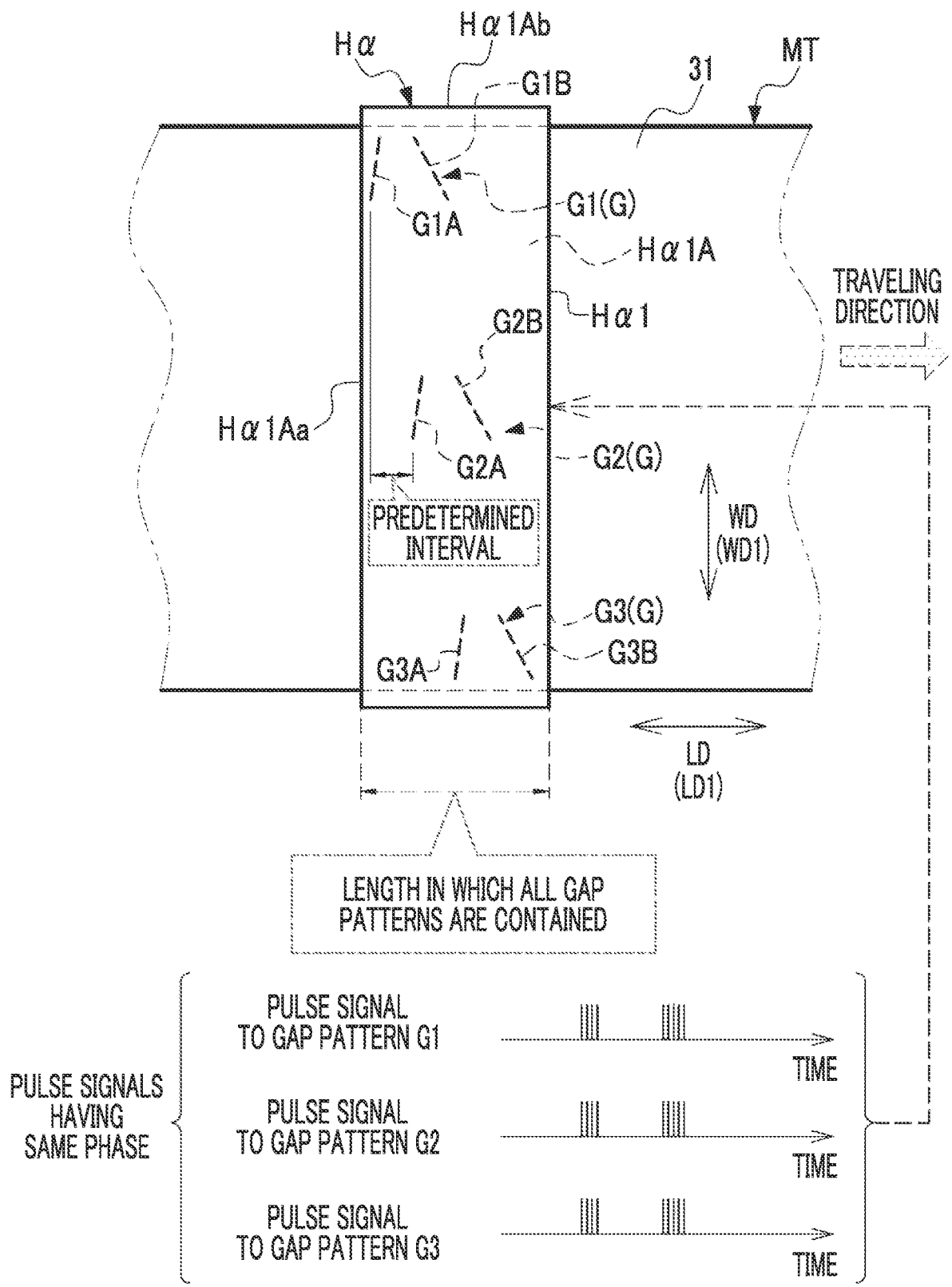
FIG. 20 is a conceptual diagram showing an example of an aspect in which a state in which the servo pattern recording head according to a first comparative example is disposed on the magnetic tape is observed from the front surface side of the magnetic tape (that is, the rear surface side of the servo pattern recording head).

As shown in FIG. 20 as a first comparative example, even in a case in which a servo pattern recording head Ha is used, the servo patterns 58 can be recorded in the servo band SB3, the servo band SB2, and the servo band SB1 in a state of deviating at the predetermined intervals in the longitudinal direction LD. The servo pattern recording head Ha is different from the servo pattern recording head WH in that a substrate Hα1 is provided instead of the substrate WH1. The substrate Hα1 is formed in a rectangular parallelepiped shape, and is disposed to cross the front surface 31 of the magnetic tape MT that travels on the transport passage SW7 along the width direction WD. A front surface Hα1A of the substrate Hα1 is a rectangle having a long side Hα1Aa and a short side Hα1Ab, and the long side Hα1Aa crosses the front surface 31 of the magnetic tape MT along the width direction WD.

The long side Hα1Aa is longer than the width of the magnetic tape MT. The long side Hα1Aa direction and the width direction WD match, and the substrate Hα1 is disposed on the front surface 31 side of the magnetic tape MT in a state in which the plurality of gap patterns G and the front surface 31 face to each other and in a state of crossing the magnetic tape MT in the width direction WD.

In the servo pattern recording head Ha, the gap patterns G1, G2, and G3 deviate from each other at the predetermined intervals described above (that is, the predetermined interval calculated from Expression (1)) in a direction LD1 corresponding to the longitudinal direction LD (for example, the same direction as the longitudinal direction LD), between the gap patterns G adjacent to each other along the direction WD1. Moreover, a direction of the short side Hα1Ab and the direction LD1 match, and the short side Hα1Ab is a length in which all of the gap patterns G1, G2, and G3 are contained. That is, the length of the short side Hα1Ab is set to be a length in which at least the amount of the gap patterns G1 to G3 deviating from the gap pattern G1 to the gap pattern G3 along the direction LD1 is compensated. In the servo pattern recording head Ha configured as described above, the pulse signal having the same phase is supplied to each of the gap patterns G1, G2, and G3 to record the plurality of servo patterns 58 in the plurality of servo bands SB, respectively (see FIG. 9).

On the other hand, in the servo pattern recording head WH, the gap patterns G1, G2, and G3 are arranged in a straight line in the direction orthogonal to the direction LD1 and the pulse signal is delayed by the predetermined time, so that the arrangement of the plurality of servo patterns 58 shown in FIG. 9 can be realized without deviating the gap patterns G1, G2, and G3 in the direction LD1. The short side WH1Ab can be made shorter than the short side HαlAb by an amount that the gap patterns G1, G2, and G3 do not need to deviate from each other in the direction LD1. The fact that the short side WH1Ab is shorter than the short side HαlAb means that an area of the front surface WH1A is smaller than an area of the front surface HαlA. As a result, an area in which the front surface WH1A contacts the front surface 31 of the magnetic tape MT (that is, an area of the sliding surface WH1Ax shown in FIG. 17) can be made smaller than an area in which the front surface HαlA shown in FIG. 20 contacts the front surface 31 of the magnetic tape MT, so that in the servo pattern recording head WH, the friction generated between the magnetic tape MT and the front surface WH1A can be suppressed as compared with the servo pattern recording head Ha. In addition, the suppression of the friction contributes to stabilizing the traveling of the magnetic tape MT.

Figure 21:
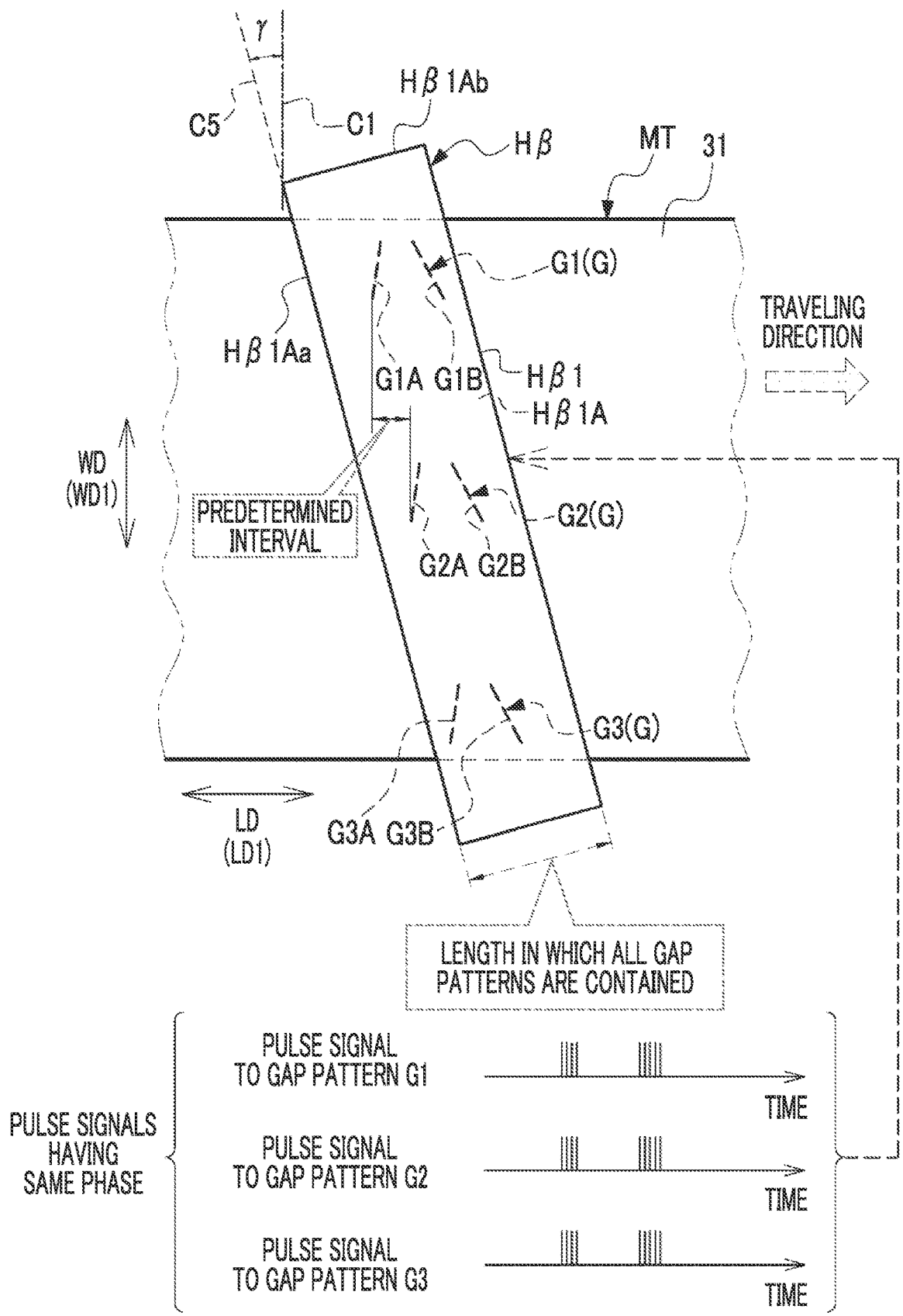
FIG. 21 is a conceptual diagram showing an example of an aspect in which a state in which the servo pattern recording head according to a second comparative example is disposed on the magnetic tape is observed from the front surface side of the magnetic tape (that is, the rear surface side of the servo pattern recording head).

As shown in FIG. 21 as a second comparative example, even in a case in which a servo pattern recording head HP is used, the servo patterns 58 can be recorded in the servo band SB3, the servo band SB2, and the servo band SB1 in a state of deviating at the predetermined intervals in the longitudinal direction LD. The servo pattern recording head HP is different from the servo pattern recording head WH in that a substrate Hβ1 is provided instead of the substrate WH1. The substrate Hβ1 is formed in a rectangular parallelepiped shape, and is disposed to diagonally cross the front surface 31 of the magnetic tape MT that travels on the transport passage SW7. A front surface Hβ1A of the substrate Hβ1 is a rectangle having a long side Hβ1Aa and a short side Hβ1Ab, and the long side Hβ1Aa diagonally crosses the front surface 31 of the magnetic tape MT.

In the servo pattern recording head HP, the gap patterns G1, G2, and G3 deviate from each other at the predetermined intervals described above (that is, the predetermined interval calculated from Expression (1)) in the direction LD1, between the gap patterns G adjacent to each other along the direction WD1. The short side Hβ1Ab is a length in which the gap patterns G1, G2, and G3 are contained. That is, the length of the short side Hβ1Ab is set to be a length in which at least the amount of the gap patterns G1 to G3 deviating from the gap pattern G1 to the gap pattern G3 along the direction LD1 is compensated.

In the servo pattern recording head HP, the substrate Hβ1 is inclined on the front surface 31 side of the magnetic tape MT along the front surface 31 of the magnetic tape MT with respect to the imaginary straight line C1 at the angle γ at which deviation at the predetermined intervals is absorbed in a state in which the plurality of gap patterns G and the front surface 31 face to each other. In the example shown in FIG. 21, an aspect is shown in which an extension line C5 of the long side Hβ1Aa is inclined along the front surface 31 of the magnetic tape MT with respect to the imaginary straight line C1 at the angle γ. In the servo pattern recording head HP configured as described above, the pulse signal having the same phase is supplied to each of the gap patterns G1, G2, and G3 to record the plurality of servo patterns 58 in the plurality of servo bands SB, respectively (see FIG. 9).

On the other hand, in the servo pattern recording head WH, the gap patterns G1, G2, and G3 are arranged in a straight line on the front surface WH1A in the direction orthogonal to the direction LD1 and the pulse signal is delayed by the predetermined time, so that the arrangement of the plurality of servo patterns 58 shown in FIG. 9 can be realized without deviating the gap patterns G1, G2, and G3 in the direction LD1. Therefore, in the servo pattern recording head WH, it is not necessary to incline the substrate WH1 on the front surface 31 of the magnetic tape MT. The fact that it is not necessary to incline the substrate WH1 on the front surface 31 of the magnetic tape MT means that inclination work of the substrate WH1 is not necessary. In addition, the phenomenon that the magnetic tape MT is biased in the width direction WD due to the inclination of the substrate WH1 is less likely to occur.

In addition, in the servo writer SW, the signal having the deviated phase is used as the pulse signal used between the plurality of gap patterns G. The pulse signal for the servo pattern 58A and the pulse signal for the servo pattern 58B are alternately supplied to the head core WH2A, the head core WH2B, and the head core WH2C. In the servo writer SW, the gap patterns G1, G2, and G3 deviate from each other at the predetermined intervals in the direction LD1. Therefore, by supplying the pulse signal for the servo pattern 58A in the deviated phase to the head core WH2A, the head core WH2B, and the head core WH2C, the servo writer SW can record the servo patterns 58A in the servo bands SB1 to SB3 by the deviation at the predetermined intervals in the longitudinal direction LD between the servo bands SB adjacent to each other in the width direction WD. In addition, by supplying the pulse signal for the servo pattern 58B in the deviated phase to the head core WH2A, the head core WH2B, and the head core WH2C, the servo writer SW can record the servo patterns 58B in the servo bands SB1 to SB3 by the deviation at the predetermined intervals in the longitudinal direction LD between the servo bands SB adjacent to each other in the width direction WD.

In addition, in the servo writer SW, the control device SW5 operates as the position detection unit 30B shown in FIG. 14 to obtain a position detection result from the servo pattern reading result, and uses the position detection result to determine whether the servo pattern 58 is correct or not to thereby inspect the servo band SB. The control device SW5 operating as the position detection unit 30B can detect the servo signal with high accuracy compared with a case in which only a method for determining whether the signal level exceeds a threshold or not is used to detect the servo signal, so that the servo writer SW can also inspect the servo band SB with high accuracy.

Figure 22:
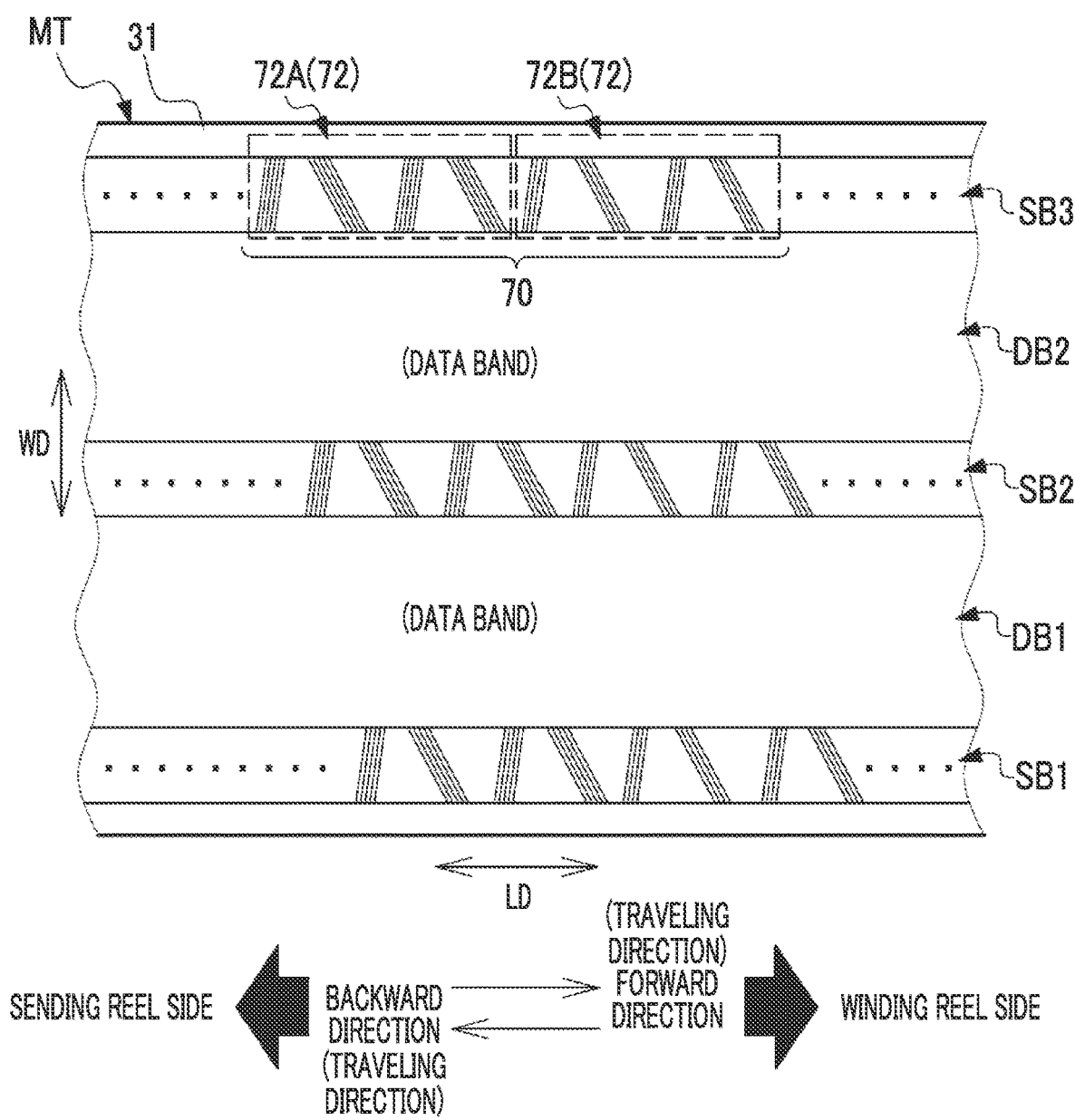
FIG. 22 is a conceptual diagram showing a first modification example of the magnetic tape according to the embodiment (conceptual diagram showing an example of an aspect in which the magnetic tape according to the first modification example is observed from the front surface side of the magnetic tape).

It should be noted that, in the embodiment described above, the form example has been described in which the servo band SB is divided by the plurality of frames 56 along the longitudinal direction LD, but the technology of the present disclosure is not limited to this. For example, as shown in FIG. 22, the servo band SB may be divided by a frame 70 along the longitudinal direction LD. The frame 70 is defined by a set of servo patterns 72. A plurality of servo patterns 72 are recorded in the servo band SB along the longitudinal direction LD. Similar to the plurality of servo patterns 58, the plurality of servo patterns 72 are disposed at regular intervals along the longitudinal direction LD.

In the example shown in FIG. 22, servo patterns 72A and 72B are shown as an example of the set of servo patterns 72. Each of the servo patterns 72A and 72B is an M-shaped magnetized servo pattern. The servo patterns 72A and 72B are adjacent to each other along the longitudinal direction LD, and the servo pattern 72A is positioned on the upstream side in the forward direction and the servo pattern 72B is positioned on the downstream side in the forward direction in the frame 70.

Figure 23:
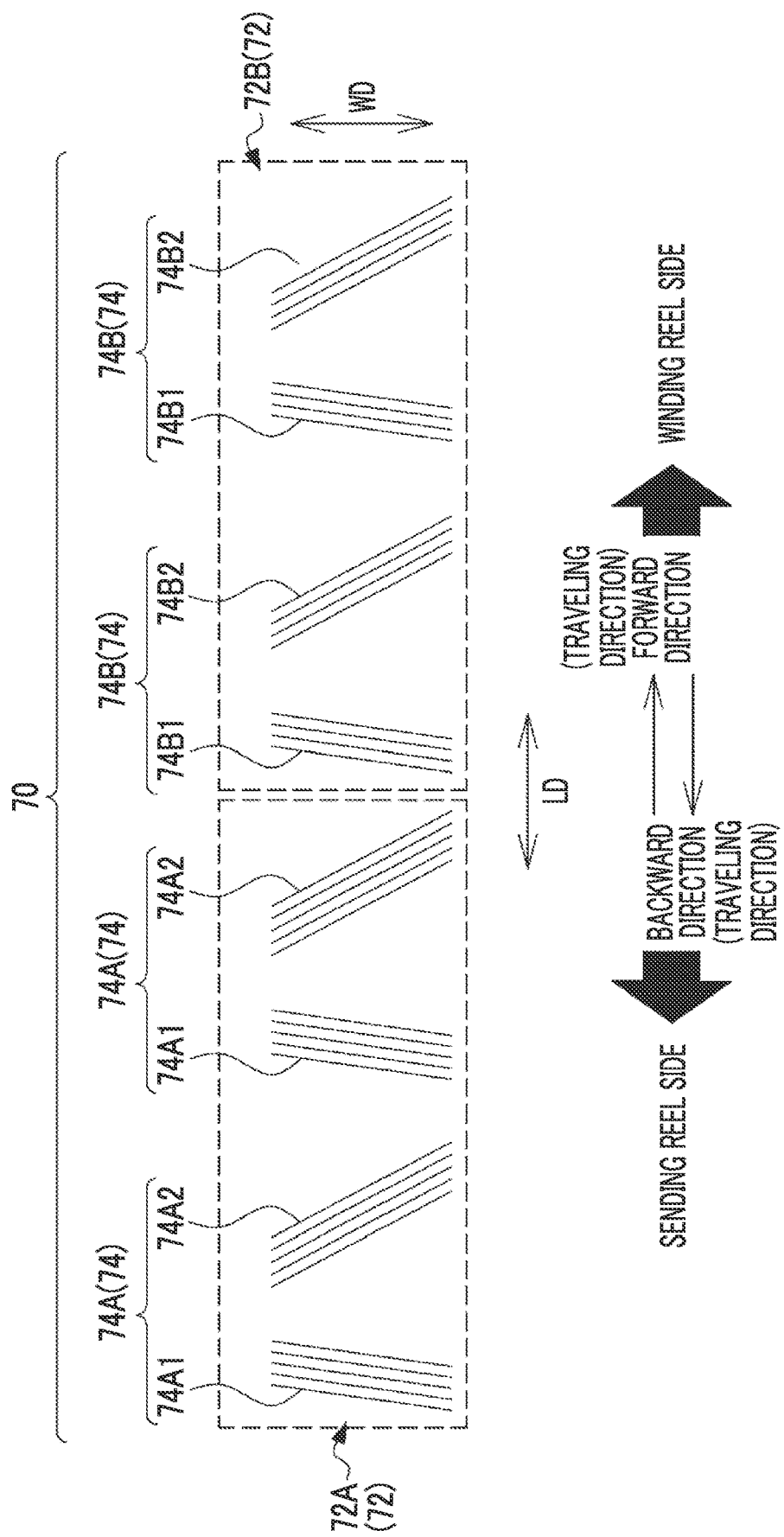
FIG. 23 is a conceptual diagram showing an example of an aspect of the servo pattern included in the magnetic tape according to the first modification example.

As an example, as shown in FIG. 23, the servo pattern 72 consists of a linear magnetization region pair 74. The linear magnetization region pair 74 is classified into a linear magnetization region pair 74A and a linear magnetization region pair 74B.

The servo pattern 72A consists of a set of linear magnetization region pairs 74A. The set of linear magnetization region pairs 74A are disposed in a state of being adjacent to each other along the longitudinal direction LD.

In the example shown in FIG. 23, linear magnetization regions 74A1 and 74A2 are shown as an example of the linear magnetization region pair 74A. The linear magnetization region pair 74A is configured in the same manner as the linear magnetization region pair 60A described in the above embodiment, and has the same geometrical characteristic as the linear magnetization region pair 60A. That is, the linear magnetization region 74A1 is configured in the same manner as the linear magnetization region 60A1 described in the above embodiment, and has the same geometrical characteristic as the linear magnetization region 60A1, and the linear magnetization region 74A2 is configured in the same manner as the linear magnetization region 60A2 described in the above embodiment, and has the same geometrical characteristic as the linear magnetization region 60A2.

The servo pattern 72B consists of a set of linear magnetization region pairs 74B. The set of linear magnetization region pairs 74B are disposed in a state of being adjacent to each other along the longitudinal direction LD.

In the example shown in FIG. 23, linear magnetization regions 74B1 and 74B2 are shown as an example of the linear magnetization region pair 74B. The linear magnetization region pair 74B is configured in the same manner as the linear magnetization region pair 60B described in the above embodiment, and has the same geometrical characteristic as the linear magnetization region pair 60B. That is, the linear magnetization region 74B1 is configured in the same manner as the linear magnetization region 60B1 described in the above embodiment, and has the same geometrical characteristic as the linear magnetization region 60B1, and the linear magnetization region 74B2 is configured in the same manner as the linear magnetization region 60B2 described in the above embodiment, and has the same geometrical characteristic as the linear magnetization region 60B2.

Figure 24:
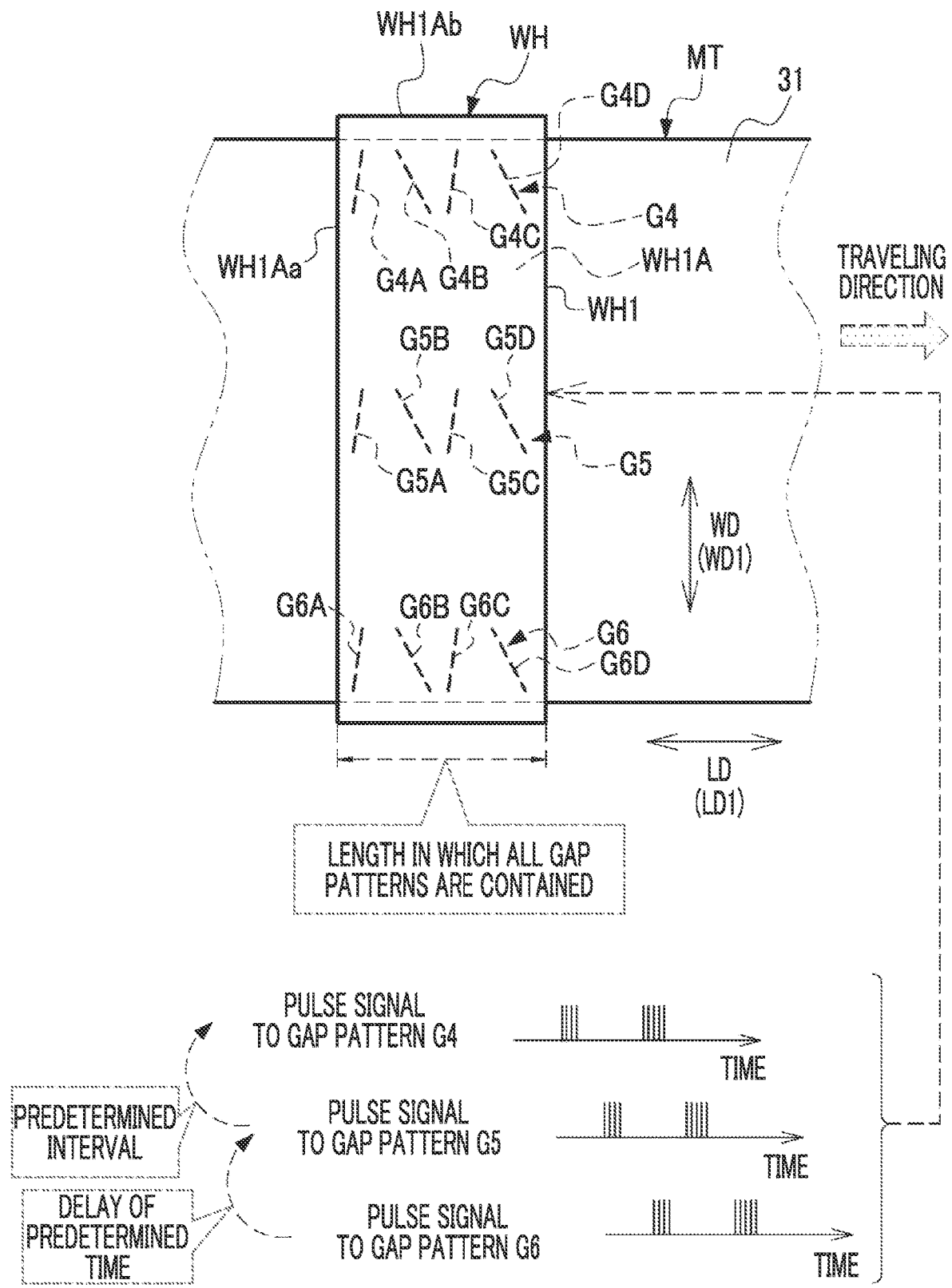
FIG. 24 is a conceptual diagram showing the first modification example of the servo pattern recording head provided in the servo writer according to the embodiment (conceptual diagram showing an example of an aspect in which a state in which the servo pattern recording head according to the first modification example is disposed on the magnetic tape is observed from the front surface side of the magnetic tape (that is, the rear surface side of the servo pattern recording head)).

As an example, as shown in FIG. 24, the servo pattern recording head WH used for recording the servo pattern 72 is different from the servo pattern recording head WH described in the above embodiment (that is, the servo pattern recording head WH used for recording the servo pattern 58) in that a gap pattern G4 is provided instead of the gap pattern G1, a gap pattern G5 is provided instead of the gap pattern G2, and a gap pattern G6 is provided instead of the gap pattern G3.

The gap pattern G4 consists of straight line regions G4A, G4B, G4C, and G4D. The straight line regions G4A and G4B are used for recording one linear magnetization region pair 74A of the set of linear magnetization region pairs 74A shown in FIG. 23 (for example, the linear magnetization region pair 74A on the upstream side in the forward direction), and the straight line regions G4C and G4D are used for recording the other linear magnetization region pair 74A of the set of linear magnetization region pairs 74A shown in FIG. 23 (for example, the linear magnetization region pair 74A on the downstream side in the forward direction). In addition, the straight line regions G4A and G4B are used for recording one linear magnetization region pair 74B of the set of linear magnetization region pairs 74B shown in FIG. 23 (for example, the linear magnetization region pair 74B on the upstream side in the forward direction), and the straight line regions G4C and G4D are used for recording the other linear magnetization region pair 74B of the set of linear magnetization region pairs 74B shown in FIG. 23 (for example, the linear magnetization region pair 74B on the downstream side in the forward direction).

The configurations of the straight line regions G4A and G4B are the same as the configurations of the straight line regions G1A and G1B. That is, the straight line regions G4A and G4B have the same geometrical characteristics as the straight line regions G1A and G1B. The configurations of the straight line regions G4C and G4D are the same as the configurations of the straight line regions G4A and G4B. That is, the straight line regions G4C and G4D have the same geometrical characteristics as the straight line regions G4A and G4B.

The gap pattern G5 consists of straight line regions G5A, G5B, G5C, and G5D. The configurations of the straight line regions G5A, G5B, G5C, and G5D are the same as the configurations of the straight line regions G4A, G4B, G4C, and G4D. That is, the straight line regions G5A, G5B, G5C, and G5D have the same geometrical characteristics as the straight line regions G4A, G4B, G4C, and G4D.

The gap pattern G6 consists of straight line regions G6A, G6B, G6C, and G6D. The configurations of the straight line regions G6A, G6B, G6C, and G6D are the same as the configurations of the straight line regions G4A, G4B, G4C, and G4D. That is, the straight line regions G6A, G6B, G6C, and G6D have the same geometrical characteristics as the straight line regions G4A, G4B, G4C, and G4D.

The gap patterns G4, G5, and G6 configured as described above are arranged in a straight line along the long side WH1Aa as in the embodiment described above.

The long side WH1Aa of the front surface WH1A is longer than the width of the magnetic tape MT. The short side WH1Ab of the front surface WH1A is a length in which all of the gap patterns G4, G5, and G6 are contained. The long side WH1Aa direction of the front surface WH1A matches the width direction WD, and the short side WH1Ab direction of the front surface WH1A matches the longitudinal direction LD. The substrate WH1 is disposed on the front surface 31 side of the magnetic tape MT in a state in which the plurality of gap patterns G and the front surface 31 face each other and in a state of crossing the magnetic tape MT along the width direction WD.

The pulse signals used between the gap patterns G4, G5, and G6 (that is, as shown in FIG. 24, the pulse signal supplied from the first pulse signal generator SW4A to the head core WH2A, the pulse signal supplied from the second pulse signal generator SW4B to the head core WH2B, and the pulse signal supplied from the third pulse signal generator SW4C to the head core WH2C) are signals delayed by a predetermined time in order from the gap patterns G6, G5, and G4, as described in the above embodiment.

In the servo pattern recording step, in a state in which the position of the gap pattern G4 corresponds to the position of the servo band SB3, the position of the gap pattern G5 corresponds to the position of the servo band SB2, and the position of the gap pattern G6 corresponds to the position of the servo band SB1, the magnetic tape MT travels along the transport passage SW7 at a regular speed. Moreover, in this state, the pulse signal for the servo pattern 72A and the pulse signal for the servo pattern 72B are alternately supplied to the head core WH2A, the head core WH2B, and the head core WH2C.

Here, in a case in which the pulse signal for the servo pattern 72A is supplied to the head core WH2A, the head core WH2B, and the head core WH2C at the same timing as the timing described in the above embodiment, the servo patterns 72A are recorded in the servo band SB3, the servo band SB2, and the servo band SB1 in a state of deviating from each other at the predetermined intervals in the longitudinal direction LD. In addition, in a case in which the pulse signal for the servo pattern 72B is supplied to the head core WH2A, the head core WH2B, and the head core WH2C at the same timing as the timing described in the above embodiment, the servo patterns 72B are recorded in the servo band SB3, the servo band SB2, and the servo band SB1 in a state of deviating from each other at the predetermined intervals in the longitudinal direction LD.

Figure 25:
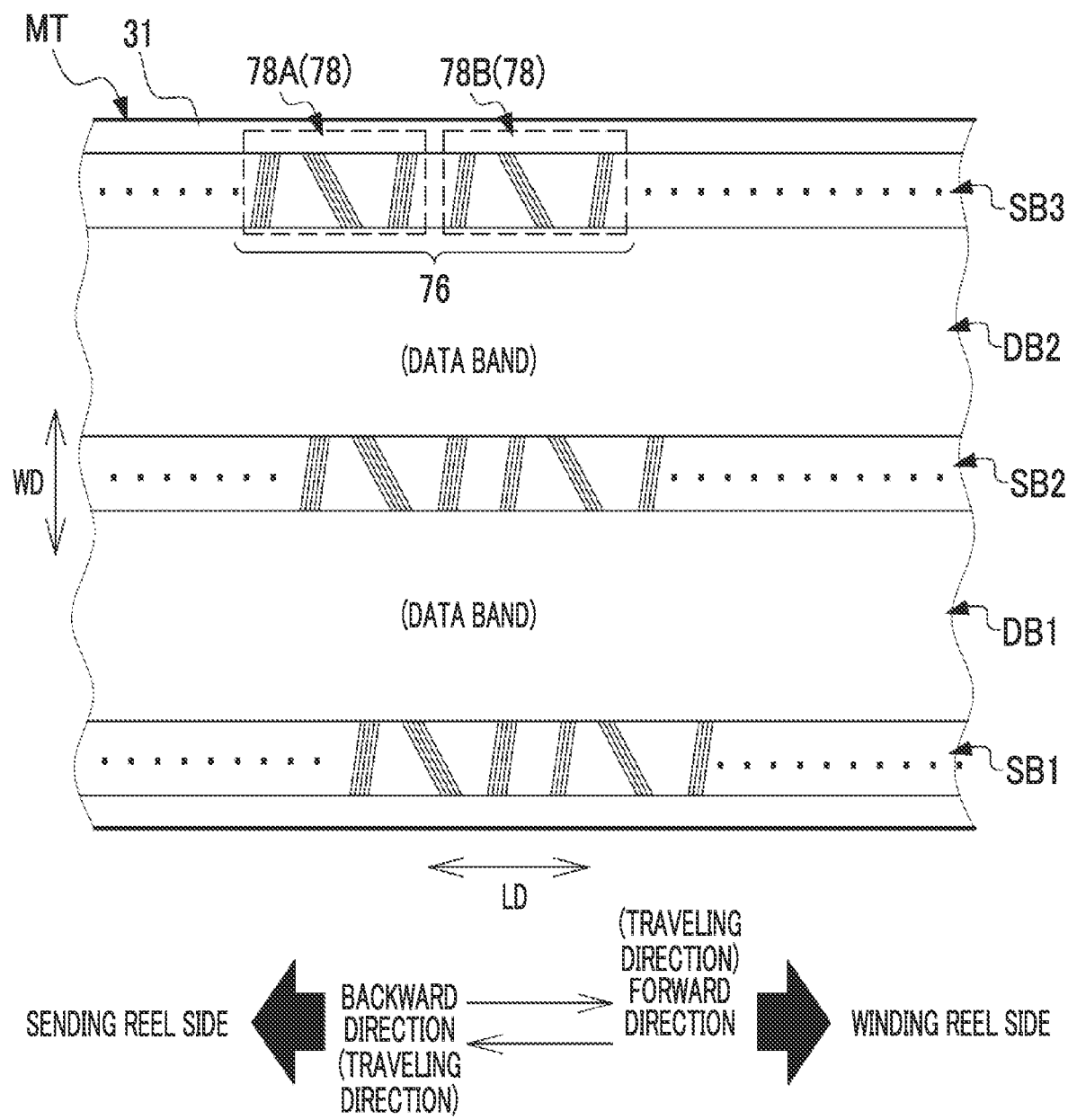
FIG. 25 is a conceptual diagram showing a second modification example of the magnetic tape according to the embodiment (conceptual diagram showing an example of an aspect in which the magnetic tape according to the second modification example is observed from the front surface side of the magnetic tape).

In the example shown in FIG. 22, the form example has been described in which the servo band SB is divided by the plurality of frames 70 along the longitudinal direction LD, but the technology of the present disclosure is not limited to this. For example, as shown in FIG. 25, the servo band SB may be divided by a frame 76 along the longitudinal direction LD. The frame 76 is defined by a set of servo patterns 78. A plurality of servo patterns 78 are recorded in the servo band SB along the longitudinal direction LD. Similar to the plurality of servo patterns 72 (see FIG. 22), the plurality of servo patterns 78 are disposed at regular intervals along the longitudinal direction LD.

In the example shown in FIG. 25, servo patterns 78A and 78B are shown as an example of the set of servo patterns 78. Each of the servo patterns 78A and 78B is an N-shaped magnetized servo pattern. The servo patterns 78A and 78B are adjacent to each other along the longitudinal direction LD, and the servo pattern 78A is positioned on the upstream side in the forward direction and the servo pattern 78B is positioned on the downstream side in the forward direction in the frame 76.

Figure 26:
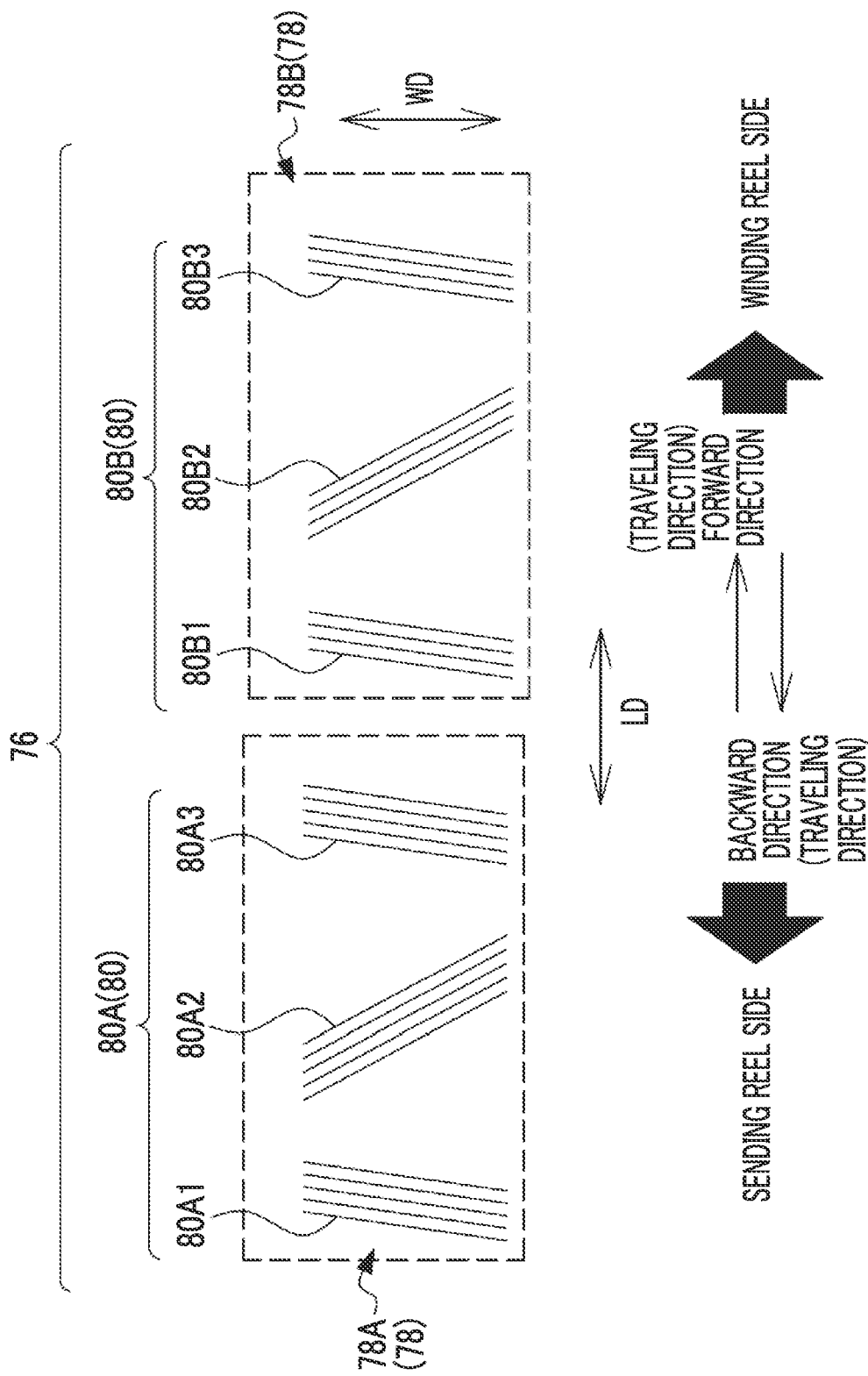
FIG. 26 is a conceptual diagram showing an example of an aspect of the servo pattern included in the magnetic tape according to the second modification example.

As an example, as shown in FIG. 26, the servo pattern 78 consists of a linear magnetization region group 80. The linear magnetization region group 80 is classified into a linear magnetization region group 80A and a linear magnetization region group 80B.

The servo pattern 78A consists of the linear magnetization region group 80A. The linear magnetization region group 80A consists of linear magnetization regions 80A1, 80A2, and 80A3. The linear magnetization regions 80A1, 80A2, and 80A3 are disposed in a state of being adjacent to each other along the longitudinal direction LD. The linear magnetization regions 80A1, 80A2, and 80A3 are disposed in the order of the linear magnetization regions 80A1, 80A2, and 80A3 from the upstream side in the forward direction.

The linear magnetization regions 80A1 and 80A2 are configured in the same manner as the linear magnetization region pair 74A shown in FIG. 23, and have the same geometrical characteristics as the linear magnetization region pair 74A. That is, the linear magnetization region 80A1 is configured in the same manner as the linear magnetization region 74A1 shown in FIG. 23, and have the same geometrical characteristic as the linear magnetization region 74A1, and the linear magnetization region 80A2 is configured in the same manner as the linear magnetization region 74A2 shown in FIG. 23, and have the same geometrical characteristic as the linear magnetization region 74A2. In addition, the linear magnetization region 80A3 is configured in the same manner as the linear magnetization region 80A1, and has the same geometrical characteristic as the linear magnetization region 80A1.

In the example shown in FIG. 26, the linear magnetization regions 80A1 and 80A2 are an example of a "linear magnetization region pair" according to the technology of the present disclosure; and in such a case, the linear magnetization region 80A1 is an example of a "first linear magnetization region" according to the technology of the present disclosure, and the linear magnetization region 80A2 is an example of a "second linear magnetization region" according to the technology of the present disclosure. In addition, the linear magnetization regions 80A2 and 80A3 are also an example of the "linear magnetization region pair" according to the technology of the present disclosure; and in such a case, the linear magnetization region 80A3 is an example of the "first linear magnetization region" according to the technology of the present disclosure, and the linear magnetization region 80A2 is an example of the "second linear magnetization region" according to the technology of the present disclosure.

The servo pattern 78B consists of the linear magnetization region group 80B. The linear magnetization region group 80B consists of linear magnetization regions 80B1, 80B2, and 80B3. The linear magnetization regions 80B1, 80B2, and 80B3 are disposed in a state of being adjacent to each other along the longitudinal direction LD. The linear magnetization regions 80B1, 80B2, and 80B3 are disposed in the order of the linear magnetization regions 80B1, 80B2, and 80B3 from the upstream side in the forward direction.

The linear magnetization regions 80B1 and 80B2 are configured in the same manner as the linear magnetization region pair 74B shown in FIG. 23, and have the same geometrical characteristics as the linear magnetization region pair 74B. That is, the linear magnetization region 80B1 is configured in the same manner as the linear magnetization region 74B1 shown in FIG. 23, and have the same geometrical characteristic as the linear magnetization region 74B1, and the linear magnetization region 80B2 is configured in the same manner as the linear magnetization region 74B2 shown in FIG. 23, and have the same geometrical characteristic as the linear magnetization region 74B2. In addition, the linear magnetization region 80B3 is configured in the same manner as the linear magnetization region 80B1, and has the same geometrical characteristic as the linear magnetization region 80B1.

As shown in FIG. 26 as an example, the linear magnetization regions 80B1 and 80B2 are an example of the "linear magnetization region pair" according to the technology of the present disclosure; and in such a case, the linear magnetization region 80B1 is an example of the "first linear magnetization region" according to the technology of the present disclosure, and the linear magnetization region 80B2 is an example of the "second linear magnetization region" according to the technology of the present disclosure. In addition, the linear magnetization regions 80B2 and 80B3 are also an example of the "linear magnetization region pair" according to the technology of the present disclosure; and in such a case, the linear magnetization region 80B3 is an example of the "first linear magnetization region" according to the technology of the present disclosure, and the linear magnetization region 80B2 is an example of the "second linear magnetization region" according to the technology of the present disclosure.

As an example, as shown in FIG. 27, the servo pattern recording head WH used for recording the servo pattern 78 is different from the servo pattern recording head WH shown in FIG. 24 (that is, the servo pattern recording head WH used for recording the servo pattern 72) in that a gap pattern G7 is provided instead of the gap pattern G4, a gap pattern G8 is provided instead of the gap pattern G5, and a gap pattern G9 is provided instead of the gap pattern G6.

The gap pattern G7 consists of straight line regions G7A, G7B, and G7C. The straight line region G7A is used for recording the linear magnetization regions 80A1 and 80B1 (see FIG. 26) in the servo band SB3 (see FIG. 25), the straight line region G7B is used for recording the linear magnetization regions 80A2 and 80B2 (see FIG. 26) in the servo band SB3 (see FIG. 25), and the straight line region G7C is used for recording the linear magnetization regions 80A3 and 80B3 (see FIG. 26) in the servo band SB3 (see FIG. 25).

The configurations of the straight line regions G7A, G7B, and G7C are the same as the configurations of the straight line regions G4A, G4B, and G4C shown in FIG. 24. That is, the straight line regions G7A, G7B, and G7C have the same geometrical characteristics as the straight line regions G4A, G4B, and G4C.

The gap pattern G8 consists of straight line regions G8A, G8B, and G8C. The straight line region G8A is used for recording the linear magnetization regions 80A1 and 80B1 (see FIG. 26) in the servo band SB2 (see FIG. 25), the straight line region G8B is used for recording the linear magnetization regions 80A2 and 80B2 (see FIG. 26) in the servo band SB2 (see FIG. 25), and the straight line region G8C is used for recording the linear magnetization regions 80A3 and 80B3 (see FIG. 26) in the servo band SB2 (see FIG. 25).

The configurations of the straight line regions G8A, G8B, and G8C are the same as the configurations of the straight line regions G5A, G5B, and G5C shown in FIG. 24. That is, the straight line regions G8A, G8B, and G8C have the same geometrical characteristics as the straight line regions GSA, G5B, and G5C.

The gap pattern G9 consists of straight line regions G9A, G9B, and G9C. The straight line region G9A is used for recording the linear magnetization regions 80A1 and 80B1 (see FIG. 26) in the servo band SB1 (see FIG. 25), the straight line region G9B is used for recording the linear magnetization regions 80A2 and 80B2 (see FIG. 26) in the servo band SB1 (see FIG. 25), and the straight line region G9C is used for recording the linear magnetization regions 80A3 and 80B3 (see FIG. 26) in the servo band SB1 (see FIG. 25).

The configurations of the straight line regions G9A, G9B, and G9C are the same as the configurations of the straight line regions G6A, G6B, and G6C shown in FIG. 24. That is, the straight line regions G9A, G9B, and G9C have the same geometrical characteristics as the straight line regions G6A, G6B, and G6C.

The gap patterns G7, G8, and G9 configured as described above are arranged in a straight line along the long side WH1Aa as in the embodiment described above.

The long side WH1Aa of the front surface WH1A is longer than the width of the magnetic tape MT. The short side WH1Ab of the front surface WH1A is a length in which all of the gap patterns G7, G8, and G9 are contained. The long side WH1Aa direction of the front surface WH1A matches the width direction WD, and the short side WH1Ab direction of the front surface WH1A matches the longitudinal direction LD. The substrate WH1 is disposed on the front surface 31 side of the magnetic tape MT in a state in which the plurality of gap patterns G and the front surface 31 face each other and in a state of crossing the magnetic tape MT along the width direction WD.

The pulse signals used between the gap patterns G7, G8, and G9 (that is, as shown in FIG. 24, the pulse signal supplied from the first pulse signal generator SW4A to the head core WH2A, the pulse signal supplied from the second pulse signal generator SW4B to the head core WH2B, and the pulse signal supplied from the third pulse signal generator SW4C to the head core WH2C) are signals delayed by a predetermined time in order from the gap patterns G6, G5, and G4, as described in the above embodiment.

In the servo pattern recording step, in a state in which the position of the gap pattern G7 corresponds to the position of the servo band SB3, the position of the gap pattern G8 corresponds to the position of the servo band SB2, and the position of the gap pattern G9 corresponds to the position of the servo band SB1, the magnetic tape MT travels along the transport passage SW7 at a regular speed. Moreover, in this state, the pulse signal for a servo pattern 78A and the pulse signal for a servo pattern 78B are alternately supplied to the head core WH2A, the head core WH2B, and the head core WH2C.

Here, in a case in which the pulse signal for the servo pattern 78A is supplied to the head core WH2A, the head core WH2B, and the head core WH2C at the same timing as the timing described in the above embodiment, the servo patterns 78A are recorded in the servo band SB3, the servo band SB2, and the servo band SB1 in a state of deviating from each other at the predetermined intervals in the longitudinal direction LD. In addition, in a case in which the pulse signal for the servo pattern 78B is supplied to the head core WH2A, the head core WH2B, and the head core WH2C at the same timing as the timing described in the above embodiment, the servo patterns 78B are recorded in the servo band SB3, the servo band SB2, and the servo band SB1 in a state of deviating from each other at the predetermined intervals in the longitudinal direction LD.

Figure 28:
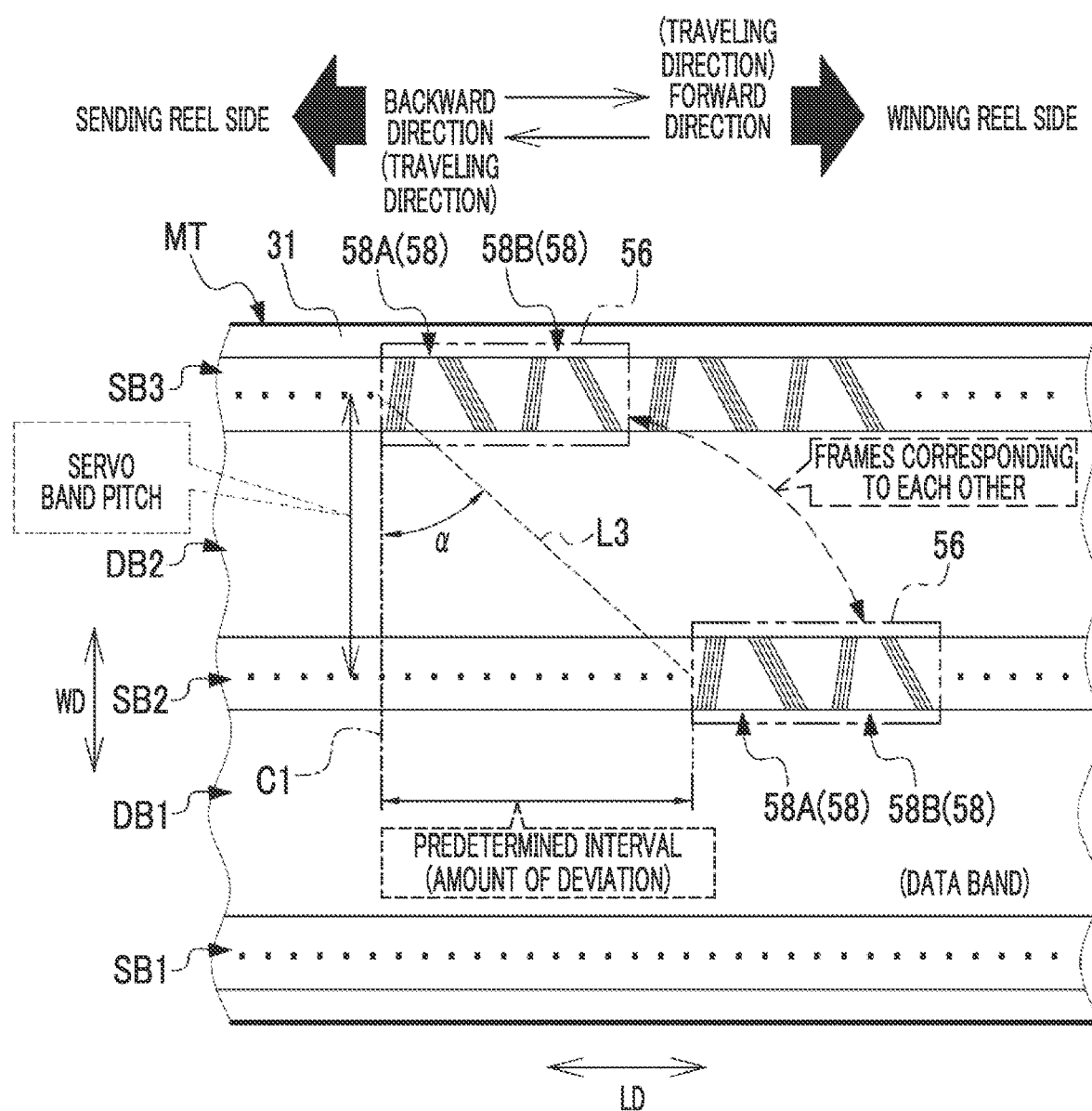
FIG. 28 is a conceptual diagram showing an example of an aspect in which a state in which frames corresponding to each other between the servo bands adjacent to each other in the width direction of the magnetic tape according to the embodiment deviate from each other at a predetermined interval is observed from the front surface side of the magnetic tape.

In the embodiment described above, the form example has been described in which the predetermined interval is defined based on the angle α, the servo band pitch, and the frame length, but the technology of the present disclosure is not limited to this, and the predetermined interval may be defined without using the frame length. For example, as shown in FIG. 28, the predetermined interval is defined based on the angle α formed by the interval between the frames 56 having the correspondence relationship between the servo bands SB adjacent to each other in the width direction WD (in the example shown in FIG. 28, a line segment L3) and the imaginary straight line C1, and the pitch between the servo bands SB adjacent to each other in the width direction WD (that is, the servo band pitch). In this case, for example, the predetermined interval is calculated from Expression (2).

$$(\text{Predetermined interval}) = (\text{Servo band pitch}) \times \tan \alpha \qquad (2)$$

As described above, Expression (2) does not include the frame length. This means that the predetermined interval is calculated even in a case in which the frame length is not considered. Therefore, with the present configuration, the predetermined interval can be calculated more easily than in a case of calculating the predetermined interval from Expression (1).

In the embodiment described above, the magnetic tape system 10 has been described in which the magnetic tape cartridge 12 can be inserted and removed with respect to the magnetic tape drive 14, but the technology of the present disclosure is not limited to this. For example, even in a case of the magnetic tape system in which at least one magnetic tape cartridge 12 is loaded in advance into the magnetic tape drive 14 (that is, the magnetic tape system in which at least one magnetic tape cartridge 12 and the magnetic tape drive 14 are integrated in advance), the technology of the present disclosure is established.

In the embodiment described above, the single magnetic head 28 has been described, but the technology of the present disclosure is not limited to this. For example, a plurality of magnetic heads 28 may be disposed on the magnetic tape MT. For example, the magnetic head 28 for reading and at least one magnetic head 28 for writing may be disposed on the magnetic tape MT. The magnetic head 28 for reading may be used for verifying the data recorded in the data band DB by the magnetic head 28 for writing. In addition, one magnetic head on which the magnetic element unit 42 for reading and at least one magnetic element unit 42 for writing are mounted may be disposed on the magnetic tape MT.

The description contents and the shown contents above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unnecessary parts may be deleted, new elements may be added, or replacements may be made with respect to the contents described and shown above within a range that does not deviate from the gist of the technology of the present disclosure. In addition, in order to avoid complications and facilitate understanding of the parts according to the technology of the present disclosure, in the description contents and the shown contents above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be described by reference.

(Supplementary Note 1)

A servo pattern recording head comprising a substrate, and a plurality of gap patterns formed on a front surface of the substrate, in which the plurality of gap patterns are formed on the front surface along a direction corresponding to a width direction of a magnetic tape, a magnetic field is applied to the magnetic tape in response to a supplied pulse signal to record a plurality of servo patterns in the width direction, the gap patterns are at least one straight line region pair, a first straight line region, which is one straight line region of the straight line region pair, and a second straight line region, which is the other straight line region of the straight line region pair, are inclined in opposite directions with respect to a first imaginary straight line along the direction corresponding to the width direction on the front surface, the first straight line region has a steeper inclined angle with respect to the first imaginary straight line than the second straight line region, positions of both ends of the first straight line region and positions of both ends of the second straight line region are aligned in the direction corresponding to the width direction of the magnetic tape, positions of the plurality of gap patterns in a longitudinal direction of the magnetic tape are aligned on the front surface, and the pulse signal generator supplies the pulse signal with a delay of a predetermined time to each of the plurality of gap patterns from one side to the other side in a direction in which the plurality of gap patterns are arranged.

What is claimed is:

1. A servo pattern recording device comprising:
a pulse signal generator; and
a servo pattern recording head,
wherein the pulse signal generator generates a pulse signal,
the servo pattern recording head has a substrate and a plurality of gap patterns formed on a front surface of the substrate, and records a plurality of servo patterns in a width direction of a magnetic tape by applying a magnetic field to the magnetic tape from the plurality of gap patterns in response to the pulse signal,
the plurality of gap patterns are formed on the front surface along a direction corresponding to the width direction,
the gap patterns are at least one straight line region pair,
a first straight line region, which is one straight line region of the straight line region pair, and a second straight line region, which is the other straight line region of the straight line region pair, are inclined in opposite directions with respect to a first imaginary straight line along the direction corresponding to the width direction on the front surface,
the first straight line region has a steeper inclined angle with respect to the first imaginary straight line than the second straight line region,
positions of both ends of the first straight line region and positions of both ends of the second straight line region are aligned in the direction corresponding to the width direction of the magnetic tape,
positions of the plurality of gap patterns in a longitudinal direction of the magnetic tape are aligned on the front surface, and
the pulse signal generator supplies the pulse signal with a delay of a predetermined time to each of the plurality of gap patterns from one side to the other side in a direction in which the plurality of gap patterns are arranged.

2. The servo pattern recording device according to claim 1,
wherein the substrate is formed in a rectangular parallelepiped shape, and crosses the magnetic tape in a direction orthogonal to the longitudinal direction of the magnetic tape.

3. The servo pattern recording device according to claim 2,
wherein the front surface is formed in a rectangular shape having a long side and a short side, and
a length of the short side is a length in which the plurality of servo patterns are contained.

4. The servo pattern recording device according to claim 3,
wherein the substrate is disposed on the magnetic tape in a posture in which an orientation of the long side and the longitudinal direction of the magnetic tape are orthogonal to each other.

5. The servo pattern recording device according to claim 1,
wherein a total length of the first straight line region is shorter than a total length of the second straight line region.

6. The servo pattern recording device according to claim 1,
wherein a geometrical characteristic of the straight line region pair on the front surface corresponds to a geometrical characteristic in which positions of both ends of one imaginary straight line region of a pair of imaginary straight line regions and positions of both ends of the other imaginary straight line region are aligned in the direction corresponding to the width direction in a case in which an entirety of the pair of imaginary straight line regions is inclined with respect to the first imaginary straight line by inclining, with respect to the first imaginary straight line, a symmetry axis of the pair of imaginary straight line regions inclined line-symmetrically with respect to the first imaginary straight line.

7. The servo pattern recording device according to claim 1,
wherein a plurality of servo bands are formed on the magnetic tape along the width direction,
servo patterns corresponding to each other between the servo bands deviate from each other at a predetermined interval in the longitudinal direction of the magnetic tape, between the servo bands adjacent to each other in the width direction, and
the predetermined time is determined in accordance with the predetermined interval.

8. The servo pattern recording device according to claim 7,
wherein the plurality of servo bands are formed on the magnetic tape along the width direction,
the servo bands are divided by a frame defined based on at least one set of the servo patterns, and
the predetermined interval is defined based on an angle formed by the frames that have a correspondence relationship between the servo bands adjacent to each other in the width direction and the first imaginary straight line, and a pitch between the servo bands adjacent to each other in the width direction.

9. The servo pattern recording device according to claim 7,
wherein the plurality of servo bands are formed on the magnetic tape along the width direction,
the servo bands are divided by a frame defined based on at least one set of the servo patterns, and
the predetermined interval is defined based on an angle formed by the frames that have no correspondence relationship between the servo bands adjacent to each other in the width direction and the first imaginary straight line, a pitch between the servo bands adjacent to each other in the width direction, and a total length of the frame in the longitudinal direction.

10. The magnetic tape according to claim 1, wherein the magnetic tape further comprises a magnetic layer, a base film and a back coating layer, and in which the plurality of servo patterns are recorded by the servo pattern recording device.

11. A magnetic tape cartridge comprising:
the magnetic tape according to claim 10; and
a case in which the magnetic tape is accommodated.

12. A magnetic tape drive comprising:
a travel mechanism that causes the magnetic tape according to claim 10 to travel along a predetermined path; and
a magnetic head including a plurality of servo reading elements that read the servo patterns on the predetermined path in a state in which the magnetic tape is caused to travel by the travel mechanism,
wherein the plurality of servo reading elements are arranged along the longitudinal direction of the magnetic head, and
the magnetic head is disposed in a posture in which a second imaginary straight line along the longitudinal direction of the magnetic head is inclined with respect to a traveling direction of the magnetic tape.

13. A magnetic tape system comprising:
the magnetic tape according to claim 10; and
a magnetic tape drive on which a magnetic head including a plurality of servo reading elements that read the servo patterns on a predetermined path in a state in which the magnetic tape is caused to travel along the predetermined path is mounted,
wherein the plurality of servo reading elements are arranged along the longitudinal direction of the magnetic head, and
the magnetic head is disposed in a posture in which a third imaginary straight line along the longitudinal direction of the magnetic head is inclined with respect to a traveling direction of the magnetic tape.

14. A detection device comprising:
a processor that is configured to detect a servo signal, which is a result of reading a servo pattern of the plurality of servo patterns by a servo reading element from the magnetic tape according to claim 10, by using an autocorrelation coefficient.

15. An inspection device comprising:
a detection device that is the detection device according to claim 14 and that is used together with the servo pattern recording device; and an inspection processor that inspects a servo band on which a servo pattern of the plurality of servo patterns is recorded in the magnetic tape based on the servo signal detected by the detection device.

16. A detection method, the detection method comprising: detecting a servo signal, which is a result obtained by reading a servo pattern of the plurality of servo patterns by a servo reading element from the magnetic tape according to claim 10, using an autocorrelation coefficient.

17. An inspection method comprising:
inspecting a servo band on which the servo pattern of the plurality of servo patterns is recorded in the magnetic tape based on the servo signal detected by the detection method according to claim 16.

18. A servo pattern recording method comprising:
generating a pulse signal; and
recording, by the servo pattern recording head having a substrate and a plurality of gap patterns formed on a front surface of the substrate, a plurality of servo patterns in a width direction of a magnetic tape by applying a magnetic field to the magnetic tape from the plurality of gap patterns in response to the pulse signal,
wherein the plurality of gap patterns are formed on the front surface along a direction corresponding to the width direction,
the gap patterns are at least one straight line region pair,
a first straight line region, which is one straight line region of the straight line region pair, and a second straight line region, which is the other straight line region of the straight line region pair, are inclined in opposite directions with respect to a first imaginary straight line along the direction corresponding to the width direction on the front surface, the first straight line region has a steeper inclined angle with respect to the first imaginary straight line than the second straight line region, positions of both ends of the first straight line region and positions of both ends of the second straight line region are aligned in the direction corresponding to the width direction of the magnetic tape, positions of the plurality of gap patterns in a longitudinal direction of the magnetic tape are aligned on the front surface, and the servo pattern recording method further includes supplying the pulse signal with a delay of a predetermined time to each of the plurality of gap patterns from one side to the other side in a direction in which the plurality of gap patterns are arranged.

19. A manufacturing method of a magnetic tape, the method comprising:

recording the plurality of servo patterns in the magnetic tape according to the servo pattern recording method according to claim 18; and winding the magnetic tape.

\* \* \* \* \*